(12) United States Patent
Black et al.

(10) Patent No.: US 11,411,779 B2
(45) Date of Patent: Aug. 9, 2022

(54) REFERENCE SIGNAL CHANNEL ESTIMATION

(71) Applicant: XCOM Labs, Inc., San Diego, CA (US)

(72) Inventors: Peter John Black, La Jolla, CA (US); Jinghu Chen, San Diego, CA (US); Jing Jiang, San Diego, CA (US); Tamer Adel Kadous, San Diego, CA (US); Wanlun Zhao, San Diego, CA (US)

(73) Assignee: XCOM Labs, Inc., San Diego, CA (US)

( * ) Notice: Subject to any disclaimer, the term of this patent is extended or adjusted under 35 U.S.C. 154(b) by 180 days.

(21) Appl. No.: 16/836,668

(22) Filed: Mar. 31, 2020

(65) Prior Publication Data

US 2021/0328838 A1 Oct. 21, 2021

(51) Int. Cl.
*H04L 25/02* (2006.01)

(52) U.S. Cl.
CPC ...... *H04L 25/0228* (2013.01); *H04L 25/0212* (2013.01)

(58) Field of Classification Search
CPC ............. H04L 25/0212; H04L 25/0228; H04L 25/03834; H04L 25/0232; H04L 5/0048
See application file for complete search history.

(56) References Cited

U.S. PATENT DOCUMENTS

| | | | |
|---|---|---|---|
| 5,469,115 A | 11/1995 | Peterzell | |
| 5,617,060 A | 4/1997 | Wilson | |
| 5,757,858 A | 5/1998 | Black | |
| 5,870,431 A | 2/1999 | Easton | |
| 6,006,108 A | 12/1999 | Black | |
| 6,107,878 A | 8/2000 | Black | |
| 6,134,440 A | 10/2000 | Black | |
| 6,147,964 A | 11/2000 | Black | |
| 6,181,201 B1 | 1/2001 | Black | |
| 6,205,129 B1 | 3/2001 | Esteves | |
| 6,208,873 B1 | 3/2001 | Black | |
| 6,246,885 B1 | 6/2001 | Black | |

(Continued)

FOREIGN PATENT DOCUMENTS

| WO | WO 2008/009007 | 1/2008 |
|---|---|---|
| WO | WO 2019/221388 | 11/2019 |

OTHER PUBLICATIONS

3GPP TS 36.211, "LTE; Evolved Universal Terrestrial Radio Access (E-UTRA); Physical channels and modulation," version 14.2.0, Release 14, Apr. 2017.

(Continued)

*Primary Examiner* — Redentor Pasia
(74) *Attorney, Agent, or Firm* — Knobbe, Martens, Olson & Bear, LLP

(57) ABSTRACT

Aspects of this disclosure relate to reference signal channel estimation. A wireless communication channel between two nodes can be estimated based on a received reference signal, such as a Sounding Reference Signal. Techniques are disclosed to improve performance of reference signal channel estimation and make channel estimates more robust in the presence of one or more of a variety of impairments. Frequency domain processing and/or time domain processing can be performed to reduce distortion in channel estimates.

23 Claims, 26 Drawing Sheets

(56) References Cited

U.S. PATENT DOCUMENTS

| | | |
|---|---|---|
| 6,285,861 B1 | 9/2001 | Bonaccorso |
| 6,363,102 B1 | 3/2002 | Ling |
| 6,397,070 B1 | 5/2002 | Black |
| 6,426,971 B1 | 7/2002 | Wu |
| 6,434,376 B1 | 8/2002 | Black |
| 6,449,490 B1 | 9/2002 | Chaponniere |
| 6,466,558 B1 | 10/2002 | Ling |
| 6,560,211 B2 | 5/2003 | Esteves |
| 6,574,211 B2 | 6/2003 | Padovani |
| 6,594,501 B2 | 7/2003 | Black |
| 6,633,552 B1 | 10/2003 | Ling |
| 6,636,568 B2 | 10/2003 | Kadous |
| 6,661,833 B1 | 12/2003 | Black |
| 6,678,257 B1 | 1/2004 | Vijayan |
| 6,680,925 B2 | 1/2004 | Wu |
| 6,680,968 B2 | 1/2004 | Black |
| 6,687,510 B2 | 2/2004 | Esteves |
| 6,693,920 B2 | 2/2004 | Montojo |
| 6,694,469 B1 | 2/2004 | Jalali |
| 6,700,880 B2 | 3/2004 | Ling |
| 6,714,526 B2 | 3/2004 | Wei |
| 6,725,028 B2 | 4/2004 | Bonaccorso |
| 6,738,608 B2 | 5/2004 | Black |
| 6,748,201 B2 | 6/2004 | Black |
| 6,757,520 B2 | 6/2004 | Attar |
| 6,798,736 B1 | 9/2004 | Black |
| 6,801,580 B2 | 10/2004 | Kadous |
| 6,813,478 B2 | 11/2004 | Glazko |
| 6,873,606 B2 | 3/2005 | Agrawal |
| 6,894,994 B1 | 5/2005 | Grob |
| 6,917,821 B2 | 7/2005 | Kadous |
| 6,920,504 B2 | 7/2005 | Bender |
| 6,928,062 B2 | 8/2005 | Krishnan |
| 6,985,516 B1 | 1/2006 | Easton |
| 6,987,778 B2 | 1/2006 | Sindhushayana |
| 7,010,073 B2 | 3/2006 | Black |
| 7,012,883 B2 | 3/2006 | Jalali |
| 7,020,073 B2 | 3/2006 | Kadous |
| 7,020,225 B2 | 3/2006 | Sindhushayana |
| 7,039,001 B2 | 5/2006 | Krishnan |
| 7,042,857 B2 | 5/2006 | Krishnan |
| 7,051,268 B1 | 5/2006 | Sindhushayana |
| 7,068,707 B2 | 6/2006 | Bender |
| 7,069,037 B2 | 6/2006 | Lott |
| 7,072,628 B2 | 7/2006 | Agashe |
| 7,079,550 B2 | 7/2006 | Padovani |
| 7,088,701 B1 | 8/2006 | Attar |
| 7,088,957 B2 | 8/2006 | Ling |
| 7,095,790 B2 | 8/2006 | Krishnan |
| 7,106,782 B2 | 9/2006 | Howard |
| 7,123,922 B2 | 10/2006 | Chaponniere |
| 7,127,654 B2 | 10/2006 | Jalali |
| 7,130,282 B2 | 10/2006 | Black |
| 7,133,437 B2 | 11/2006 | Black |
| 7,145,940 B2 | 12/2006 | Gore |
| 7,149,264 B2 | 12/2006 | Black |
| 7,155,246 B2 | 12/2006 | Bhushan |
| 7,167,684 B2 | 1/2007 | Kadous |
| 7,177,351 B2 | 2/2007 | Kadous |
| 7,177,648 B2 | 2/2007 | Attar |
| 7,184,426 B2 | 2/2007 | Padovani |
| 7,184,713 B2 | 2/2007 | Kadous |
| 7,194,041 B2 | 3/2007 | Kadous |
| 7,206,580 B2 | 4/2007 | Black |
| 7,209,517 B2 | 4/2007 | Sindhushayana |
| 7,228,148 B2 | 6/2007 | Esteves |
| 7,236,535 B2 | 6/2007 | Subramaniam |
| 7,239,622 B2 | 7/2007 | Black |
| 7,239,847 B2 | 7/2007 | Attar |
| 7,251,229 B2 | 7/2007 | Montojo |
| 7,266,156 B2 | 9/2007 | Montojo |
| 7,289,473 B1 | 10/2007 | Padovani |
| 7,295,857 B2 | 11/2007 | Joshi |
| 7,315,531 B2 | 1/2008 | Black |
| 7,369,549 B2 | 5/2008 | Wu |
| 7,376,209 B2 | 5/2008 | Namgoong |
| 7,382,744 B2 | 6/2008 | Bhushan |
| 7,411,930 B2 | 8/2008 | Montojo |
| 7,418,046 B2 | 8/2008 | Gore |
| 7,428,269 B2 | 9/2008 | Sampath |
| 7,450,943 B2 | 11/2008 | Black |
| 7,457,639 B2 | 11/2008 | Subramaniam |
| 7,463,576 B2 | 12/2008 | Krishnan |
| 7,477,693 B2 | 1/2009 | Subramaniam |
| 7,499,427 B2 | 3/2009 | Padovani |
| 7,508,748 B2 | 3/2009 | Kadous |
| 7,525,909 B2 | 4/2009 | Fan |
| 7,564,775 B2 | 7/2009 | Jayaraman |
| 7,564,794 B2 | 7/2009 | Montojo |
| 7,564,818 B2 | 7/2009 | Black |
| 7,567,621 B2 | 7/2009 | Sampath |
| 7,580,709 B2 | 8/2009 | Black |
| 7,596,090 B2 | 9/2009 | Black |
| 7,606,326 B2 | 10/2009 | Krishnan |
| 7,609,773 B2 | 10/2009 | Bhushan |
| 7,613,978 B2 | 11/2009 | Jalali |
| 7,620,005 B2 | 11/2009 | Wei |
| 7,646,802 B2 | 1/2010 | Black |
| 7,668,125 B2 | 2/2010 | Kadous |
| 7,672,383 B2 | 3/2010 | Namgoong |
| 7,675,886 B2 | 3/2010 | Agrawal |
| 7,693,213 B2 | 4/2010 | Sindhushayana |
| 7,725,799 B2 | 5/2010 | Walker |
| 7,729,714 B2 | 6/2010 | Black |
| 7,742,447 B2 | 6/2010 | Joshi |
| 7,796,563 B2 | 9/2010 | Wu |
| 7,817,677 B2 | 10/2010 | Black |
| 7,817,760 B2 | 10/2010 | Black |
| 7,826,441 B2 | 11/2010 | Black |
| 7,830,900 B2 | 11/2010 | Black |
| 7,835,695 B2 | 11/2010 | Ling |
| 7,848,282 B2 | 12/2010 | Padovani |
| 7,848,283 B2 | 12/2010 | Padovani |
| 7,848,284 B2 | 12/2010 | Padovani |
| 7,848,285 B2 | 12/2010 | Padovani |
| 7,848,298 B2 | 12/2010 | Attar |
| 7,869,387 B2 | 1/2011 | Black |
| 7,876,265 B2 | 1/2011 | Black |
| 7,890,144 B2 | 2/2011 | Subramaniam |
| 7,893,873 B2 | 2/2011 | Black |
| 7,903,615 B2 | 3/2011 | Gorokhov |
| 7,924,753 B2 | 4/2011 | Attar |
| 7,940,663 B2 | 5/2011 | Kadous |
| 7,948,959 B2 | 5/2011 | Wang |
| 7,953,062 B2 | 5/2011 | Sindhushayana |
| 7,961,592 B2 | 6/2011 | Black |
| 7,974,359 B2 | 7/2011 | Gorokhov |
| 7,995,531 B2 | 8/2011 | Padovani |
| 7,995,684 B2 | 8/2011 | Montojo |
| 8,005,042 B2 | 8/2011 | Padovani |
| 8,009,625 B2 | 8/2011 | Padovani |
| 8,010,113 B2 | 8/2011 | Black |
| 8,014,331 B2 | 9/2011 | Sarkar |
| 8,040,942 B2 | 10/2011 | Bhushan |
| 8,042,086 B2 | 10/2011 | Tseng |
| 8,050,198 B2 | 11/2011 | Bhushan |
| 8,073,068 B2 | 12/2011 | Kim |
| 8,077,654 B2 | 12/2011 | Sutivong |
| 8,077,655 B2 | 12/2011 | Padovani |
| 8,077,691 B2 | 12/2011 | Kadous |
| 8,085,678 B2 | 12/2011 | Spindola |
| 8,089,924 B2 | 1/2012 | Padovani |
| 8,094,623 B2 | 1/2012 | Attar |
| 8,094,740 B2 | 1/2012 | Bhushan |
| 8,098,635 B2 | 1/2012 | Montojo |
| 8,102,872 B2 | 1/2012 | Spindola |
| 8,107,517 B2 | 1/2012 | Naguib |
| 8,111,663 B2 | 2/2012 | Black |
| 8,116,283 B2 | 2/2012 | Black |
| 8,126,072 B2 | 2/2012 | Namgoong |
| 8,139,672 B2 | 3/2012 | Gore |
| 8,160,596 B2 | 4/2012 | Black |
| 8,165,619 B2 | 4/2012 | Attar |
| 8,175,594 B2 | 5/2012 | Attar |

(56) References Cited

U.S. PATENT DOCUMENTS

| | | |
|---|---|---|
| 8,189,540 B2 | 5/2012 | Padovani |
| 8,203,961 B2 | 6/2012 | Yavuz |
| 8,204,530 B2 | 6/2012 | Gorokhov |
| 8,213,390 B2 | 7/2012 | Black |
| 8,218,573 B2 | 7/2012 | Bhushan |
| 8,229,423 B2 | 7/2012 | Sarkar |
| 8,250,428 B2 | 8/2012 | Sun |
| 8,306,096 B2 | 11/2012 | Sampath |
| 8,311,027 B2 | 11/2012 | Padovani |
| 8,331,310 B2 | 12/2012 | Wang |
| 8,331,377 B2 | 12/2012 | Attar |
| 8,331,385 B2 | 12/2012 | Black |
| 8,331,892 B2 | 12/2012 | Kadous |
| 8,351,372 B2 | 1/2013 | Padovani |
| 8,351,456 B2 | 1/2013 | Kadous |
| 8,363,697 B2 | 1/2013 | Grob |
| 8,375,261 B2 | 2/2013 | Shi |
| 8,385,388 B2 | 2/2013 | Soriaga |
| 8,385,433 B2 | 2/2013 | Wang |
| 8,385,465 B2 | 2/2013 | Kadous |
| 8,385,923 B2 | 2/2013 | Attar |
| 8,391,196 B2 | 3/2013 | Gorokhov |
| 8,391,337 B2 | 3/2013 | Black |
| 8,391,413 B2 | 3/2013 | Mantravadi |
| 8,406,774 B2 | 3/2013 | Yavuz |
| 8,411,594 B2 | 4/2013 | Black |
| 8,412,227 B2 | 4/2013 | Edge |
| 8,416,756 B2 | 4/2013 | Bhushan |
| 8,443,255 B2 | 5/2013 | Jiang |
| 8,451,740 B2 | 5/2013 | Sampath |
| 8,451,776 B2 | 5/2013 | Dayal |
| 8,457,152 B2 | 6/2013 | Gorokhov |
| 8,462,859 B2 | 6/2013 | Sampath |
| 8,472,322 B2 | 6/2013 | Black |
| 8,472,877 B2 | 6/2013 | Hou |
| 8,483,223 B2 | 7/2013 | Black |
| 8,493,942 B2 | 7/2013 | Luo |
| 8,493,958 B2 | 7/2013 | Attar |
| 8,494,593 B2 | 7/2013 | Black |
| 8,498,192 B2 | 7/2013 | Bhushan |
| 8,503,360 B2 | 8/2013 | Hou |
| 8,514,988 B2 | 8/2013 | Wu |
| 8,537,875 B2 | 9/2013 | Soriaga |
| 8,576,760 B2 | 11/2013 | Gorokhov |
| 8,582,621 B2 | 11/2013 | Grob |
| 8,583,137 B2 | 11/2013 | Rezaiifar |
| 8,594,252 B2 | 11/2013 | Black |
| 8,605,729 B2 | 12/2013 | Dayal |
| 8,605,801 B2 | 12/2013 | Rezaiifar |
| 8,605,839 B2 | 12/2013 | Jiang |
| 8,611,303 B2 | 12/2013 | Rezaiifar |
| 8,611,305 B2 | 12/2013 | Black |
| 8,611,310 B2 | 12/2013 | Black |
| 8,611,325 B2 | 12/2013 | Black |
| 8,619,717 B2 | 12/2013 | Agrawal |
| 8,619,835 B2 | 12/2013 | Grob |
| 8,630,602 B2 | 1/2014 | Attar |
| 8,634,435 B2 | 1/2014 | Kadous |
| 8,634,438 B2 | 1/2014 | Nanda |
| 8,638,758 B2 | 1/2014 | Black |
| 8,639,190 B2 | 1/2014 | Gore |
| 8,640,012 B2 | 1/2014 | Ling |
| 8,654,705 B2 | 2/2014 | Wang |
| 8,654,715 B2 | 2/2014 | Wang |
| 8,655,400 B2 | 2/2014 | Kadous |
| 8,676,209 B2 | 3/2014 | Gorokhov |
| 8,700,083 B2 | 4/2014 | Yavuz |
| 8,712,461 B2 | 4/2014 | Yavuz |
| 8,724,545 B2 | 5/2014 | Dayal |
| 8,724,555 B2 | 5/2014 | Krishnan |
| 8,737,470 B2 | 5/2014 | Walker |
| 8,737,538 B2 | 5/2014 | Grob |
| 8,737,911 B2 | 5/2014 | Black |
| 8,743,909 B2 | 6/2014 | Black |
| 8,744,018 B2 | 6/2014 | Chen |
| 8,760,994 B2 | 6/2014 | Wang |
| 8,767,885 B2 | 7/2014 | Sampath |
| 8,773,308 B2 | 7/2014 | Black |
| 8,782,112 B2 | 7/2014 | Ling |
| 8,824,979 B2 | 9/2014 | Yavuz |
| 8,825,860 B2 | 9/2014 | Linsky |
| 8,830,934 B2 | 9/2014 | Banister |
| 8,839,079 B2 | 9/2014 | Chen |
| 8,842,693 B2 | 9/2014 | Agrawal |
| 8,848,607 B2 | 9/2014 | Wang |
| 8,854,944 B2 | 10/2014 | Jou |
| 8,855,001 B2 | 10/2014 | Gorokhov |
| 8,867,456 B2 | 10/2014 | Yavuz |
| 8,868,118 B2 | 10/2014 | Rezaiifar |
| 8,873,534 B2 | 10/2014 | Sindhushayana |
| 8,874,998 B2 | 10/2014 | Walker |
| 8,879,445 B2 | 11/2014 | Sadek |
| 8,885,744 B2 | 11/2014 | Kadous |
| 8,886,126 B2 | 11/2014 | Mantravadi |
| 8,886,239 B2 | 11/2014 | Dayal |
| 8,897,181 B2 | 11/2014 | Wang |
| 8,897,188 B2 | 11/2014 | Black |
| 8,897,220 B2 | 11/2014 | Kadous |
| 8,903,021 B2 | 12/2014 | Mantravadi |
| 8,908,496 B2 | 12/2014 | Kadous |
| 8,909,279 B2 | 12/2014 | Yavuz |
| 8,923,109 B2 | 12/2014 | Wang |
| 8,923,125 B2 | 12/2014 | Lott |
| 8,923,208 B2 | 12/2014 | Dayal |
| 8,929,908 B2 | 1/2015 | Agrawal |
| 8,948,095 B2 | 2/2015 | Black |
| 8,954,063 B2 | 2/2015 | Sarkar |
| 8,971,461 B2 | 3/2015 | Sampath |
| 8,971,823 B2 | 3/2015 | Gore |
| 8,971,884 B2 | 3/2015 | Ahluwalia |
| 8,982,832 B2 | 3/2015 | Ling |
| 8,983,480 B2 | 3/2015 | Rezaiifar |
| 8,995,417 B2 | 3/2015 | Jou |
| 9,001,735 B2 | 4/2015 | Padovani |
| 9,007,942 B2 | 4/2015 | Zhao |
| 9,014,152 B2 | 4/2015 | Jou |
| 9,020,009 B2 | 4/2015 | Barriac |
| 9,036,538 B2 | 5/2015 | Palanki |
| 9,055,545 B2 | 6/2015 | Black |
| 9,059,785 B2 | 6/2015 | Fertonani |
| 9,066,306 B2 | 6/2015 | Yavuz |
| 9,071,344 B2 | 6/2015 | Smee |
| 9,072,102 B2 | 6/2015 | Yavuz |
| 9,078,269 B2 | 7/2015 | Yavuz |
| 9,088,389 B2 | 7/2015 | Gorokhov |
| 9,106,287 B2 | 8/2015 | Wang |
| 9,113,488 B2 | 8/2015 | Oguz |
| 9,118,387 B2 | 8/2015 | Padovani |
| 9,119,026 B2 | 8/2015 | Black |
| 9,119,217 B2 | 8/2015 | Black |
| 9,124,344 B2 | 9/2015 | Padovani |
| 9,131,420 B2 | 9/2015 | Rezaiifar |
| 9,136,974 B2 | 9/2015 | Gorokhov |
| 9,137,806 B2 | 9/2015 | Yavuz |
| 9,143,957 B2 | 9/2015 | Sadek |
| 9,144,036 B2 | 9/2015 | Gorokhov |
| 9,144,084 B2 | 9/2015 | Sadek |
| 9,148,256 B2 | 9/2015 | Sampath |
| 9,154,179 B2 | 10/2015 | Gudem |
| 9,154,211 B2 | 10/2015 | Sampath |
| 9,155,106 B2 | 10/2015 | Krishnan |
| 9,161,232 B2 | 10/2015 | Linsky |
| 9,161,233 B2 | 10/2015 | Wang |
| 9,172,402 B2 | 10/2015 | Gudem |
| 9,172,453 B2 | 10/2015 | Wang |
| 9,179,319 B2 | 11/2015 | Gore |
| 9,184,870 B2 | 11/2015 | Sampath |
| 9,185,718 B2 | 11/2015 | Kadous |
| 9,185,720 B2 | 11/2015 | Mantravadi |
| 9,198,053 B2 | 11/2015 | Edge |
| 9,204,437 B2 | 12/2015 | Smee |
| 9,226,173 B2 | 12/2015 | Sadek |
| 9,246,560 B2 | 1/2016 | Sampath |
| 9,253,658 B2 | 2/2016 | Sadek |

(56) References Cited

U.S. PATENT DOCUMENTS

| | | |
|---|---|---|
| 9,277,564 B2 | 3/2016 | Wang |
| 9,282,462 B2 | 3/2016 | Dayal |
| 9,288,814 B2 | 3/2016 | Yavuz |
| 9,307,544 B2 | 4/2016 | Gore |
| 9,344,973 B2 | 5/2016 | Yavuz |
| 9,363,764 B2 | 6/2016 | Black |
| 9,374,791 B2 | 6/2016 | Yavuz |
| 9,398,602 B2 | 7/2016 | Kadous |
| 9,408,165 B2 | 8/2016 | Jou |
| 9,408,220 B2 | 8/2016 | Gore |
| 9,419,751 B2 | 8/2016 | Sindhushayana |
| 9,451,480 B2 | 9/2016 | Huang |
| 9,461,736 B2 | 10/2016 | Bhushan |
| 9,474,075 B2 | 10/2016 | Yavuz |
| 9,491,722 B2 | 11/2016 | Yavuz |
| 9,525,477 B1 | 12/2016 | Wu |
| 9,538,537 B1 * | 1/2017 | Cui ................. H04L 27/2676 |
| 9,578,649 B2 | 2/2017 | Dayal |
| 9,585,150 B2 | 2/2017 | Marsh |
| 9,585,156 B2 | 2/2017 | Bhattad |
| 9,628,311 B2 | 4/2017 | Bertrand et al. |
| 9,660,776 B2 | 5/2017 | Kadous |
| 9,673,948 B2 | 6/2017 | Jiang |
| 9,730,227 B2 | 8/2017 | Marsh |
| 9,750,014 B2 | 8/2017 | Sadek |
| 9,781,693 B2 | 10/2017 | Ji |
| 9,788,361 B2 | 10/2017 | Valliappan |
| 9,814,040 B2 | 11/2017 | Bhushan |
| 9,814,058 B2 | 11/2017 | Jiang |
| 9,825,798 B1 | 11/2017 | Sun |
| 9,832,785 B2 | 11/2017 | Kadous |
| 9,847,862 B2 | 12/2017 | Soriaga |
| 9,860,033 B2 | 1/2018 | Kadous |
| 9,867,194 B2 | 1/2018 | Kadous |
| 9,893,800 B2 | 2/2018 | Wu |
| 9,894,701 B2 | 2/2018 | Ang |
| 9,900,856 B2 | 2/2018 | Wu |
| 9,924,368 B2 | 3/2018 | Valliappan |
| 9,929,812 B2 | 3/2018 | Manolakos |
| 9,936,400 B2 | 4/2018 | Lee |
| 9,936,469 B2 | 4/2018 | Ji |
| 9,936,498 B2 | 4/2018 | Azarian Yazdi |
| 9,936,519 B2 | 4/2018 | Mukkavilli |
| 9,954,668 B2 | 4/2018 | Lee |
| 9,955,365 B2 | 4/2018 | Lin |
| 9,955,476 B2 | 4/2018 | Black |
| 9,955,497 B2 | 4/2018 | Jiang |
| 9,967,070 B2 | 5/2018 | Jiang |
| 9,974,093 B2 | 5/2018 | Lin |
| 9,979,450 B2 | 5/2018 | Jiang |
| 9,980,271 B2 | 5/2018 | Soriaga |
| 9,985,802 B2 | 5/2018 | Jiang |
| 9,991,986 B2 | 6/2018 | Sindhushayana |
| 9,992,790 B2 | 6/2018 | Jiang |
| 10,009,160 B2 | 6/2018 | Jiang |
| 10,009,912 B2 | 6/2018 | Abraham |
| 10,027,462 B2 | 7/2018 | Jiang |
| 10,028,240 B2 | 7/2018 | Ji |
| 10,033,577 B2 | 7/2018 | Soriaga |
| 10,033,578 B2 | 7/2018 | Soriaga |
| 10,038,528 B2 | 7/2018 | Jiang |
| 10,038,544 B2 | 7/2018 | Zeng |
| 10,044,438 B2 | 8/2018 | Kadous |
| 10,044,459 B2 | 8/2018 | Chendamarai Kannan |
| 10,057,019 B2 | 8/2018 | Jiang |
| 10,075,187 B2 | 9/2018 | Jiang |
| 10,075,194 B2 | 9/2018 | Lin |
| 10,075,271 B2 | 9/2018 | Soriaga |
| 10,075,313 B2 | 9/2018 | Black |
| 10,075,970 B2 | 9/2018 | Jiang |
| 10,080,214 B2 | 9/2018 | Lin |
| 10,084,563 B2 | 9/2018 | Park |
| 10,084,578 B2 | 9/2018 | Azarian Yazdi |
| 10,091,789 B2 | 10/2018 | Valliappan |
| 10,091,810 B2 | 10/2018 | Zeng |
| 10,097,260 B2 | 10/2018 | Hosseini |
| 10,098,059 B2 | 10/2018 | Ly |
| 10,104,616 B2 | 10/2018 | Ang |
| 10,104,624 B2 | 10/2018 | Sundararajan |
| 10,122,559 B2 | 11/2018 | Manolakos |
| 10,123,219 B2 | 11/2018 | Bhushan |
| 10,135,591 B2 | 11/2018 | Chen |
| 10,141,991 B2 | 11/2018 | Jiang |
| 10,142,060 B2 | 11/2018 | Xu |
| 10,159,097 B2 | 12/2018 | Ji |
| 10,177,826 B2 | 1/2019 | Manolakos |
| 10,178,649 B2 | 1/2019 | Liu |
| 10,182,404 B2 | 1/2019 | Prakash |
| 10,182,426 B2 | 1/2019 | Ji |
| 10,200,140 B2 | 2/2019 | Li |
| 10,200,994 B2 | 2/2019 | Park |
| 10,201,014 B2 | 2/2019 | Kadous |
| 10,205,618 B2 | 2/2019 | Wang |
| 10,218,406 B2 | 2/2019 | Liu |
| 10,219,235 B2 | 2/2019 | Patel |
| 10,219,252 B2 | 2/2019 | Chendamarai Kannan |
| 10,219,300 B2 | 2/2019 | Gorokhov |
| 10,224,966 B2 | 3/2019 | Li |
| 10,225,065 B2 | 3/2019 | Ang |
| 10,225,818 B2 | 3/2019 | Liu |
| 10,230,502 B2 | 3/2019 | Ji |
| 10,231,259 B2 | 3/2019 | Lin |
| 10,237,030 B2 | 3/2019 | Azarian Yazdi |
| 10,237,037 B2 | 3/2019 | Jiang |
| 10,237,889 B2 | 3/2019 | Sundararajan |
| 10,257,844 B2 | 4/2019 | Yang |
| 10,257,848 B2 | 4/2019 | Sun |
| 10,257,851 B2 | 4/2019 | Patel |
| 10,263,745 B2 | 4/2019 | Soriaga |
| 10,263,754 B2 | 4/2019 | Lin |
| 10,264,541 B2 | 4/2019 | Patel |
| 10,270,562 B2 | 4/2019 | Yang |
| 10,278,177 B2 | 4/2019 | Sadek |
| 10,285,189 B2 | 5/2019 | Sundararajan |
| 10,291,372 B2 | 5/2019 | Azarian Yazdi |
| 10,291,379 B2 | 5/2019 | Kadous |
| 10,292,093 B2 | 5/2019 | Chendamarai Kannan |
| 10,298,289 B2 | 5/2019 | Yerramalli |
| 10,298,434 B2 | 5/2019 | Manolakos |
| 10,299,284 B2 | 5/2019 | Sadek |
| 10,313,160 B2 | 6/2019 | Jiang |
| 10,314,065 B2 | 6/2019 | Yang |
| 10,320,428 B2 | 6/2019 | Sarkis |
| 10,327,241 B2 | 6/2019 | Kadous |
| 10,327,261 B2 | 6/2019 | Naghshvar |
| 10,333,752 B2 | 6/2019 | Jiang |
| 10,334,546 B2 | 6/2019 | Chendamarai Kannan |
| 10,334,594 B2 | 6/2019 | Sundararajan |
| 10,341,976 B2 | 7/2019 | Ji |
| 10,342,012 B2 | 7/2019 | Mukkavilli |
| 10,348,329 B2 | 7/2019 | Soriaga |
| 10,349,404 B2 | 7/2019 | Chendamarai Kannan |
| 10,355,803 B2 | 7/2019 | Manolakos |
| 10,356,800 B2 | 7/2019 | Manolakos |
| 10,356,811 B2 | 7/2019 | Luo |
| 10,356,816 B2 | 7/2019 | Valliappan |
| 10,362,574 B2 | 7/2019 | Chendamarai Kannan |
| 10,367,621 B2 | 7/2019 | Jiang |
| 10,368,301 B2 | 7/2019 | Chendamarai Kannan |
| 10,368,305 B2 | 7/2019 | Radulescu |
| 10,368,348 B2 | 7/2019 | Chendamarai Kannan |
| 10,368,372 B2 | 7/2019 | Chendamarai Kannan |
| 10,374,777 B2 | 8/2019 | Kadous |
| 10,375,711 B2 | 8/2019 | Sadek |
| 10,375,718 B2 | 8/2019 | Manolakos |
| 10,382,177 B2 | 8/2019 | Jiang |
| 10,382,233 B2 | 8/2019 | Abdelghaffar |
| 10,389,503 B2 | 8/2019 | Soriaga |
| 10,389,504 B2 | 8/2019 | Soriaga |
| 10,390,361 B2 | 8/2019 | Mukkavilli |
| 10,390,362 B2 | 8/2019 | Gupta |
| 10,396,962 B2 | 8/2019 | Li |
| 10,404,332 B2 | 9/2019 | Ji |
| 10,404,340 B2 | 9/2019 | Manolakos |

(56) References Cited

U.S. PATENT DOCUMENTS

| | | | |
|---|---|---|---|
| 10,404,434 | B2 | 9/2019 | Kannan |
| 10,404,509 | B2 | 9/2019 | Sun |
| 10,405,228 | B2 | 9/2019 | Liu |
| 10,405,242 | B2 | 9/2019 | Kadous |
| 10,405,262 | B2 | 9/2019 | Chendamarai Kannan |
| 10,405,278 | B2 | 9/2019 | Ang |
| 10,405,335 | B2 | 9/2019 | Barghi |
| 10,411,782 | B2 | 9/2019 | Namgoong |
| 10,411,795 | B2 | 9/2019 | Liu |
| 10,412,632 | B2 | 9/2019 | Li |
| 10,412,719 | B2 | 9/2019 | Chen |
| 10,412,733 | B2 | 9/2019 | Sun |
| 10,419,171 | B2 | 9/2019 | Park |
| 10,419,244 | B2 | 9/2019 | Jiang |
| 10,425,824 | B2 | 9/2019 | Li |
| 10,425,923 | B2 | 9/2019 | Wang |
| 10,425,945 | B2 | 9/2019 | Sun |
| 10,432,357 | B2 | 10/2019 | Yang |
| 10,433,179 | B2 | 10/2019 | Zhang |
| 10,440,657 | B2 | 10/2019 | Sundararajan |
| 10,440,726 | B2 | 10/2019 | Jiang |
| 10,440,729 | B2 | 10/2019 | Li |
| 10,447,426 | B2 | 10/2019 | Sundararajan |
| 10,447,447 | B2 | 10/2019 | Namgoong |
| 10,448,296 | B2 | 10/2019 | Radulescu |
| 10,448,380 | B2 | 10/2019 | Islam |
| 10,454,541 | B2 | 10/2019 | Sundararajan |
| 10,454,569 | B2 | 10/2019 | Wu |
| 10,455,457 | B2 | 10/2019 | Sadek |
| 10,461,797 | B2 | 10/2019 | Liu |
| 10,461,889 | B2 | 10/2019 | Park |
| 10,461,891 | B2 | 10/2019 | Park |
| 10,461,976 | B2 | 10/2019 | Chen |
| 10,469,203 | B2 | 11/2019 | Sankar |
| 10,476,627 | B2 | 11/2019 | Bhushan |
| 10,476,641 | B2 | 11/2019 | Yang |
| 10,476,650 | B2 | 11/2019 | Yang |
| 10,476,781 | B2 | 11/2019 | Luo |
| 10,477,437 | B2 | 11/2019 | Zhang |
| 10,477,466 | B2 | 11/2019 | Ly |
| 10,477,526 | B2 | 11/2019 | Chendamarai Kannan |
| 10,484,054 | B2 | 11/2019 | Sundararajan |
| 10,484,129 | B2 | 11/2019 | Jiang |
| 10,484,135 | B2 | 11/2019 | Mallik |
| 10,484,146 | B2 | 11/2019 | Sun |
| 10,484,878 | B2 | 11/2019 | Patel |
| 10,484,934 | B2 | 11/2019 | Malik |
| 10,484,935 | B2 | 11/2019 | Li |
| 10,484,954 | B2 | 11/2019 | Liu |
| 10,484,959 | B2 | 11/2019 | Liu |
| 10,484,972 | B2 | 11/2019 | Lin |
| 10,484,992 | B2 | 11/2019 | Sadek |
| 10,485,016 | B2 | 11/2019 | Zeng |
| 10,492,181 | B2 | 11/2019 | Jiang |
| 10,498,503 | B2 | 12/2019 | Tavildar |
| 10,499,393 | B2 | 12/2019 | Mukkavilli |
| 10,505,701 | B2 | 12/2019 | Ang |
| 10,506,629 | B2 | 12/2019 | Sun |
| 10,511,399 | B2 | 12/2019 | Sun |
| 10,511,987 | B2 | 12/2019 | Liu |
| 10,512,098 | B2 | 12/2019 | Jiang |
| 10,516,618 | B2 | 12/2019 | Barghi |
| 10,523,300 | B2 | 12/2019 | Malik |
| 10,523,369 | B2 | 12/2019 | Yang |
| 10,524,257 | B2 | 12/2019 | Li |
| 10,524,259 | B2 | 12/2019 | Azarian Yazdi |
| 10,524,278 | B2 | 12/2019 | Abraham |
| 10,536,966 | B2 | 1/2020 | Liu |
| 10,541,780 | B2 | 1/2020 | Mukkavilli |
| 10,541,791 | B2 | 1/2020 | Ji |
| 10,541,851 | B2 | 1/2020 | Malik |
| 10,542,436 | B2 | 1/2020 | Liu |
| 10,542,541 | B2 | 1/2020 | Valliappan |
| 10,542,543 | B2 | 1/2020 | Yerramalli |
| 10,547,402 | B2 | 1/2020 | Li |
| 10,547,415 | B2 | 1/2020 | Jiang |
| 10,547,422 | B2 | 1/2020 | Yoo |
| 10,547,494 | B2 | 1/2020 | Liu |
| 10,548,020 | B2 | 1/2020 | Khoshnevisan |
| 10,548,131 | B2 | 1/2020 | Yerramalli |
| 10,548,144 | B2 | 1/2020 | Soriaga |
| 10,548,153 | B2 | 1/2020 | Akkarakaran |
| 10,548,155 | B2 | 1/2020 | Manolakos |
| 10,554,462 | B2 | 2/2020 | Yang |
| 10,554,539 | B2 | 2/2020 | Luo |
| 10,554,540 | B2 | 2/2020 | Luo |
| 10,555,203 | B2 | 2/2020 | Malik |
| 10,555,210 | B2 | 2/2020 | Sun |
| 10,560,304 | B2 | 2/2020 | Lei |
| 10,567,118 | B2 | 2/2020 | Yang |
| 10,568,128 | B2 | 2/2020 | Li |
| 10,574,565 | B2 | 2/2020 | Luo |
| 10,575,185 | B2 | 2/2020 | Li |
| 10,575,229 | B2 | 2/2020 | Wu |
| 10,581,572 | B2 | 3/2020 | Chendamarai Kannan |
| 10,581,722 | B2 | 3/2020 | Luo |
| 10,582,458 | B2 | 3/2020 | Sadek |
| 10,587,497 | B2 | 3/2020 | Luo |
| 10,594,532 | B2 | 3/2020 | Wang |
| 10,595,225 | B2 | 3/2020 | John Wilson |
| 10,595,302 | B2 | 3/2020 | Mukkavilli |
| 10,595,327 | B2 | 3/2020 | Sadek |
| 10,595,332 | B2 | 3/2020 | Jiang |
| 10,595,342 | B2 | 3/2020 | Islam |
| 10,602,515 | B2 | 3/2020 | Ly |
| 10,602,543 | B2 | 3/2020 | Sun |
| 10,608,785 | B2 | 3/2020 | Wang |
| 10,609,660 | B2 | 3/2020 | Liu |
| 10,615,825 | B2 | 4/2020 | Sarkis |
| 10,616,737 | B2 | 4/2020 | Liu |
| 10,616,912 | B2 | 4/2020 | Chendamarai Kannan |
| 10,616,914 | B2 | 4/2020 | Manolakos |
| 10,623,138 | B2 | 4/2020 | Yang |
| 10,623,163 | B2 | 4/2020 | Sun |
| 10,623,208 | B2 | 4/2020 | Jiang |
| 10,624,079 | B2 | 4/2020 | Xu |
| 10,630,450 | B2 | 4/2020 | Sun |
| 10,631,323 | B2 | 4/2020 | Zeng |
| 2002/0097785 | A1 | 7/2002 | Ling et al. |
| 2004/0110525 | A1 | 6/2004 | Black |
| 2004/0121730 | A1 | 6/2004 | Kadous |
| 2006/0119356 | A1 | 6/2006 | Rabe |
| 2006/0203794 | A1 | 9/2006 | Sampath |
| 2006/0274844 | A1 | 12/2006 | Walton et al. |
| 2007/0041457 | A1 | 2/2007 | Kadous |
| 2007/0066232 | A1 | 3/2007 | Black |
| 2007/0071147 | A1 | 3/2007 | Sampath |
| 2007/0165738 | A1 | 7/2007 | Barriac |
| 2008/0025241 | A1 | 1/2008 | Bhushan |
| 2008/0032740 | A1 | 2/2008 | Joshi |
| 2008/0112495 | A1 | 5/2008 | Gore |
| 2008/0130714 | A1 | 6/2008 | Wilborn et al. |
| 2009/0080499 | A1 | 3/2009 | Yavuz |
| 2009/0135754 | A1 | 5/2009 | Yavuz |
| 2009/0163209 | A1 | 6/2009 | Black |
| 2009/0271686 | A1 | 10/2009 | Jiang |
| 2010/0003931 | A1 | 1/2010 | Krishnan |
| 2010/0046497 | A1 | 2/2010 | Jalali |
| 2010/0067422 | A1 | 3/2010 | Kadous |
| 2010/0153488 | A1 | 6/2010 | Mittal |
| 2010/0215022 | A1 | 8/2010 | Black |
| 2010/0232338 | A1 | 9/2010 | Krishnamoorthi |
| 2010/0251069 | A1 | 9/2010 | Sun |
| 2011/0007680 | A1 | 1/2011 | Kadous |
| 2011/0007688 | A1 | 1/2011 | Veeravalli |
| 2011/0222423 | A1 | 9/2011 | Spindola |
| 2011/0235515 | A1 | 9/2011 | Dreyfus |
| 2011/0256834 | A1 | 10/2011 | Dayal |
| 2011/0310858 | A1 | 12/2011 | Tokgoz |
| 2012/0077532 | A1 | 3/2012 | Kadous |
| 2012/0113906 | A1 | 5/2012 | Kadous |
| 2012/0127870 | A1 | 5/2012 | Zhao |
| 2012/0127923 | A1 | 5/2012 | Zhao |
| 2012/0140798 | A1 | 6/2012 | Kadous |

(56) References Cited

U.S. PATENT DOCUMENTS

| | | |
|---|---|---|
| 2012/0182857 A1* | 7/2012 | Bertrand ............ H04J 13/0062 370/210 |
| 2012/0213303 A1 | 8/2012 | Kadous |
| 2012/0328055 A1* | 12/2012 | Yokote ................ H04L 25/0224 375/340 |
| 2013/0229961 A1 | 9/2013 | Ma |
| 2013/0266093 A1* | 10/2013 | Lindoff ............... H04L 27/2649 375/340 |
| 2014/0029705 A1 | 1/2014 | Wu |
| 2014/0038645 A1 | 2/2014 | Wu |
| 2014/0071894 A1 | 3/2014 | Kairouz |
| 2014/0079155 A1 | 3/2014 | Wang |
| 2014/0112267 A1 | 4/2014 | Chen |
| 2014/0133319 A1 | 5/2014 | Chen |
| 2014/0219117 A1 | 8/2014 | Meshkati |
| 2014/0219243 A1 | 8/2014 | Meshkati |
| 2014/0269616 A1 | 9/2014 | Black |
| 2014/0273884 A1 | 9/2014 | Mantravadi |
| 2015/0063150 A1 | 3/2015 | Sadek |
| 2015/0063151 A1 | 3/2015 | Sadek |
| 2015/0063323 A1 | 3/2015 | Sadek |
| 2015/0085686 A1 | 3/2015 | Chande |
| 2015/0139015 A1 | 5/2015 | Kadous |
| 2015/0163823 A1 | 6/2015 | Sadek |
| 2015/0280803 A1 | 10/2015 | Chen |
| 2015/0282077 A1 | 10/2015 | Yavuz |
| 2015/0319702 A1 | 11/2015 | Patel |
| 2015/0350919 A1 | 12/2015 | Patel |
| 2016/0014619 A1 | 1/2016 | Kang |
| 2016/0088625 A1 | 3/2016 | Kadous |
| 2016/0095039 A1 | 3/2016 | Valliappan |
| 2016/0095040 A1 | 3/2016 | Valliappan |
| 2016/0128045 A1 | 5/2016 | Azarian Yazdi |
| 2016/0128130 A1 | 5/2016 | Sadek |
| 2016/0270046 A1 | 9/2016 | Lin |
| 2016/0295557 A1 | 10/2016 | Azarian Yazdi |
| 2016/0352481 A1 | 12/2016 | Jiang |
| 2016/0353482 A1 | 12/2016 | Valliappan |
| 2017/0005741 A1 | 1/2017 | Wu |
| 2017/0019814 A1 | 1/2017 | Determan |
| 2017/0027017 A1 | 1/2017 | Black |
| 2017/0141798 A1 | 5/2017 | Kudekar |
| 2017/0142705 A1 | 5/2017 | Chendamarai Kannan |
| 2017/0149543 A1 | 5/2017 | Ang |
| 2017/0150486 A1 | 5/2017 | Ang |
| 2017/0171855 A1 | 6/2017 | Sundararajan |
| 2017/0171879 A1 | 6/2017 | Jiang |
| 2017/0207884 A1 | 7/2017 | Jiang |
| 2017/0222771 A1 | 8/2017 | Chendamarai Kannan |
| 2017/0272224 A1 | 9/2017 | Ang |
| 2017/0279545 A1* | 9/2017 | Margulis ................ H04B 17/11 |
| 2017/0311346 A1 | 10/2017 | Chendamarai Kannan |
| 2017/0318563 A1 | 11/2017 | Yang |
| 2017/0332288 A1 | 11/2017 | Sadek |
| 2017/0338996 A1 | 11/2017 | Sankar |
| 2017/0359146 A1 | 12/2017 | Yang |
| 2017/0359714 A1 | 12/2017 | Gupta |
| 2018/0019766 A1 | 1/2018 | Yang |
| 2018/0026740 A1 | 1/2018 | Chen |
| 2018/0026764 A1 | 1/2018 | Namgoong |
| 2018/0035423 A1 | 2/2018 | Wang |
| 2018/0035455 A1 | 2/2018 | Xu |
| 2018/0042018 A1 | 2/2018 | Bhushan |
| 2018/0042030 A1 | 2/2018 | Xu |
| 2018/0049097 A1 | 2/2018 | Chen |
| 2018/0054269 A1* | 2/2018 | Cui ....................... H04L 27/265 |
| 2018/0054348 A1 | 2/2018 | Luo |
| 2018/0054780 A1 | 2/2018 | Radulescu |
| 2018/0062810 A1 | 3/2018 | Vitthaladevuni |
| 2018/0083824 A1 | 3/2018 | Yang |
| 2018/0091350 A1* | 3/2018 | Akkarakaran ........ H04L 5/0053 |
| 2018/0091373 A1 | 3/2018 | Manolakos |
| 2018/0092002 A1 | 3/2018 | Manolakos |
| 2018/0092081 A1 | 3/2018 | Chen |
| 2018/0097534 A1 | 4/2018 | Manolakos |
| 2018/0098293 A1 | 4/2018 | Jiang |
| 2018/0098307 A1 | 4/2018 | Yang |
| 2018/0098316 A1 | 4/2018 | Wang |
| 2018/0103428 A1 | 4/2018 | Jiang |
| 2018/0103485 A1 | 4/2018 | Jiang |
| 2018/0109406 A1 | 4/2018 | Wang |
| 2018/0110048 A1 | 4/2018 | Ang |
| 2018/0115973 A1 | 4/2018 | Black |
| 2018/0124753 A1 | 5/2018 | Sun |
| 2018/0124777 A1 | 5/2018 | Yerramalli |
| 2018/0124789 A1 | 5/2018 | Yerramalli |
| 2018/0132223 A1 | 5/2018 | Sankar |
| 2018/0139618 A1 | 5/2018 | Yerramalli |
| 2018/0139758 A1 | 5/2018 | Sankar |
| 2018/0160328 A1 | 6/2018 | Chendamarai Kannan |
| 2018/0160389 A1 | 6/2018 | Yerramalli |
| 2018/0167848 A1 | 6/2018 | Lei |
| 2018/0176922 A1 | 6/2018 | Li |
| 2018/0176946 A1 | 6/2018 | Sun |
| 2018/0191470 A1 | 7/2018 | Manolakos |
| 2018/0198560 A1 | 7/2018 | Jiang |
| 2018/0198645 A1* | 7/2018 | Wang .................... H04W 72/12 |
| 2018/0220428 A1 | 8/2018 | Sun |
| 2018/0227011 A1 | 8/2018 | Yerramalli |
| 2018/0227771 A1 | 8/2018 | Malik |
| 2018/0227797 A1 | 8/2018 | Liu |
| 2018/0227936 A1 | 8/2018 | Yerramalli |
| 2018/0227944 A1 | 8/2018 | Yerramalli |
| 2018/0234880 A1 | 8/2018 | Jiang |
| 2018/0234881 A1 | 8/2018 | Hosseini |
| 2018/0234968 A1 | 8/2018 | Sun |
| 2018/0234993 A1 | 8/2018 | Hosseini |
| 2018/0241494 A1 | 8/2018 | Chendamarai Kannan |
| 2018/0242348 A1 | 8/2018 | Chendamarai Kannan |
| 2018/0249486 A1 | 8/2018 | Hosseini |
| 2018/0249496 A1 | 8/2018 | Radulescu |
| 2018/0255584 A1 | 9/2018 | Sun |
| 2018/0262311 A1 | 9/2018 | Wang |
| 2018/0262317 A1 | 9/2018 | Jiang |
| 2018/0269898 A1 | 9/2018 | Sun |
| 2018/0270022 A1 | 9/2018 | Sun |
| 2018/0270023 A1 | 9/2018 | Jiang |
| 2018/0270816 A1 | 9/2018 | Li |
| 2018/0279134 A1 | 9/2018 | Malik |
| 2018/0279292 A1 | 9/2018 | Luo |
| 2018/0279298 A1 | 9/2018 | Wang |
| 2018/0287744 A1 | 10/2018 | Sundararajan |
| 2018/0287745 A1 | 10/2018 | Sun |
| 2018/0287840 A1 | 10/2018 | Akkarakaran |
| 2018/0287870 A1 | 10/2018 | Yerramalli |
| 2018/0288747 A1 | 10/2018 | Sun |
| 2018/0288749 A1 | 10/2018 | Sun |
| 2018/0302186 A1 | 10/2018 | Reddy |
| 2018/0310262 A1 | 10/2018 | Ly |
| 2018/0310341 A1 | 10/2018 | Yerramalli |
| 2018/0323943 A1 | 11/2018 | Jiang |
| 2018/0324676 A1 | 11/2018 | Huang |
| 2018/0324713 A1 | 11/2018 | Yoo |
| 2018/0331693 A1 | 11/2018 | Lou |
| 2018/0343676 A1 | 11/2018 | Yerramalli |
| 2018/0352563 A1 | 12/2018 | Liu |
| 2018/0367245 A1 | 12/2018 | Soriaga |
| 2018/0367362 A1 | 12/2018 | Sun |
| 2018/0368089 A1 | 12/2018 | Yerramalli |
| 2018/0375612 A1 | 12/2018 | Sarkis |
| 2018/0375629 A1 | 12/2018 | Lee |
| 2018/0376392 A1 | 12/2018 | Wu |
| 2019/0007946 A1 | 1/2019 | Yerramalli |
| 2019/0007956 A1 | 1/2019 | Jiang |
| 2019/0014481 A1 | 1/2019 | Yerramalli |
| 2019/0014507 A1 | 1/2019 | Zhang |
| 2019/0014589 A1 | 1/2019 | Yerramalli |
| 2019/0020424 A1 | 1/2019 | Yerramalli |
| 2019/0020461 A1 | 1/2019 | Yerramalli |
| 2019/0020522 A1 | 1/2019 | Sun |
| 2019/0020528 A1 | 1/2019 | Lei |
| 2019/0020529 A1 | 1/2019 | Lei |
| 2019/0021080 A1 | 1/2019 | Lei |
| 2019/0021097 A1 | 1/2019 | Li |

(56) References Cited

U.S. PATENT DOCUMENTS

| | | |
|---|---|---|
| 2019/0028119 A1 | 1/2019 | Yang |
| 2019/0028999 A1 | 1/2019 | Yerramalli |
| 2019/0029019 A1 | 1/2019 | Zhang |
| 2019/0036663 A1 | 1/2019 | Azarian Yazdi |
| 2019/0037427 A1 | 1/2019 | Yerramalli |
| 2019/0037481 A1 | 1/2019 | Zhang |
| 2019/0037482 A1 | 1/2019 | Damnjanovic |
| 2019/0037603 A1 | 1/2019 | Damnjanovic |
| 2019/0044540 A1 | 2/2019 | Jiang |
| 2019/0044777 A1 | 2/2019 | Manolakos |
| 2019/0052400 A1 | 2/2019 | Soriaga |
| 2019/0053255 A1 | 2/2019 | Li |
| 2019/0053266 A1 | 2/2019 | Jiang |
| 2019/0053269 A1 | 2/2019 | Lei |
| 2019/0058553 A1 | 2/2019 | Sun |
| 2019/0059001 A1 | 2/2019 | Yerramalli |
| 2019/0059102 A1 | 2/2019 | Yerramalli |
| 2019/0068335 A1 | 2/2019 | Li |
| 2019/0068345 A1 | 2/2019 | Chen |
| 2019/0069325 A1 | 2/2019 | Yerramalli |
| 2019/0075597 A1 | 3/2019 | Yerramalli |
| 2019/0081768 A1 | 3/2019 | Zhang |
| 2019/0082333 A1 | 3/2019 | Malik |
| 2019/0089489 A1 | 3/2019 | Li |
| 2019/0089504 A1 * | 3/2019 | Hwang ............ H04L 5/0007 |
| 2019/0090178 A1 | 3/2019 | Liu |
| 2019/0090256 A1 | 3/2019 | Liu |
| 2019/0090273 A1 | 3/2019 | Yoo |
| 2019/0098654 A1 | 3/2019 | Li |
| 2019/0098663 A1 | 3/2019 | Zhang |
| 2019/0103928 A1 | 4/2019 | Nagaraja |
| 2019/0104416 A1 | 4/2019 | Yerramalli |
| 2019/0104514 A1 | 4/2019 | Chendamarai Kannan |
| 2019/0104542 A1 | 4/2019 | Chendamarai Kannan |
| 2019/0104546 A1 | 4/2019 | Chendamarai Kannan |
| 2019/0110208 A1 | 4/2019 | Xue |
| 2019/0110254 A1 | 4/2019 | Yerramalli |
| 2019/0110302 A1 | 4/2019 | Zhang |
| 2019/0110317 A1 | 4/2019 | Zhang |
| 2019/0116585 A1 | 4/2019 | Chakraborty |
| 2019/0116599 A1 | 4/2019 | Xue |
| 2019/0124595 A1 | 4/2019 | Lei |
| 2019/0124613 A1 | 4/2019 | Liu |
| 2019/0124630 A1 | 4/2019 | Ji |
| 2019/0124663 A1 | 4/2019 | Liu |
| 2019/0124694 A1 | 4/2019 | Chendamarai Kannan |
| 2019/0124700 A1 | 4/2019 | Ji |
| 2019/0132817 A1 | 5/2019 | Liu |
| 2019/0141707 A1 | 5/2019 | Yerramalli |
| 2019/0141723 A1 | 5/2019 | Zhang |
| 2019/0141734 A1 | 5/2019 | Lei |
| 2019/0141744 A1 | 5/2019 | Naghshvar |
| 2019/0141783 A1 | 5/2019 | Malik |
| 2019/0149190 A1 | 5/2019 | Liu |
| 2019/0149364 A1 | 5/2019 | Sundararajan |
| 2019/0150088 A1 | 5/2019 | Sun |
| 2019/0150120 A1 | 5/2019 | Sarkis |
| 2019/0150179 A1 | 5/2019 | Soriaga |
| 2019/0150198 A1 | 5/2019 | Sun |
| 2019/0158221 A1 | 5/2019 | Sarkis |
| 2019/0158227 A1 | 5/2019 | Gupta |
| 2019/0158240 A1 | 5/2019 | Li |
| 2019/0158251 A1 | 5/2019 | Park |
| 2019/0158252 A1 | 5/2019 | Li |
| 2019/0158333 A1 | 5/2019 | Zhang |
| 2019/0159202 A1 | 5/2019 | Lee |
| 2019/0159280 A1 | 5/2019 | Chakraborty |
| 2019/0165902 A1 | 5/2019 | Li |
| 2019/0165982 A1 | 5/2019 | Gaal |
| 2019/0166589 A1 | 5/2019 | Yang |
| 2019/0166621 A1 | 5/2019 | Yerramalli |
| 2019/0166625 A1 | 5/2019 | Nam |
| 2019/0173521 A1 | 6/2019 | Liu |
| 2019/0173611 A1 | 6/2019 | Liu |
| 2019/0173619 A1 | 6/2019 | Li |
| 2019/0174518 A1 | 6/2019 | Jiang |
| 2019/0174542 A1 | 6/2019 | Lei |
| 2019/0181979 A1 | 6/2019 | Wang |
| 2019/0181995 A1 | 6/2019 | Liu |
| 2019/0182826 A1 | 6/2019 | Yerramalli |
| 2019/0182845 A1 | 6/2019 | Xue |
| 2019/0190668 A1 | 6/2019 | Lei |
| 2019/0190681 A1 | 6/2019 | Li |
| 2019/0207723 A1 | 7/2019 | Lei |
| 2019/0222342 A1 | 7/2019 | Park |
| 2019/0222343 A1 | 7/2019 | Park |
| 2019/0223184 A1 | 7/2019 | Sarkis |
| 2019/0223215 A1 | 7/2019 | Tian |
| 2019/0229788 A1 | 7/2019 | Zhang |
| 2019/0230697 A1 | 7/2019 | Yang |
| 2019/0238177 A1 | 8/2019 | Liu |
| 2019/0238196 A1 | 8/2019 | Lei |
| 2019/0238219 A1 | 8/2019 | Liu |
| 2019/0238284 A1 | 8/2019 | Liu |
| 2019/0239202 A1 | 8/2019 | Bhattad |
| 2019/0245560 A1 | 8/2019 | Yang |
| 2019/0245658 A1 | 8/2019 | Yang |
| 2019/0246410 A1 | 8/2019 | Zhang |
| 2019/0246419 A1 | 8/2019 | Sun |
| 2019/0246425 A1 | 8/2019 | Zhang |
| 2019/0253219 A1 | 8/2019 | Fan |
| 2019/0253232 A1 | 8/2019 | Park |
| 2019/0254081 A1 | 8/2019 | Li |
| 2019/0260451 A1 | 8/2019 | Sarkis |
| 2019/0260621 A1 * | 8/2019 | Liu ............ H04L 27/26 |
| 2019/0261323 A1 | 8/2019 | Lee |
| 2019/0261354 A1 | 8/2019 | Fakoorian |
| 2019/0268059 A1 | 8/2019 | Yang |
| 2019/0268127 A1 | 8/2019 | Hosseini |
| 2019/0268129 A1 | 8/2019 | Lin |
| 2019/0268206 A1 | 8/2019 | Yang |
| 2019/0268907 A1 | 8/2019 | Bhattad |
| 2019/0268923 A1 | 8/2019 | Sundararajan |
| 2019/0268932 A1 | 8/2019 | Sundararajan |
| 2019/0268933 A1 | 8/2019 | Sun |
| 2019/0274162 A1 | 9/2019 | Zhang |
| 2019/0280829 A1 | 9/2019 | Wei |
| 2019/0280836 A1 | 9/2019 | Bhattad |
| 2019/0288789 A1 | 9/2019 | Li |
| 2019/0288800 A1 | 9/2019 | Hosseini |
| 2019/0289602 A1 | 9/2019 | Mukkavilli |
| 2019/0289629 A1 | 9/2019 | Luo |
| 2019/0296809 A1 | 9/2019 | Li |
| 2019/0296882 A1 | 9/2019 | Li |
| 2019/0305882 A1 | 10/2019 | Wang |
| 2019/0305911 A1 | 10/2019 | Sarkis |
| 2019/0306878 A1 | 10/2019 | Zhang |
| 2019/0306881 A1 | 10/2019 | Fakoorian |
| 2019/0312671 A1 | 10/2019 | Lin |
| 2019/0312763 A1 | 10/2019 | Lei |
| 2019/0313260 A1 | 10/2019 | Zhang |
| 2019/0313385 A1 | 10/2019 | Yang |
| 2019/0313419 A1 | 10/2019 | Fakoorian |
| 2019/0313430 A1 | 10/2019 | Manolakos |
| 2019/0319732 A1 | 10/2019 | Manolakos |
| 2019/0319767 A1 | 10/2019 | Sun |
| 2019/0320393 A1 | 10/2019 | Hosseini |
| 2019/0320402 A1 | 10/2019 | Ji |
| 2019/0320420 A1 | 10/2019 | Zhang |
| 2019/0320424 A1 | 10/2019 | Yerramalli |
| 2019/0320452 A1 | 10/2019 | Zhang |
| 2019/0320458 A1 | 10/2019 | Hosseini |
| 2019/0327047 A1 | 10/2019 | Liu |
| 2019/0327062 A1 | 10/2019 | Jiang |
| 2019/0334577 A1 | 10/2019 | Damnjanovic |
| 2019/0334666 A1 | 10/2019 | Damnjanovic |
| 2019/0335337 A1 | 10/2019 | Damnjanovic |
| 2019/0335447 A1 | 10/2019 | Sarkis |
| 2019/0335456 A1 | 10/2019 | Yerramalli |
| 2019/0335480 A1 | 10/2019 | Sun |
| 2019/0335481 A1 | 10/2019 | Jiang |
| 2019/0335490 A1 | 10/2019 | Zeng |
| 2019/0335500 A1 | 10/2019 | Zhang |
| 2019/0335504 A1 | 10/2019 | Chakraborty |

(56) References Cited

U.S. PATENT DOCUMENTS

| | | |
|---|---|---|
| 2019/0342035 A1 | 11/2019 | Zhang |
| 2019/0342045 A1 | 11/2019 | Radulescu |
| 2019/0342836 A1 | 11/2019 | Ang |
| 2019/0349010 A1 | 11/2019 | Wu |
| 2019/0349176 A1 | 11/2019 | Li |
| 2019/0349221 A1 | 11/2019 | Jiang |
| 2019/0349897 A1 | 11/2019 | Hosseini |
| 2019/0349900 A1 | 11/2019 | Sarkis |
| 2019/0349941 A1 | 11/2019 | Yang |
| 2019/0349969 A1 | 11/2019 | Chakraborty |
| 2019/0349973 A1 | 11/2019 | Yang |
| 2019/0349974 A1 | 11/2019 | Sundararajan |
| 2019/0349992 A1 | 11/2019 | Zhang |
| 2019/0349998 A1 | 11/2019 | Bhattad |
| 2019/0356441 A1 | 11/2019 | Jiang |
| 2019/0356455 A1 | 11/2019 | Yang |
| 2019/0357150 A1 | 11/2019 | Wang |
| 2019/0357252 A1 | 11/2019 | Sun |
| 2019/0357255 A1 | 11/2019 | Sun |
| 2019/0363773 A1 | 11/2019 | Yerramalli |
| 2019/0363853 A1 | 11/2019 | Soriaga |
| 2019/0364468 A1 | 11/2019 | Yerramalli |
| 2019/0364579 A1 | 11/2019 | Zhang |
| 2019/0372605 A1 | 12/2019 | Li |
| 2019/0372608 A1 | 12/2019 | Wei |
| 2019/0372712 A1 | 12/2019 | Yang |
| 2019/0373571 A1 | 12/2019 | Damnjanovic |
| 2019/0373629 A1 | 12/2019 | Mukkavilli |
| 2019/0373640 A1 | 12/2019 | Sun |
| 2019/0379485 A1 | 12/2019 | Jiang |
| 2019/0379518 A1 | 12/2019 | Yang |
| 2019/0379561 A1 | 12/2019 | Zhang |
| 2019/0380052 A1 | 12/2019 | Yang |
| 2019/0380127 A1 | 12/2019 | Wang |
| 2019/0380147 A1 | 12/2019 | Zhang |
| 2019/0386737 A1 | 12/2019 | Liu |
| 2019/0387532 A1 | 12/2019 | Liu |
| 2019/0393986 A1 | 12/2019 | Wang |
| 2019/0394772 A1 | 12/2019 | Li |
| 2019/0394790 A1 | 12/2019 | Damnjanovic |
| 2020/0007160 A1 | 1/2020 | Li |
| 2020/0007294 A1 | 1/2020 | Yang |
| 2020/0007302 A1 | 1/2020 | Manolakos |
| 2020/0008107 A1 | 1/2020 | Zhang |
| 2020/0008131 A1 | 1/2020 | Chakraborty |
| 2020/0008235 A1 | 1/2020 | Sarkis |
| 2020/0008239 A1 | 1/2020 | Li |
| 2020/0014499 A1 | 1/2020 | Sun |
| 2020/0015268 A1 | 1/2020 | Zhang |
| 2020/0021423 A1 | 1/2020 | Liu |
| 2020/0022029 A1 | 1/2020 | Sadek |
| 2020/0022136 A1 | 1/2020 | Wang |
| 2020/0029221 A1 | 1/2020 | Xue |
| 2020/0029335 A1 | 1/2020 | Yang |
| 2020/0036476 A1 | 1/2020 | Yang |
| 2020/0036477 A1 | 1/2020 | Xu |
| 2020/0037235 A1 | 1/2020 | Ly |
| 2020/0037319 A1 | 1/2020 | Li |
| 2020/0037336 A1 | 1/2020 | Sun |
| 2020/0037338 A1 | 1/2020 | Li |
| 2020/0037347 A1 | 1/2020 | Yang |
| 2020/0037352 A1 | 1/2020 | Yang |
| 2020/0044778 A1 | 2/2020 | Park |
| 2020/0044784 A1 | 2/2020 | Yang |
| 2020/0044793 A1 | 2/2020 | Sundararajan |
| 2020/0045556 A1 | 2/2020 | Xue |
| 2020/0045744 A1 | 2/2020 | Sun |
| 2020/0052717 A1 | 2/2020 | Wang |
| 2020/0052750 A1 | 2/2020 | Manolakos |
| 2020/0052831 A1 | 2/2020 | Yang |
| 2020/0052870 A1 | 2/2020 | Yerramalli |
| 2020/0053599 A1 | 2/2020 | Damnjanovic |
| 2020/0053658 A1 | 2/2020 | Sundararajan |
| 2020/0053739 A1 | 2/2020 | Xue |
| 2020/0053744 A1 | 2/2020 | Hosseini |
| 2020/0053801 A1 | 2/2020 | Hosseini |
| 2020/0059854 A1 | 2/2020 | Li |
| 2020/0059926 A1 | 2/2020 | Jiang |
| 2020/0067574 A1 | 2/2020 | Yang |
| 2020/0067627 A1 | 2/2020 | Bhushan |
| 2020/0067748 A1 | 2/2020 | Zhang |
| 2020/0068435 A1 | 2/2020 | Zhang |
| 2020/0068495 A1 | 2/2020 | Yang |
| 2020/0068528 A1 | 2/2020 | Abraham |
| 2020/0076563 A1 | 3/2020 | Yang |
| 2020/0083982 A1 | 3/2020 | Jiang |
| 2020/0083987 A1 | 3/2020 | Xu |
| 2020/0084759 A1 | 3/2020 | Liu |
| 2020/0084778 A1 | 3/2020 | Wang |
| 2020/0084784 A1 | 3/2020 | Jiang |
| 2020/0092041 A1 | 3/2020 | Sankar |
| 2020/0092818 A1 | 3/2020 | Jiang |
| 2020/0099436 A1 | 3/2020 | Malik |
| 2020/0099469 A1 | 3/2020 | Jiang |
| 2020/0099472 A1 | 3/2020 | Wang |
| 2020/0099560 A1 | 3/2020 | Li |
| 2020/0100116 A1 | 3/2020 | Chakraborty |
| 2020/0100226 A1 | 3/2020 | Hosseini |
| 2020/0100247 A1 | 3/2020 | Zhang |
| 2020/0100257 A1 | 3/2020 | Yang |
| 2020/0107335 A1 | 4/2020 | Xue |
| 2020/0107336 A1 | 4/2020 | Yang |
| 2020/0107360 A1 | 4/2020 | Xue |
| 2020/0107364 A1 | 4/2020 | Xue |
| 2020/0112391 A1 | 4/2020 | Yang |
| 2020/0112394 A1 | 4/2020 | Mukkavilli |
| 2020/0112396 A1 | 4/2020 | Jiang |
| 2020/0112421 A1 | 4/2020 | Ang |
| 2020/0112964 A1 | 4/2020 | Yang |
| 2020/0112983 A1 | 4/2020 | Hosseini |
| 2021/0075645 A1* | 3/2021 | Stathakis ............ H04L 25/0204 |
| 2021/0126815 A1 | 4/2021 | Lee |
| 2021/0281334 A1* | 9/2021 | Li ......................... H04B 17/18 |

OTHER PUBLICATIONS

3GPP TS 38.211, "5G; NR; Physical channels and modulation," version 15.2.0, Release 15, Jul. 2018.
Love, R. and Nangia, V., "Uplink Reference Signals," Chapter 15 of LTE—The UMTS Long Term Evolution: From Theory to Practice, edited by Sesia, S, et al., 2nd Edition, Wiley, 2011.
Rogalin, et al., "Scalable Synchronization and Reciprocity Calibration for Distributed Multiuser MIMO," pp. 1-35, Apr. 1, 2015.
Shepard, et al., "Argos: Practical Many-Antenna Base Stations," MobiCom '12, Aug. 22-26, 2012.
Mudumbai, et al., "Distributed Transmit Beamforming: Challenges and Recent Progress," IEEE Communications Magazine, pp. 102-110, Feb. 2009.
Jiang, "Massive MIMO: turning concept into reality into reality by exploiting the channel reciprocity," submitted to HAL achives-ouvertes.fr on Jan. 10, 2018.
International Search Report for International Application No. PCT/US2021/023598 dated Jul. 12, 2021.
Written Opinion for International Application No. PCT/US2021/023598 dated Jul. 12, 2021.
3GPP RP-170750, New WID: Further Enhancements to Coordinated Multi-Point (CoMP) Operation for LTE, Mar. 2017.
3GPP TR 36.741, Study on Further Enhancements to Coordinated Multi-Point (CoMP) Operation for LTE, V14.0.0, Mar. 2017.
Agrawal, et al., Dynamic Point Selection for LTE-Advanced: Algorithms and Performance, Wireless Communications and Networking Conference (WCNC), 2014 IEEE, Istanbul, Turkey, Apr. 2014, pp. 1392-1397.
Andrews, et al., Are We Approaching the Fundamental Limits of Wireless Network Densification?, IEEE Communications Magazine, vol. 54, No. 10, pp. 184-190, Oct. 2016.
Björnson, et al., Cooperative Multicell Precoding: Rate Region Characterization and Distributed Strategies with Instantaneous and Statistical CSI, IEEE Transactions on Signal Processing, vol. 58, No. 8, pp. 4298-4310, Aug. 2010.

(56) References Cited

OTHER PUBLICATIONS

Buzzi, et al., Cell-Free Massive MIMO: User-Centric Approach, IEEE Wireless Communications Letters, vol. 6, No. 6, pp. 706-709, Dec. 2017.

Checko, et al., Cloud RAN for Mobile Networks—a Technology Overview, IEEE Communications Surveys & Tutorials, vol. 17, No. 1, Sep. 2014.

Chen, et al., Channel Hardening and Favorable Propagation in Cell-Free Massive MIMO with Stochastic Geometry, version 1, 2017. Available at: http://arxiv.org/abs/1710.00395.

Chen, et al., Channel Hardening and Favorable Propagation in Cell-Free Massive MIMO with Stochastic Geometry, version 2, 2018. Available at: http://arxiv.org/abs/1710.00395.

Davydov, et al., Evaluation of Joint Transmission CoMP in C-RAN based LTE-A HetNets with Large Coordination Areas, Proc. GLOBECOM'14, Atlanta, U.S., Dec. 2013, pp. 801-806.

Forenza, et al., Achieving Large Multiplexing Gain in Distributed Antenna Systems via Cooperation with pCell Technology, 49th Asilomar Conference on Signals, Systems and Computers, Nov. 2015, IEEE, pp. 286-293.

Gesbert, et al., Multi-cell MIMO Cooperative Networks: A New Look at Interference, IEEE Journal on Selected Areas in Communications, vol. 28, No. 9, pp. 1380-1408, Dec. 2010.

Gilhousen, et al., On the Capacity of a Cellular CDMA system, IEEE Transactions on Vehicular Technology, vol. 40, No. 2, pp. 303-311, May 1991.

Interdonato, et al., How Much Do Downlink Pilots Improve Cell-Free Massive MIMO?, IEEE, 2016, 7 pages.

Larsson, et al., Massive MIMO for Next Generation Wireless Systems, Jan. 2014.

Marzetta, et al., Fundamentals of Massive MIMO, Cambridge University Press, Dec. 2016, Table of Contents.

Nayebi, et al., Precoding and Power Optimization in Cell-Free Massive MIMO Systems, IEEE Transactions on Wireless Communications, vol. 16, No. 7, pp. 4445-4459, Jul. 2017.

Ngo, et al., Cell-Free Massive MIMO Versus Small Cells, IEEE Transactions on Wireless Communications, vol. 16, No. 3, pp. 1834-1850, Mar. 2017.

Ngo, et al., On the Total Energy Efficiency of Cell-Free Massive MIMO, IEEE Transactions on Green Communications and Networking, vol. 2, No. 1, pp. 25-39, Mar. 2018.

Osseiran, et al., 5G Mobile and Wireless Communications Technology, Cambridge University Press, Oct. 2016, Ch. 9, Coordinated multi-point transmission in 5G.

Rohde & Schwarz, LTE Transmission Modes and Beamforming, White Paper, Jul. 2015.

Shamai, et al., Enhancing the Cellular Downlink Capacity via Co-processing at the Transmitting End, Proceedings of IEEE VTC—Spring, vol. 3, 2001, pp. 1745-1749.

Sun, et al., Performance Evaluation of CS/CB for Coordinated Multipoint Transmission in LTE-A Downlink, Proceedings of IEEE PIMRC'12, Sydney, Australia, Sep. 2012, pp. 1061-1065.

Tanghe, et al., The Industrial Indoor Channel: Large-Scale and Temporal Fading at 900, 2400, and 5200 MHz, IEEE Transactions on Wireless Communications, vol. 7, No. 7, pp. 2740-2751, Jul. 2008.

Wu, et al., Cloud Radio Access Network (C-RAN): A Primer, IEEE Network, vol. 29, No. 1, pp. 35-41, Jan./Feb. 2015.

Wu, et al., Centralized and Distributed Schedulers for Non-Coherent Joint Transmission, Sep. 2018.

Zhou, et al., Distributed Wireless Communication System: A New Architecture for Future Public Wireless Access, IEEE Communications Magazine, vol. 41, No. 3, pp. 108-113, Mar. 2003.

\* cited by examiner

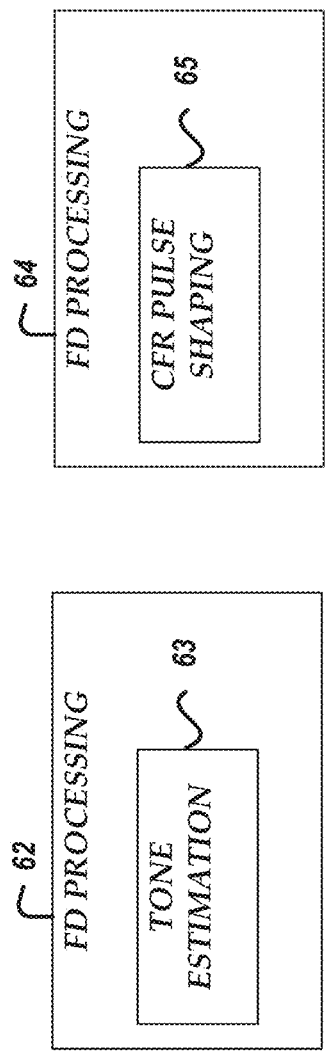
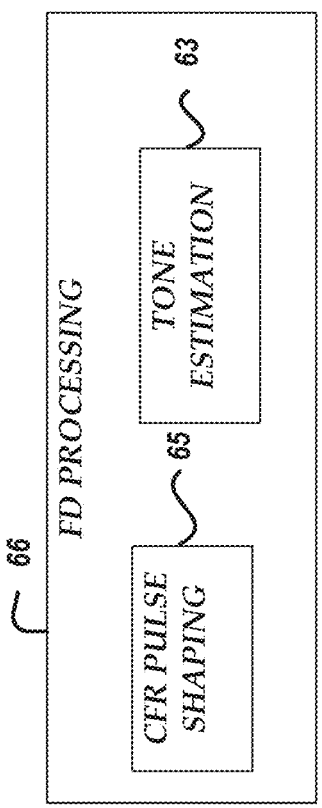
FIG. 6A
FIG. 6B
FIG. 6C

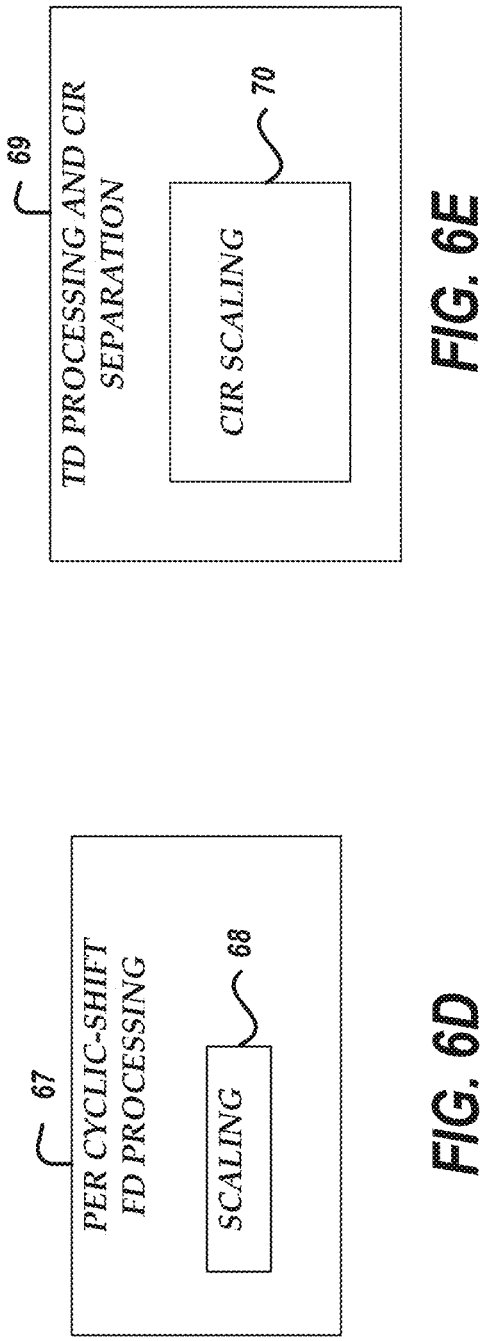

REFERENCE SIGNAL CHANNEL ESTIMATION

BACKGROUND

Technical Field

Embodiments of this disclosure relate to estimating a channel in a communications system using a reference signal.

Description of Related Technology

In a wireless communication system, it can be desirable to have an accurate estimation of a communication channel between a user equipment and a base station. Certain communication standards include reference signals that can be used to estimate a communication channel. Such a reference signal can be used to estimate an uplink channel from a user equipment to a base station. In certain applications, a downlink channel from the base station to the user equipment to the base station can be estimated based on the uplink channel. In real world wireless communication systems, a channel estimate can be degraded for a variety of reasons.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a method of reference signal channel estimation. The method comprises receiving a reference signal for channel estimation; de-covering the reference signal in a frequency domain to generate a de-covered reference signal; after the de-covering, frequency domain processing the de-covered reference signal to cause distortion of a direct current offset in the de-covered reference signal to be reduced; after the frequency domain processing, time domain processing to cause a noise floor associated with the de-covered reference signal to be reduced; and generating a channel estimate based on the frequency domain processing and the time domain processing, wherein the channel estimate is associated with a communication channel between a first node and a second node.

The frequency domain processing can comprise generating an estimated tone for a tone of the de-covered frequency domain reference signal based on at least two other tones of the de-covered frequency domain reference signal. The frequency domain processing can comprise replacing the tone with the estimated tone to cause distortion associated with the direct current offset to be reduced. The frequency domain processing can comprise modifying the tone based on the estimated tone to cause distortion associated with the direct current offset to be reduced.

The frequency domain processing can comprise pulse shaping the de-covered frequency domain reference signal to cause distortion associated with the direct current offset to be reduced.

The time domain processing can comprise estimating noise power for a sub-set of time domain taps corresponding to sub-carriers between channel impulse responses, and performing a per-tap scaling on at least a portion of the time domain taps based on the estimating. The per-tap scaling can involve minimum mean squared error scaling. The per-tap scaling can involve thresholding.

The method can further comprise pulse shaping the reference signal prior to the de-covering.

The method can further comprise rotating the reference signal based on an indicator of a frequency offset prior to the de-covering.

The time domain processing can comprise moving a spur outside of time domain windows for cyclic shifts of the reference signal. The method can further comprise pulse shaping the reference signal prior to the de-covering.

The reference signal can be an uplink Sounding Reference Signal.

The first node can be a user equipment and the second node can be a network node. The first node can be a user equipment and the second node can include a remote radio unit. The first node can be a user equipment and the second node can include a base station integrated with an antenna front-end. The first node can include a first remote radio unit and the second node can include a second remote radio unit. The first node can be a first user equipment and the second node can be a second user equipment.

Another aspect of this disclosure is a system for channel estimation. The system comprises a frequency domain processing circuit, a time domain processing circuit, and a channel estimation circuit. The frequency domain processing circuit is configured to generate a de-covered frequency domain reference signal and to process the de-covered frequency domain reference signal so as to cause distortion associated with a direct current offset to be reduced. The time domain processing circuit has an input coupled to an output of the frequency domain processing circuit. The time domain processing circuit is configured to suppress time domain channel impulse response leakage. The channel estimation circuit is configured to generate a channel estimate based on an output of the time domain processing circuit, in which the channel estimate is associated with a wireless communication channel between a first node and a second node.

The frequency domain processing circuit can be configured to generate an estimated tone for a tone of the de-covered frequency domain reference signal based on at least two other tones of the de-covered frequency domain reference signal, and to replace the tone with the estimated tone to cause distortion associated with the direct current offset to be reduced.

The frequency domain processing circuit can be configured to perform pulse shaping on the de-covered frequency domain reference signal to cause distortion associated with the direct current offset to be reduced.

The time domain processing circuit can comprise: a filter comprising a plurality of taps; a noise power estimation circuit configured to estimate noise power for a sub-set of the taps of the filter corresponding to sub-carriers between channel impulse responses; and a filter tap scaling circuit configured to perform a per-tap scaling on at least a portion of the taps of the filter based on the estimated noise power.

The time domain processing circuit can be configured to move a spur outside of time domain windows for cyclic shifts of the reference signal.

The system can further comprise a second time domain processing circuit configured to pulse shape a reference signal, the second time domain processing circuit having an output coupled to an input of the frequency domain processing circuit.

The system can further comprise a second time domain processing circuit configured to rotate a reference signal based on an indicator of a frequency domain offset to thereby reduce the frequency domain offset, in which the second time domain processing circuit has an output coupled to an input of the frequency domain processing circuit.

The system can further comprise a second frequency domain processing circuit configured to perform per-cyclic shift frequency domain processing, wherein the second frequency domain processing circuit is coupled between the time domain processing circuit and the channel estimation circuit.

The first node can be a user equipment and the second node can be a network node. The first node can be a user equipment and the second node can include a remote radio unit. The first node can be a user equipment and the second node can include a base station integrated with an antenna front-end.

The de-covered frequency domain reference signal can be a de-covered uplink Sounding Reference Signal.

Another aspect of this disclosure is a system for channel estimation that comprises: means for processing a de-covered frequency domain reference signal so as to cause distortion associated with a direct current offset to be reduced; means for suppressing time domain channel impulse response leakage, the means for suppressing having an input coupled to an output of the means for processing; and a channel estimation circuit configured to generate a channel estimate based on an output of the means for suppressing, wherein the channel estimate is associated with a wireless communication channel between a first node and a second node.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

FIGS. 6A to 6E are block diagrams of parts of the processing circuitry of FIGS. 4A to 4B that can improve channel estimation according to certain embodiments.

DETAILED DESCRIPTION OF CERTAIN EMBODIMENTS

Figure 1:
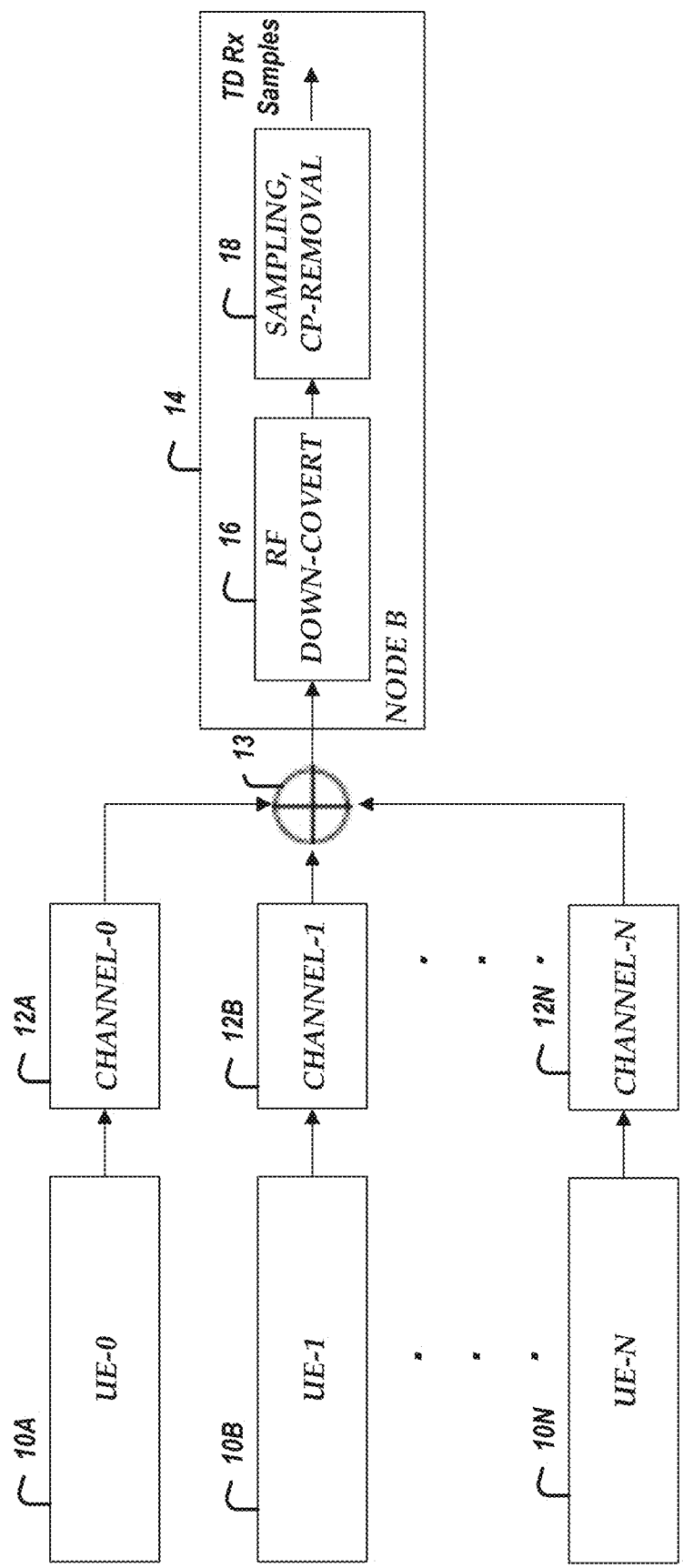
FIG. 1 is a schematic block diagram associated with a reference signal model.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

In Long Term Evolution (LTE) and New Radio (NR) systems, a Sounding Reference Signal (SRS) can be transmitted from a user equipment (UE) to a Node-B for estimating of an uplink channel. More generally, an SRS can be transmitted from an antenna of a first node to an antenna of a second node. For time-division duplex (TDD) systems, the SRS channel estimate (CE) can be used to estimate a downlink channel quality based on channel reciprocity. In multiple-input multiple-output (MIMO) systems based on codebooks and/or regularized zero-forcing (RZF) precoding, SRS CE can be used in selecting a precoding matrix. In such instances, it is desirable for the accuracy of SRS CE to be high, especially in RZF precoding applications. SRS CE can be used for calibration.

There are a variety of impairments in a real word system that may degrade the performance of SRS CE. Such impairments include without limitation one or more of frequency offset, timing offset, time domain channel impulse response (CIR) leakage, or distortion of relatively low frequency tones. In addition, the output SRS CE of edge tones may be inaccurate due to a discontinuity of the SRS in the frequency domain. In this disclosure, techniques to improve the performance of SRS CE are provided to make channel estimates more robust in the presence of one or more impairments.

Sounding Reference Signal

In LTE and fifth generation (5G) NR, the construction of an SRS typically includes SRS sequence generation and the mapping to physical resources. SRS can be generated according to a relevant communication standard. SRS can be an uplink SRS in any suitable embodiment disclosed herein.

In LTE and/or NR uplink transmissions, there can be dedicated orthogonal frequency domain multiplexing (OFDM) symbols for SRS transmission to scheduled UEs. In each symbol, mSRS resource blocks for SRS can be shared by a group of UEs. All sub-carriers in the mSRS resource blocks for SRS can be divided into $K_{TC}$ orthogonal combs. An orthogonal comb can be a group of signals allocated at a given time that are orthogonal in the frequency domain. The number of resource elements $M_{ZC}$ in each comb can be in accordance with Equation 1, where $M_{ZC}$ can represent a length of an SRS sequence.

$$M_{ZC} = m_{SRS} N_{SC}^{RB}/K_{TC} \quad \text{(Eq. 1)}$$

In Equation 1, $N_{SC}^{RB}$ is the number of sub-carriers in each resource block. $N_{SC}^{RB}$ can be 12, for example. Within each comb, $M_{ZC}$ resource elements are shared by up to $n_{SRS}^{CS,max}$ SRSs through different cyclic shifts. The transmission comb number $K_{TC}$ is specified by the base station and can take the value of 2 or 4. The maximum number of cyclic shifts $n_{SRS}^{CS,max}$ that can be supported by one comb can be a function of $K_{TC}$ as indicated by Equation 2.

$$n_{SRS}^{cs,max} = \begin{cases} 8, & K_{TC} = 2 \\ 12, & K_{TC} = 4 \end{cases} \quad \text{(Eq. 2)}$$

For the UE to transmit an SRS over the mSRS resource blocks, the UE should generate an SRS sequence of length $M_{ZC}$. The first step for the UE can be to obtain a base sequence $\overline{r}_{u,v}(n)$ of length $M_{ZC}$, where n denotes the index of the allocated tones. For a given length $M_{ZC}$, there can be 30 or 60 base sequences $\overline{r}_{u,v}(n)$ that are divided into groups, where $u \in \{0, 1, \ldots, 29\}$ is the group number. There can be one or two sequences in one group, and the base sequence index within a group can be $v=\{0\}$ or $v=\{0,1\}$, respectively.

For $M_{ZC} \geq 36$, $\overline{r}_{u,v}(n)$ can be obtained from a Zadoff-Chu (ZC) sequence by Equation 3.

$$\overline{r}_{u,v}(n) = x_q(n \bmod N_{ZC}) \quad \text{(Eq. 3)}$$

In Equation 3, $N_{ZC}$ can be the largest prime number such that $N_{ZC} < M_{ZC}$ and $x_q(m)$ is a ZC sequence of length $N_{ZC}$ that is obtained from Equations 4-1 to 4-3.

$$\begin{cases} x_q(m) = e^{-j\frac{\pi q m(m+1)}{N_{ZC}}} & \text{(Eq. 4-1)} \\ q = \lfloor \overline{q} + 1/2 \rfloor + v \cdot (-1)^{\lfloor 2\overline{q} \rfloor} & \text{(Eq. 4-2)} \\ \overline{q} = N_{ZC} \cdot (u+1)/31 & \text{(Eq. 4-3)} \end{cases}$$

The $\overline{r}_{u,v}(n)$ for MZC<36 can be generated according to a 3rd Generation Partnership Project (3GPP) standard.

Group and sequence hopping for SRS can be configured. In group or sequence hopping, a base sequence is selected by varying u and v for each SRS symbol. In many applications, group or sequence hopping can be disabled and the calculation of u and v is simplified as shown in Equations 5-1 and 5-2, respectively.

$$\begin{cases} u = n_{ID}^{SRS} \bmod 30 & \text{(Eq. 5-1)} \\ v = 0 & \text{(Eq. 5-2)} \end{cases}$$

In Equation 5-1, $n_{ID}^{SRS}$ is given by the higher layer. In the following, it is assumed that group or sequence hopping is disabled and hence the base sequence is denoted as $\overline{r}(n)$ with the subscripts u and v being omitted.

After the base sequence $\overline{r}(n)$ is obtained in each UE, the SRS sequence $r^{(c)}(n)$ can be generated by applying a cyclic shift in frequency domain according to Equation 6.

$$r^{(c)}(n) = e^{j2\pi \cdot (c/n_{SRS}^{cs,max}) n} \cdot \overline{r}(n), \text{ for } 0 \leq n < M_{ZC} \text{ and } 0 \leq c < n_{SRS}^{cs,max} \quad \text{(Eq. 6)}$$

In Equation 6, c is the cyclic-shift index. Then, $r^{(c)}(n)$ are mapped to an allocated comb, converted to the time domain signal through an inverse Fast Fourier Transform (IFFT). The time domain signal can be transmitted over channels with channel impulse response (CIR) $h_c(t)$, $0 \leq c < n_{SRS}^{CS,max}$, to a specific antenna. An overall block diagram for the SRS model is shown in FIG. 1.

FIG. 1 is a schematic block diagram associated with a reference signal model. In FIG. 1, a plurality of UEs 10A, 10B, 10N wirelessly transmit SRSs with different cyclic shifts over respective channels 12A, 12B, 12N to a Node B 14. The different cyclic shifts can identify which device and/or antenna is wirelessly transmitting an SRS. At a summing point 13, the SRSs can be summed in the reference signal model. The Node-B 14 can include a radio frequency (RF) downconverting block 16 and a sampling and cyclic prefix (CP) removal block 18. The RF downconverting block 16 can downconvert a received RF signal. This downconversion can be to baseband, for example. The sampling and CP removal block 18 can sample the downconverted RF reference signal. The sampling and CP removal block 18 can remove a cyclic prefix. The Node-B 14 can generate time domain receive samples from SRSs received from the UEs 10A, 10B, 10N. The Node B 14 can be an evolved Node B (eNode B), a next generation Node B (gNode B) or replaced and/or implemented together with any suitable base station or network system.

With the maximum number of cyclic shifts being 8, there can be 8 UEs and 8 channels in the reference signal model. Similarly, with the maximum number of cyclic shifts being 12, there can be 12 UEs and 12 channels in the reference signal model. Any other suitable number of maximum cyclic shifts and corresponding channels can be implemented in accordance with any suitable principles and advantages disclosed herein.

Although UEs are illustrated in FIG. 1, the principles and advantages disclosed herein can be applied to channel estimation between any suitable nodes arranged to wirelessly communicate with each other. For example, SRS channel estimation can be used to estimate a channel between an UE and a network node, for example, as shown in FIG. 1. The network node can be a base station integrated with an antenna front-end. The network node can include a remote radio unit (RRU) and a base band unit (BBU). As another example, SRS channel estimation can be used to estimate a channel between two network nodes (e.g., between 2 nodes that include RRUs). As one more example, SRS channel estimation can be used to estimate a channel between two UEs. SRS channel estimation in accordance with any suitable principles and advantages disclosed herein can be applied to channel estimation between any suitable nodes arranged to wirelessly communicate information.

Although embodiments disclosed herein may be described with reference to the SRS for illustrative purposes, any suitable principles and advantages disclosed herein can be applied to channel estimation using any suitable reference signal and/or any suitable pilot signal.

Figure 2:
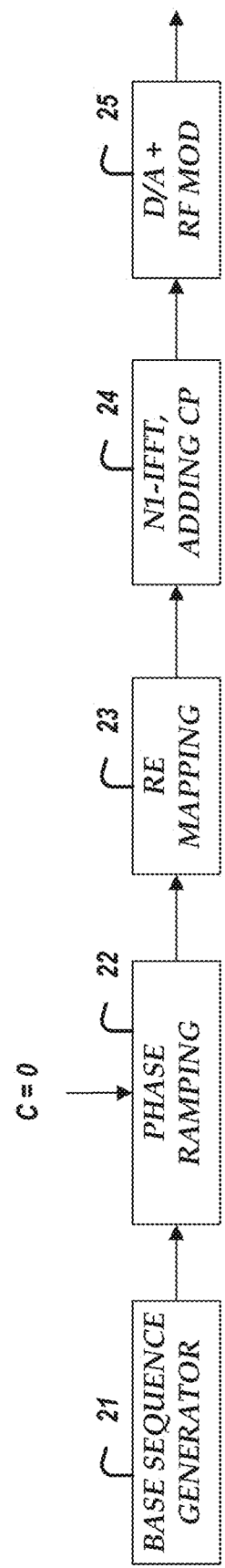
FIG. 2 is a schematic block diagram of hardware of a user equipment of FIG. 1 that is arranged to generate a reference signal.

FIG. 2 is a schematic block diagram of hardware of a UE of FIG. 1 that is arranged to generate a reference signal. Each UE 10A to 10N of FIG. 1 can include the hardware shown in FIG. 2. The functionality described with reference to the blocks of FIG. 2 can be implemented by any suitable physical hardware. The functionality described with reference to FIG. 2 can be implemented in any suitable node arranged to transmit an SRS and/or other reference signal.

As illustrated in FIG. 2, reference signal generation circuitry can include a base sequence generator 21, a phase ramping block 22, a resource element mapping block 23, an IFFT block 24, and a digital-to-analog conversion and RF modulation block 25. The base sequence generator 21 can generate a base sequence, for example, as described above. As one example, the base sequence can be generated using Equation 3. The phase ramping block 22 can apply a cyclic shift to the base sequence generated by the base sequence generator 21. The cyclic shift can be applied in the frequency domain. Each node (e.g., each UE 10A to 10N in FIG. 1) can have a different cyclic shift applied by a respective phase ramping block 22. The resource element mapping block 23 can map the SRS sequence from the phase ramping block 22 to an allocated comb. Then the IFFT block 24 can convert the frequency domain cyclic shifted signal to the time domain by an inverse Fourier transform. A cyclic prefix can be added by the IFFT block 24. The digital-to-analog conversion and RF modulation block 25 can convert the output of the IFFT block 24 to an analog signal and modulate the analog signal to a radio frequency. An RF signal provided by the digital-to-analog conversion and RF modulation block 25 can be wirelessly transmitted over a communication channel to a Node B and/or other suitable hardware for channel estimation.

Reference Signal Channel Estimation

Processing circuitry can receive a reference signal, such as an SRS, and generate a channel estimate based on the received reference signal. The channel estimate can be for a relatively wide band SRS. Example signal processing will be described with reference to FIGS. 3 to 6E. The signal processing circuitry can perform improved reference signal channel estimation in accordance with any suitable principles and advantages disclosed herein.

Figure 3:
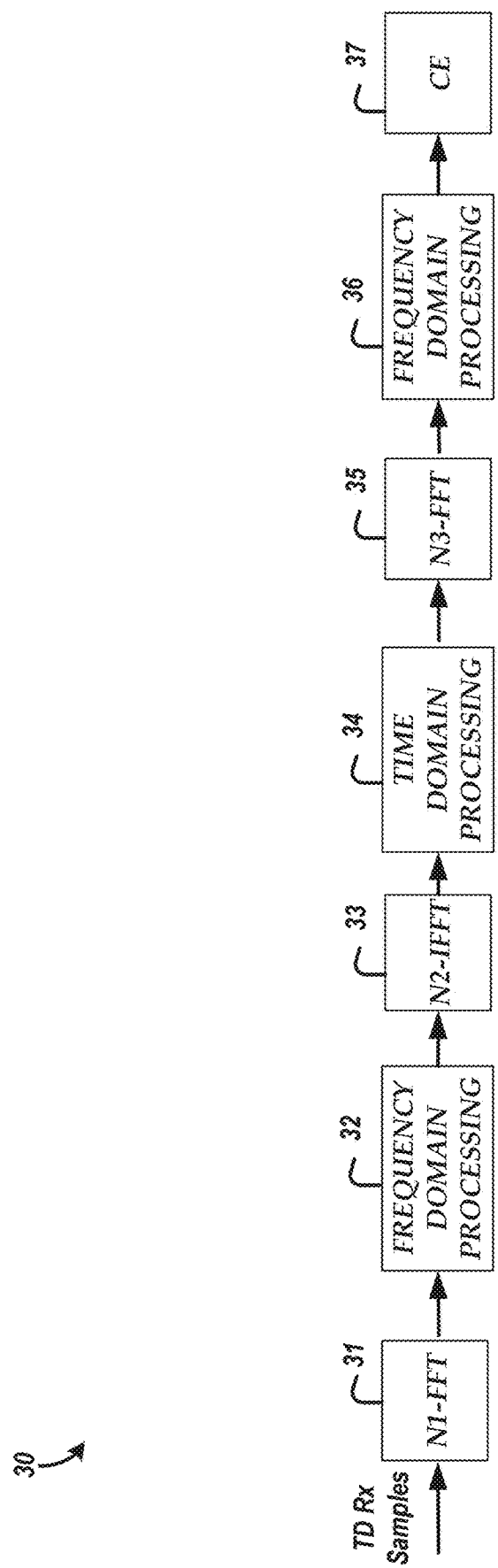
FIG. 3 is a schematic block diagram of processing circuitry arranged to generate a channel estimate.

FIG. 3 is a schematic block diagram of processing circuitry 30 arranged to generate a channel estimate. The processing circuitry 30 can receive time domain reference signal samples and generate a channel estimate based on the reference signal. The time domain samples can be received, for example, from a sampling and CP removal block 18 of FIG. 1. As illustrated in FIG. 3, the processing circuitry 30 includes a Fast Fourier Transform (FFT) block 31, a first frequency domain processing circuit 32, an inverse Fast Fourier Transform (IFFT) block 33, a time domain processing circuit 34, a second FFT block 35, a second frequency domain processing circuit 36, and a channel estimation circuit 37.

The received reference signal can be an SRS. The received SRS can be converted into frequency domain by the FFT block 31. The frequency domain processing circuit 32 has an input coupled to an output of the FFT block 31. The first frequency domain processing circuit 32 can extract SRS symbols of a comb for de-covering. The first frequency domain processing circuit can de-cover the reference signal using a base sequence. The de-covered frequency domain reference signal can contain a sum of channel frequency responses with different phase ramping. Additional frequency domain processing can be performed by the first frequency domain processing circuit 32 after de-covering the reference signal to improve SRS channel estimate performance. The first frequency domain processing circuit 32 can perform frequency domain processing to cause distortion of a direct current offset and/or a low frequency offset to be reduced. Examples of such processing will be discussed below.

The IFFT block 33 can convert the de-covered frequency domain signal from the first frequency domain processing circuit 32 to the time domain. An output signal from the IFFT block 33 can be provided to the time domain processing circuit 34. The time domain processing circuit 34 can perform time domain processing to improve SRS channel estimate performance. The time domain processing circuit 34 can perform time domain processing to cause a noise floor to be reduced. Examples of such processing will be discussed below. The time domain processing circuit 34 can separate channel impulse responses. Separating channel impulse responses can be performed in accordance with any suitable principles and advantages discussed with reference to FIG. 6.

The second FFT block 35 can convert an output signal from the time domain processing circuit 34 to the frequency domain. The second frequency domain processing circuit 36 can perform per cyclic shift frequency domain processing. The second frequency domain processing circuit 36 can output a channel frequency response for each cyclic shift.

The channel estimation circuit 37 can generate a channel estimate based on an output of the second frequency domain processing circuit 36. The channel estimate is based on the reference signal received by the processing circuitry 30. The channel estimate is associated with a wireless communication channel between a first node and a second node. As one example, the first node can be a UE 10A of FIG. 1 and the second node can be the Node B 14 of FIG. 1. Processing techniques disclosed herein can improve the channel estimate generated by the channel estimation circuit 37. This can be advantageous in a variety of applications, such as for selecting a precoding matrix in TDD MIMO systems.

Figure 4A:
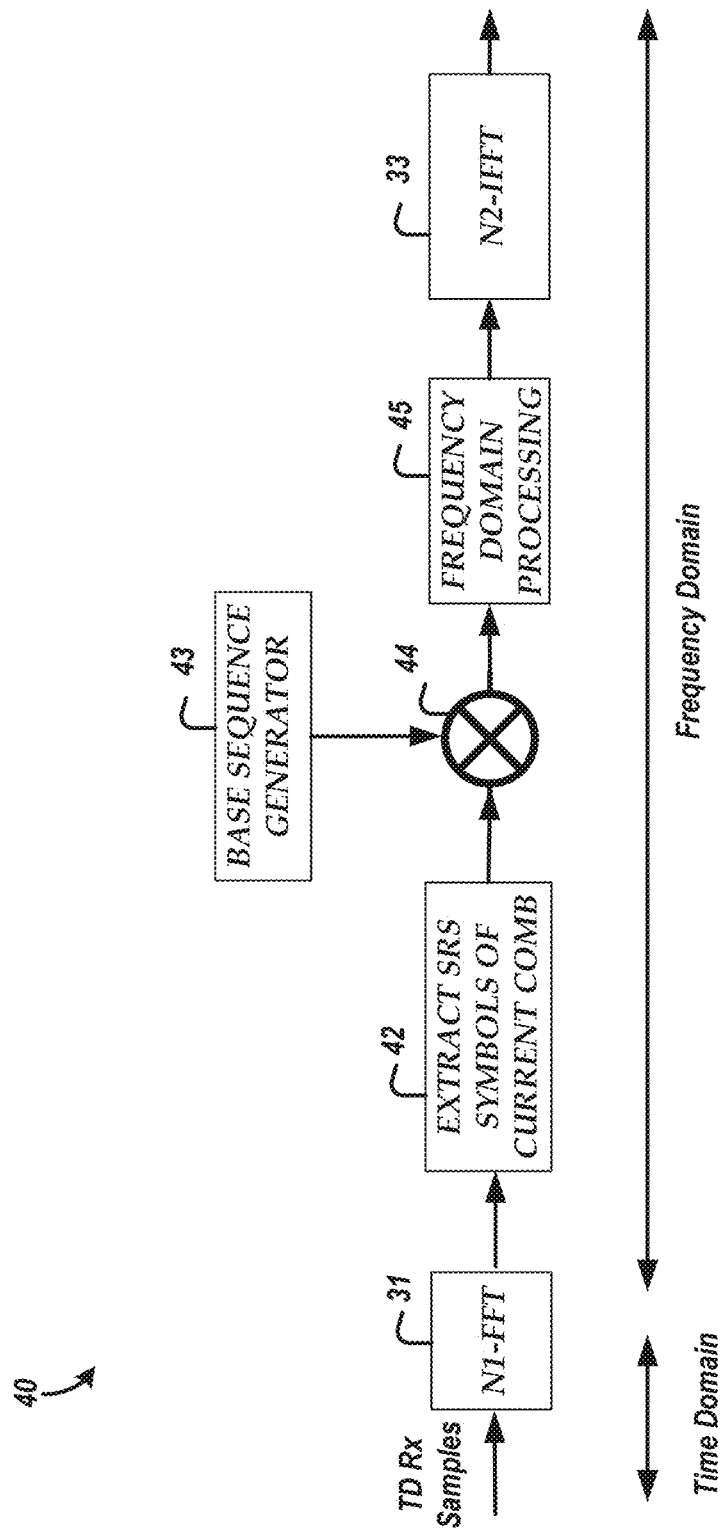
FIG. 4A is a schematic block diagram of a first part of processing circuitry arranged to generate a channel estimate.
Figure 4B:
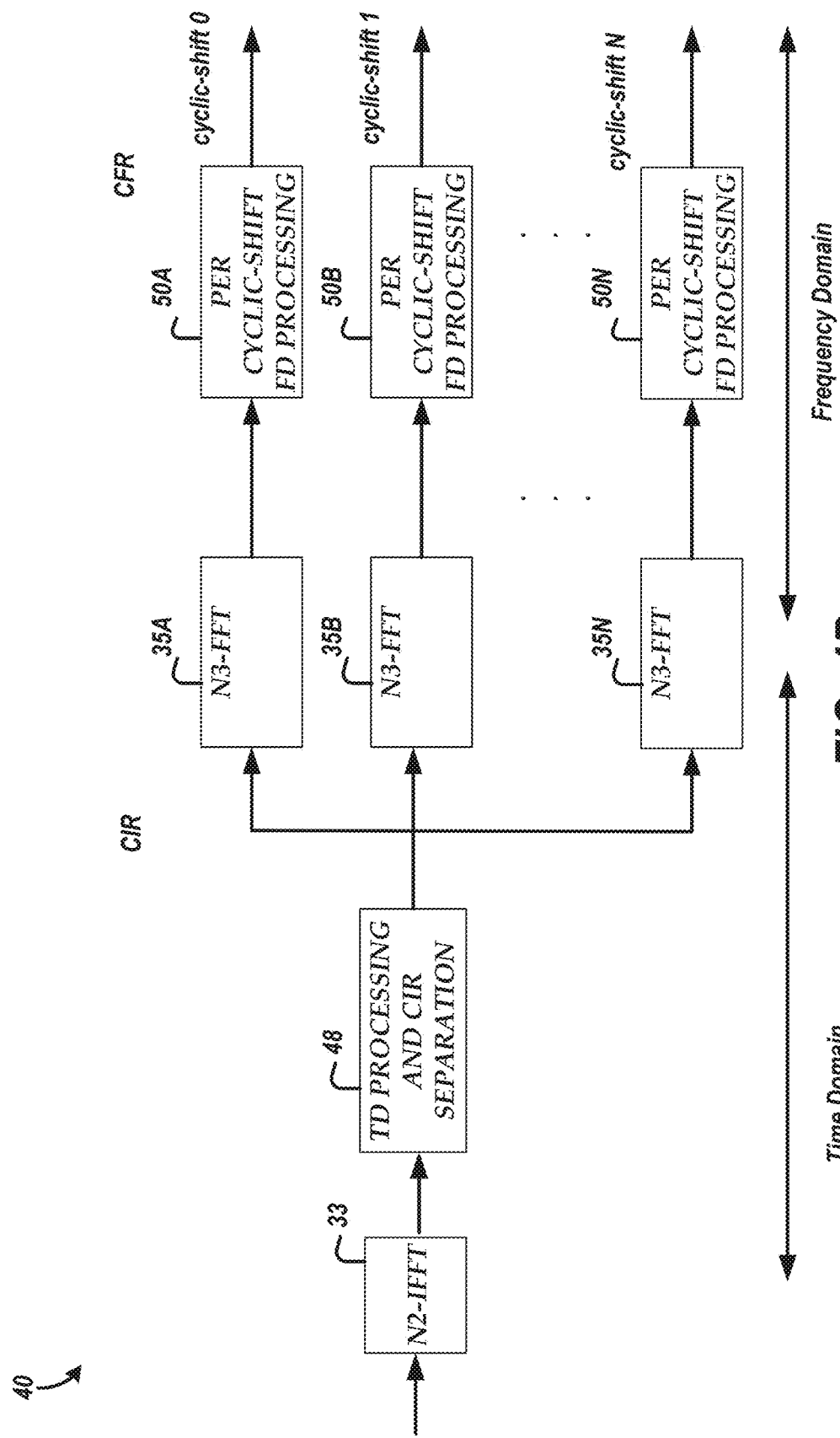
FIG. 4B is a schematic block diagram of a second part of processing circuitry arranged to generate a channel estimate.

More details regarding embodiments of the processing circuitry 30 are provided in FIGS. 4A and 4B and the corresponding description. FIG. 4A is a schematic block diagram of a first part of processing circuitry 40 for generating a channel estimate. FIG. 4B is a schematic block diagram of a second part of the processing circuitry 40.

The processing circuitry 40 receives a reference signal, such as an SRS. The first FFT block 31 converts the received reference signal into the frequency domain. A reference signal extraction circuit 42 can extract all resource elements of one comb for de-covering. This can involve extracting SRS symbols of a current comb. The summed SRSs in the frequency domain can be represented by Equation 7. In Equation 7, $H_c(n)=(h_c(kT_s))$ is the channel frequency response (CFR) of cyclic-shift c, and v(n) denotes the additive white Gaussian noise (AWGN).

$$y(n) = \sum_{c=0}^{n_{SRS}^{cs,max}} e^{j2\pi \cdot (c/n_{SRS}^{cs,max}) \cdot n} \cdot \bar{r}(n) \cdot H_c(n) + v(n), 0 \le n < M_{ZC} \quad \text{(Eq. 7)}$$

A base sequence generator 43 generates a base sequence for de-covering. The base sequence can be generated in accordance with any suitable principles and advantages disclosed herein. A mixer 44 or any other suitable circuit can be used to de-cover the reference signal using the base sequence from the base sequence generator 43.

After being de-covered by the base sequence $\bar{r}(n)$, the de-covered frequency domain signal can be represented by Equation 8. Equation 8 shows that the de-covered frequency domain signal contains a sum of channel frequency responses with different linear phase ramping.

$$y'(n) = y(n) \cdot \bar{r}^*(n) = \sum_{c=0}^{n_{SRS}^{cs,max}-1} e^{j2\pi \left(\frac{c}{n_{SRS}^{cs,max}}\right) \cdot n} \cdot H_c(n) + v(n), \quad \text{(Eq. 8)}$$

$$0 \le n < M_{ZC}$$

A frequency domain processing circuit 45 can perform frequency domain processing on the de-covered signal to improve reference signal channel estimate performance.

Denote h(k) as a time-domain signal of length N and define h(S)(k) as the sequence by cyclic-shifting h(k) to the right by S, i.e., $h^{(s)}(k)=h(MOD(k+S, N))$, for $0 \le k < N$. The de-covered signal y'(n) can be converted into time domain through an IFFT by the IFFT block 33. In the time domain, the signal becomes a combination of multiple channel impulse responses with different cyclic shifts, which can be represented by Equation 9. In Equation 9, $N_{IFFT}$ represents the IFFT size per comb.

$$s(k) = IFFT(y'(n)) = \sum_{c=0}^{n_{SRS}^{cs,max}-1} h_c^{\left(\frac{c}{n_{SRS}^{cs,max}} N_{IFFT}\right)}(k) + w(k), \quad \text{(Eq. 9)}$$

$$0 \le k < N_{IFFT}$$

After the IFFT, time domain processing can be performed by the time domain processing and channel impulse response separation block 48 of FIG. 4B to improve the SRS CE performance. Assuming that the maximum delay spread of any $h_c$ is less than $N_{IFFT}/n_{SRS}^{cs,max}$, the time-domain channel for different cyclic shifts can be separated relatively easily by the time domain processing and channel impulse response separation block 48. The second FFT block 35 can include sub-FFT blocks 35A to 35N to transform individual channel impulse responses to the frequency domain. Per cyclic shift frequency domain processing circuits 50A to 50N can obtain the channel frequency responses for each cyclic shift. A channel estimation circuit, such as the channel estimation circuit 37 of FIG. 3, can generate channel estimates based on the channel frequency responses for the cyclic shifts.

Separating channel impulse responses will now be discussed. Such functionality can be performed, for example, by the time domain processing and channel impulse response separation block 48 of FIG. 4B. To separate channel impulse responses, a window can be defined for each of the cyclic shifts. For a specific cyclic shift, only taps falling into the window for the specific cyclic shift are preserved and all other taps can be set to zero. Then, the non-zero taps are cyclic-shifted, and in the frequency domain, the linear phase ramping can be removed.

Figure 5:
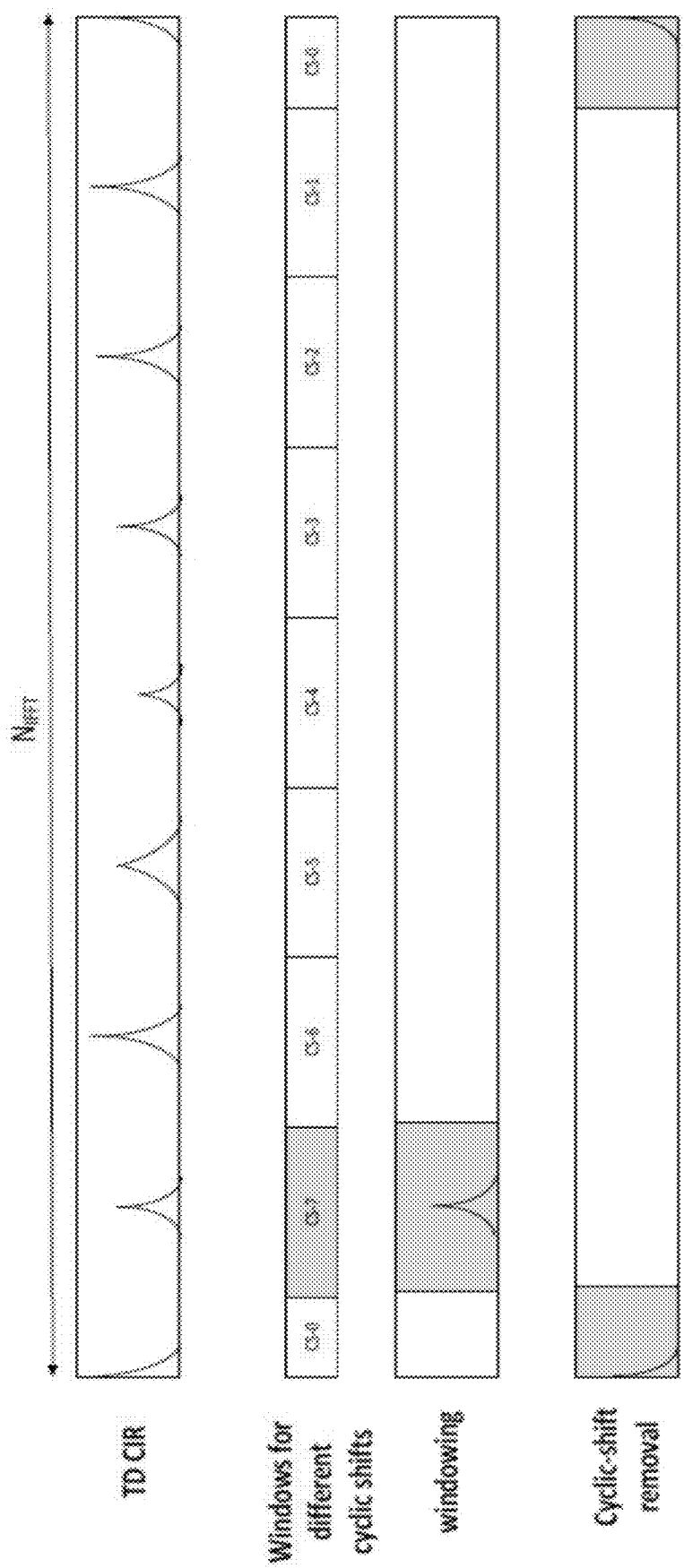
FIG. 5 is a diagram that illustrates time domain channel impulse response separation for a reference signal with 8 cyclic shifts.

FIG. 5 is a diagram that illustrates time domain channel impulse response separation for a reference signal with 8 cyclic shifts. The example shown in FIG. 5 illustrates how to separate the channel impulse response for a specific shift (i.e., c=7) from other cyclic shifts. The top most portion of FIG. 5 shows a time domain impulse response. There are time domain impulse responses for 8 different cyclic shifts shown in FIG. 5. There are different windows defined for each of the cyclic shifts. Windowing can be performed by preserving a specific channel impulse response within a specific window (i.e., the channel impulse response for cyclic shift c=7 in FIG. 5) and removing the other channel impulse responses. The impulse response for the specific channel can be shifted to remove the cyclic shift. This can remove linear phase ramping in the frequency domain.

Properties of ZC sequences in SRS will now be discussed. If a ZC sequence $x_q$ (m) defined in Equations 4-1 to 4-3 is de-covered by a shifted version of itself, denoted as $x_q$ (m−s), s=0, ±1, ±2, ±3, . . . , the de-covered signal can be represented by Equation 10. In Equation 10, $$\varphi = \frac{nq}{N_{ZC}}(s^2 - s)$$

can be a constant phase.

$$x_q(m) \cdot x_q^*(m-s) = e^{-j\frac{2nsqm}{N_{ZC}}} \cdot e^{j\varphi} \quad \text{(Eq. 10)}$$

Equation 10 reveals that $x_q(m) \cdot x_q^*(m-s)$ is a sequence of linear phase ramping, with the slope $$\frac{2\pi sq}{N_{ZC}}$$

being a function of s and q. If the frequency hopping and sequence hopping are disabled, then q becomes dependent on cell ID.

The IFFT of $x_q(m) \cdot x_q^*(m-s)$ represents an impulse in time domain and the delay of the impulse is related to s and q.

Frequency domain processing techniques can be applied to improve reference signal channel estimation. Such frequency domain processing can reduce direct current and/or other low frequency offsets. Alternatively or additionally, frequency domain processing circuits can compensate for any other suitable impairment to accurate reference signal channel estimation. The frequency domain processing circuit 32 of FIG. 3 and/or the frequency domain processing circuit 45 of FIG. 4A can implement frequency domain processing to improve reference signal channel estimation. FIGS. 6A, 6B, and 6C illustrate example block diagrams of frequency domain processing circuits that can be implemented by the frequency domain processing circuit 32 and/or the frequency domain processing circuit 45. The frequency domain processing circuit 36 of FIG. 3 and/or any of the frequency domain processing circuits 50A to 50N of FIG. 4A can implement frequency domain processing to improve reference signal channel estimation. FIG. 6D illustrates example block diagram of a frequency domain processing circuit that can be implemented by the frequency domain processing circuit 36 of FIG. 3 and/or any of the frequency domain processing circuits 50A to 50N of FIG. 4B.

FIG. 6A is a block diagram of a frequency domain processing circuit 62 according to an embodiment. The frequency domain processing circuit 62 includes a tone estimation circuit 63 arranged to generate an estimated tone for a tone of a de-covered frequency domain reference signal based on at least two other tones of the de-covered frequency domain reference signal. The tone estimation circuit 63 is also arranged to replace the tone with the estimated tone to cause distortion associated with the direct current offset to be reduced. The tone estimation circuit 63 is can alternatively or additionally modify the tone based on the estimated tone to cause distortion associated with the direct current offset to be reduced. Tone estimation can involve interpolation. Tone estimation can involve extrapolation. Tone estimation can be based on poly-phase decomposition. Tone estimation can be based on least squares estimation. Tone estimation can be based on any other suitable technique. The frequency domain processing circuit 62 can perform any other suitable frequency domain processing for channel estimation, such as any other suitable features discussed with reference to the frequency domain processing circuit 32 of FIG. 3 and/or the frequency domain processing circuit 45 of FIG. 4A.

FIG. 6B is a block diagram of a frequency domain processing circuit 64 according to an embodiment. The frequency domain processing circuit 64 includes a channel frequency response pulse shaping circuit 65 arranged to pulse shape a de-covered frequency domain reference signal. Pulse shaping can cause distortion associated with a direct current offset to be reduced. The pulse shaping can involve a raised-cosine pulse and/or any other suitable pulse.

The frequency domain processing circuit 64 can perform any other suitable frequency domain processing for channel estimation, such as any other suitable features discussed with reference to the frequency domain processing circuit 32 of FIG. 3 and/or the frequency domain processing circuit 45 of FIG. 4A.

FIG. 6C is a block diagram of a frequency domain processing circuit 66 according to an embodiment. The frequency domain processing circuit 66 includes the tone estimation circuit 63 and the channel frequency response pulse shaping circuit 65. FIG. 6C illustrates that tone estimation can be implemented together with channel frequency response pulse shaping. The frequency domain processing circuit 65 can perform any other suitable frequency domain processing for channel estimation, such as any other suitable features discussed with reference to the frequency domain processing circuit 32 of FIG. 3 and/or the frequency domain processing circuit 45 of FIG. 4A.

FIG. 6D is a block diagram of a frequency domain processing circuit 67 according to an embodiment. The frequency domain processing circuit 67 includes a scaling circuit 68. The scaling circuit 68 can be implemented together with the channel frequency response pulse shaping circuit 65 of FIGS. 6B and/or 6C. The scaling circuit 68 can scale the channel frequency response of edge tones to compensate for the impact of frequency domain pulse shaping. The frequency domain processing circuit 67 can perform any other frequency domain processing, such as any other suitable features discussed with reference to the frequency domain processing circuit 36 of FIG. 3 and/or any of the frequency domain processing circuits 50A to 50N of FIG. 4B.

Time domain processing techniques can be applied to improve reference signal channel estimation. In certain instances, time domain processing can be implemented together with one or more frequency domain processing techniques disclosed herein to improve reference signal channel estimation.

FIG. 6E is a block diagram of a time domain processing circuit 69 according to an embodiment. The time domain processing circuit 69 is arranged to perform time domain processing and channel impulse response separation. The time domain processing circuit 69 includes a channel impulse response scaling circuit 70. The channel impulse response scaling circuit 70 is arranged to scale a channel impulse response based on a power delay profile. The scaling can be applied per tap of a filter. The time domain processing circuit 69 can perform any other time domain processing, such as any other suitable features discussed with reference to the time domain processing circuit 34 of FIG. 3 and/or the time domain processing and channel impulse response separation block 48 of FIG. 4B.

A time domain processing circuit can move a spur outside of time domain windows for cyclic shifts of the reference signal in certain embodiments. For instance, harmonic spurs can be moved to unused time domain space that does not impact channel estimation. Spurs can be moved to time domain indices below time domain windows for the cyclic shifts and/or to time domain indices between time domain windows for cyclic shifts.

In certain applications, time domain pulse shaping can be applied before a reference signal is translated into the frequency domain. Time domain pulse shaping can reduce frequency offset and/or timing offset.

According to some applications, frequency rotation can be applied before a reference signal is translated into the frequency domain. This can reduce frequency offset.

Impairments on Reference Signal Channel Estimation

In a real world communication system, there can be a variety of impairments that may affect the performance of reference signal channel estimation. Such impairments can include one or more of distortion of low frequency tones, time domain channel impulse response leakage, frequency offset, or timing offset. There can be a variety of factors that can result in inaccurate channel estimation. Identifying impairments that affect performance of reference signal channel estimation can be challenging. Impairments discussed herein were identified through analysis of SRS channel estimation data.

Distortion of low frequency tones will now be discussed. For an RF front end with a zero intermediate frequency (ZIF) transceiver, direct current (DC) offset may be present in a receive baseband signal due to local oscillator (LO) leakage. To mitigate the DC offset component, a notch filter can be applied to a demodulated signal before generating baseband samples for digital signal processing. However, the notch filter may not work perfectly and/or may distort the DC tone and one or more adjacent tones, especially in TDD systems where uplink symbols are not continuous in time.

If a DC tone and adjacent tones to the DC tone are distorted, colored noise can be introduced with locations at DC and low frequency tones in the frequency domain. The colored noise tones can elevate a noise floor in the time domain and introduce inter-cyclic shift interference in SRS CE.

Figure 7B:
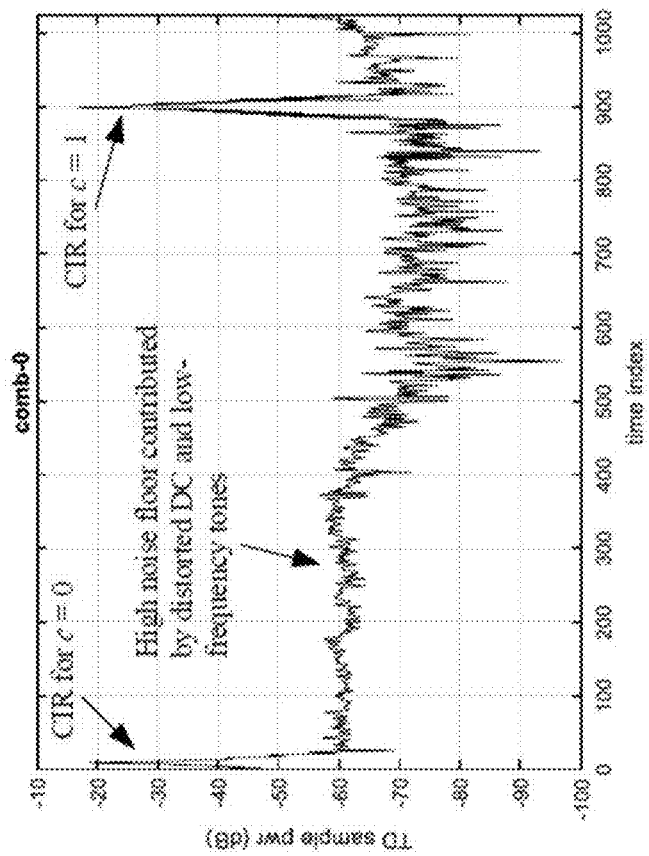
FIG. 7B is a graph illustrating distorted direct current and low frequency tones in a time domain.
Figure 7A:
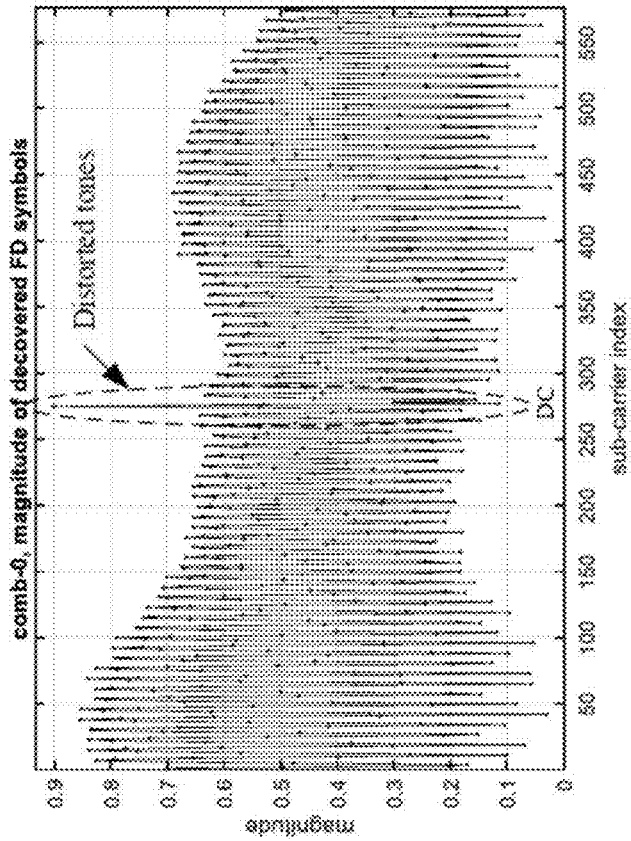
FIG. 7A is a graph that illustrates a magnitude of a de-covered Sounding Reference Signal from two cyclic shifts with some distortion in direct current and low frequency tones.

FIG. 7A is a graph that illustrates a magnitude of a de-covered Sounding Reference Signal from two cyclic shifts with some distortion in DC and low frequency tones. The distorted tones in FIG. 7A are located at and near DC.

FIG. 7B is a graph illustrating distorted DC and low frequency tones in a time domain. Sample power is plotted versus time index in FIG. 7B. The distorted tones contribute to a hump in the time domain in the curve of FIG. 7B. The distorted tones are located between channel impulse responses corresponding to different cyclic shifts (i.e., c=0 and c=1 in FIG. 7B). These distorted tones can raise the noise floor.

Time domain channel impulse response leakage will now be discussed. When a frequency domain channel frequency response is transformed into the time domain through an IFFT, the channel impulse response pulse may have a significant sidelobe leakage that goes into time domain windows for one or more other cyclic shifts.

Figure 8B:
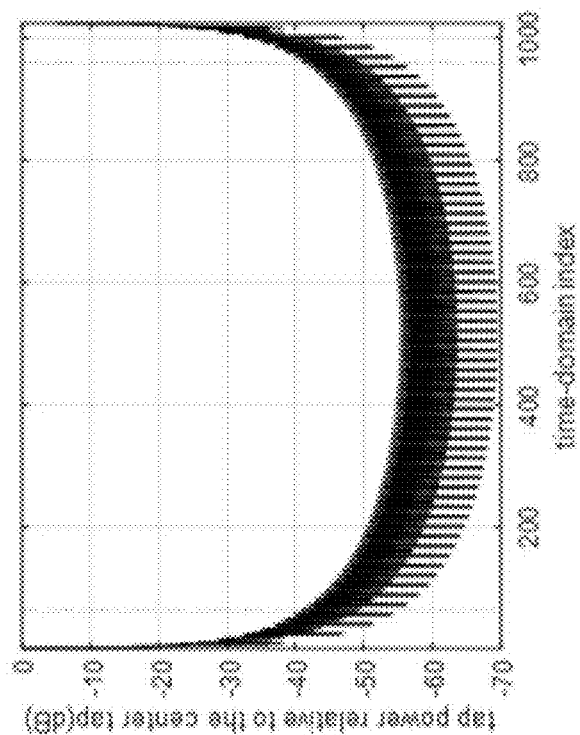
FIG. 8B is a graph illustrating power leaking in a time domain associated with the channel frequency response of FIG. 8A.
Figure 8A:
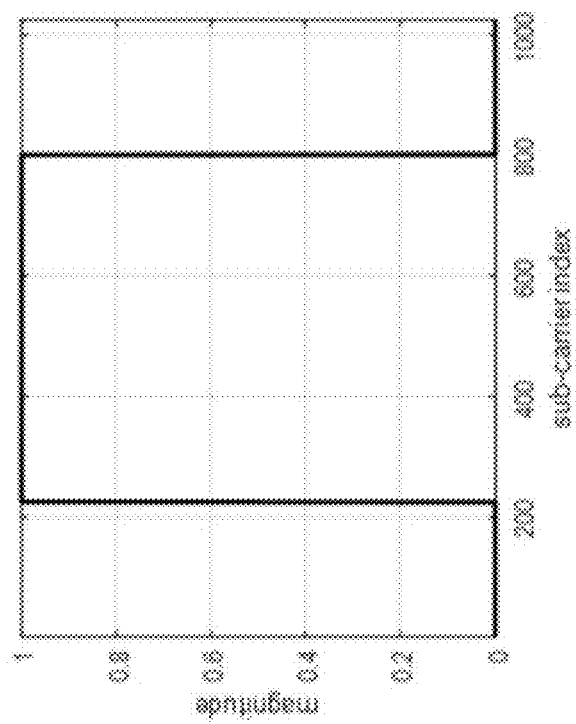
FIG. 8A is a graph illustrating a channel frequency response in a frequency domain.

FIG. 8A is a graph illustrating a channel frequency response in a frequency domain. The channel frequency response for the cyclic shift c=0 is shown in the frequency domain. In FIG. 8A, the channel is relatively flat in the frequency domain.

FIG. 8B is a graph illustrating power leaking in a time domain associated with the channel frequency response of FIG. 8A. After a 1024-point IFFT was performed, most of the energy is concentrated in a time domain window for the cyclic shift c=0, which is between time domain indices 64 and 960 in FIG. 8B. However, there can be a non-negligible portion of power leaked into other windows.

Sidelobe leakage can degrade the channel frequency response of the cyclic shift that the sidelobe leakage is associated with, which can be due to the loss of signal power in window truncating. Sidelobe leakage can degrade the channel frequency response performance of one or more other cyclic shifts by introducing inter-cyclic-shift interference. Therefore, ensuring that the channel impulse response of each cyclic shift is concentrated in its own time domain window can be significant.

Frequency offset will now be discussed. Even though a UE can remove most of the frequency offset between its local oscillator and a local oscillator in a base station through an initial acquisition and frequency tracking loop, there may still exist a residual frequency offset $\Delta f$. Sometimes, the residual frequency offset can be as large as several hundred Hertz.

Unlike the demodulation of a Physical Uplink Control Channel (PUCCH) and Physical Uplink Shared Channel (PUSCH) where the frequency offset can be estimated and compensated for through a demodulation reference signal (DMRS), it can be more channeling to mitigate the frequency offset in SRS CE, especially when considering that different UEs may have different frequency offset values.

Figure 9:
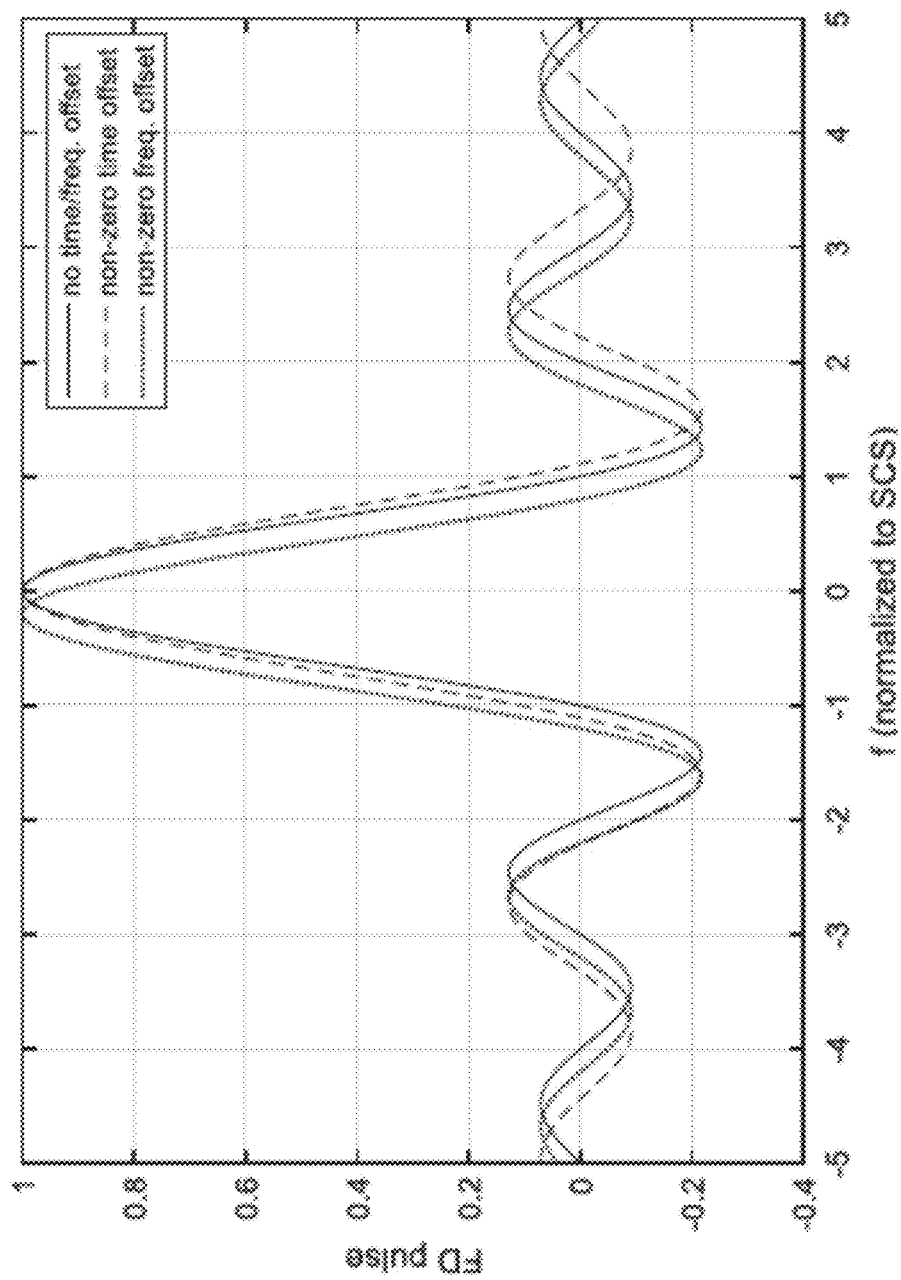
FIG. 9 is a graph that illustrates frequency domain pulses with a timing offset, a frequency offset, and no timing or frequency offset.

FIG. 9 is a graph that illustrates frequency domain pulses with a timing offset, a frequency offset, and no timing or frequency offset. Due to non-zero frequency offset, a sinc pulse in the frequency domain can be shifted, for example, as shown in FIG. 9. The shifted sinc pulse is represented by $\text{sinc}(f-(\Delta f/B_{scs}))$, where $B_{scs}$ is the subcarrier spacing. In FIG. 9, there is a leakage tap at the location of each subcarrier, resulting in inter-carrier interference (ICI). For a given frequency offset $\Delta f$, the ICI should become less severe with larger subcarrier spacing values.

Each leakage tap of the distorted sinc pulse contributes to a weighted and shifted version of ZC sequence, which can be represented by Equation 11.

$$A_s \cdot x_q(m-s), \quad m=0, 1, \ldots, N_{ZC}^{RS}-1 \tag{Eq. 11}$$

Given the properties of ZC sequences discussed above, after de-covering, the frequency domain signal is a weighted channel frequency response with phase ramping, which can be represented by Equation 12.

$$A_s \cdot H(m) \cdot e^{-j\frac{2\pi s q m}{N_{ZC}^{RS}}}, \quad m=0, 1, \ldots, N_{ZC}^{RS}-1. \tag{Eq. 12}$$

In the time domain, each leakage tap can cause a time domain spur. The power of the time domain spur can be related to the tap magnitude $|A_s|$. The locations of the spurs in time domain can be derived from the slope of the phase ramping in frequency domain. For the s-th harmonic spur, the time domain location can be predicted by the Equation 13. The location is a function of cell ID in Equation 13.

$$z(s, q) = \text{Mod}\left(\text{round}\left(\frac{s \cdot q}{N_{ZC}^{RS}} N_{FFT}\right), N_{FFT}\right), \quad s=0, \pm 1, \pm 2, \pm 3, \tag{Eq. 13}$$

The time domain spurs can cause interference across different cyclic shifts. The time domain spurs can degrade the SRS CE performance of each UE.

Timing offset will now be discussed. A base station can adjust the uplink timing of a UE through timing advance (TA). However, due to dithering in TA, non-zero timing offset may still exist between a symbol boundary of the base station and that of the received signal from a UE.

The timing offset may make it possible that fewer time domain samples are selected in an FFT. In the frequency domain, this can result in the sinc pulse of the OFDM being distorted. Such distortion is shown in FIG. 9. If there are $\Delta T$ samples missing in the FFT window, then in the frequency domain, the distorted sinc pulse can be represented by Function 1. Function 1 implies that there is a leakage tap at the location of each subcarrier.

$$\text{sinc}\left(f\left(1 - \frac{\Delta T}{N_{FFT}}\right)\right) \quad \text{(Fn. 1)}$$

The degradation caused by timing offset can be two-fold. First, there may be inter-symbol interference (ISI) in the time domain. Second, the distorted sinc pulse can cause ICI leakage in the frequency domain.

Similar to the frequency offset, the timing offset can introduce harmonic spurs in a time domain channel impulse response. The locations of harmonic spurs can be predicted with the Equation 13.

Techniques to Improve Reference Signal Channel Estimation

Techniques to improve the performance of reference signal channel estimation are disclosed. These techniques can make reference signal channel estimates more robust to one or more impairments. The improved reference signal channel estimation can compensate for one or more of distortion of low-frequency tones, time-domain channel impulse response leakage, frequency offset, or timing offset. Any suitable combination of the techniques to improve reference signal channel estimation disclosed herein can be implemented together with each other.

An example method of reference signal channel estimation includes de-covering a reference signal in a frequency domain to generate a de-covered reference signal; estimating a tone of the de-covered reference signal based on at least two other tones of the de-covered reference signal to generate an estimated tone; and generating a channel estimate based on the estimated tone and further processing, wherein the channel estimate is associated with a wireless communication channel between a first node and a second node.

One technique to reduce distortion is tone estimation. Tone estimation can involve interpolation and/or extrapolation. Estimation can be based on poly-phase decomposition in some instances. Estimation can be based on least-squared estimation in certain applications. Estimated tones can be used to improve reference signal channel estimation. Tone estimation can be performed, for example, using the tone estimation circuit 63 of FIGS. 6A and/or 6C.

Linear interpolation and extrapolation based on poly-phase decomposition will now be discussed. Equation 8 shows that, in the frequency domain, the de-covered SRS contains a sum of channel frequency response with different linear phase ramping. In an example discussed below, it is assumed that $n_{SRS}^{cs,max}=8$. Any other suitable value for $n_{SRS}^{cs,max}$ can be used. For example, the extension to $n_{SRS}^{cs,max}=12$ is similar.

With $n_{SRS}^{cs,max}=8$ in Equation 8, the de-covered SRS can be represented by Equation 14.

$$y'(n) = y(n) \cdot \bar{r}^*(n) = \sum_{c=0}^{7} e^{j2\pi \cdot \left(\frac{c}{8}\right)n} \cdot H_c(n) + v'(n) \quad \text{(Eq. 14)}$$

The value of $$e^{j2\pi \cdot \left(\frac{c}{8}\right)n}$$

repeats every 8 samples. Therefore, y'(n) can be decomposed into 8 sub-sequences as shown in Equation 15.

$$y'(8m + p) = \sum_{c=0}^{7} e^{j2\pi \cdot \left(\frac{c}{8}\right)p} \cdot H_c(8m + p) + v'(8m + p), \quad \text{(Eq. 15)}$$
$$p = 0, 1, \ldots, 7.$$

For a specific p, the sub-sequence y'(8m+p) should be smooth given the assumption that Hc(n) is slow-changing in the frequency domain. Accordingly, after the SRS de-covering, the distorted DC tones and adjacent tones can be linearly interpolated with the poly-phase decomposition of y'(n).

Figure 10:
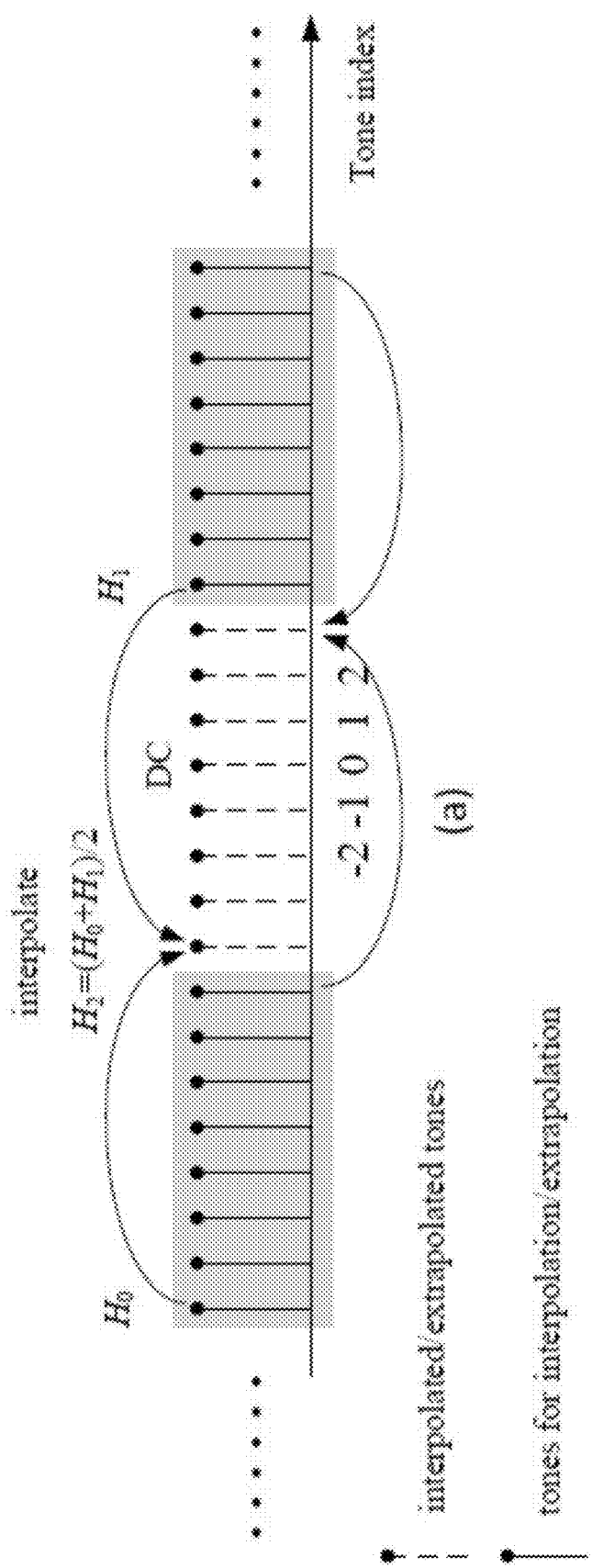
FIG. 10 shows an example of interpolation for reference signal channel estimation.

FIG. 10 shows an example of interpolation. In FIG. 10, the center 8 de-covered SRS tones can be replaced by 8 new tones interpolated from 16 tones with 8 tones on each side. Each interpolated tone can be the average of two tones which are 8 tones from their respective sides in this example with $n_{SRS}^{cs,max}=8$. Interpolated tones can be used for the center group of 8 de-covered SRS tones. In some other applications, the center 8 de-covered SRS tones can be modified based on the 8 new estimated tones.

Figure 11:
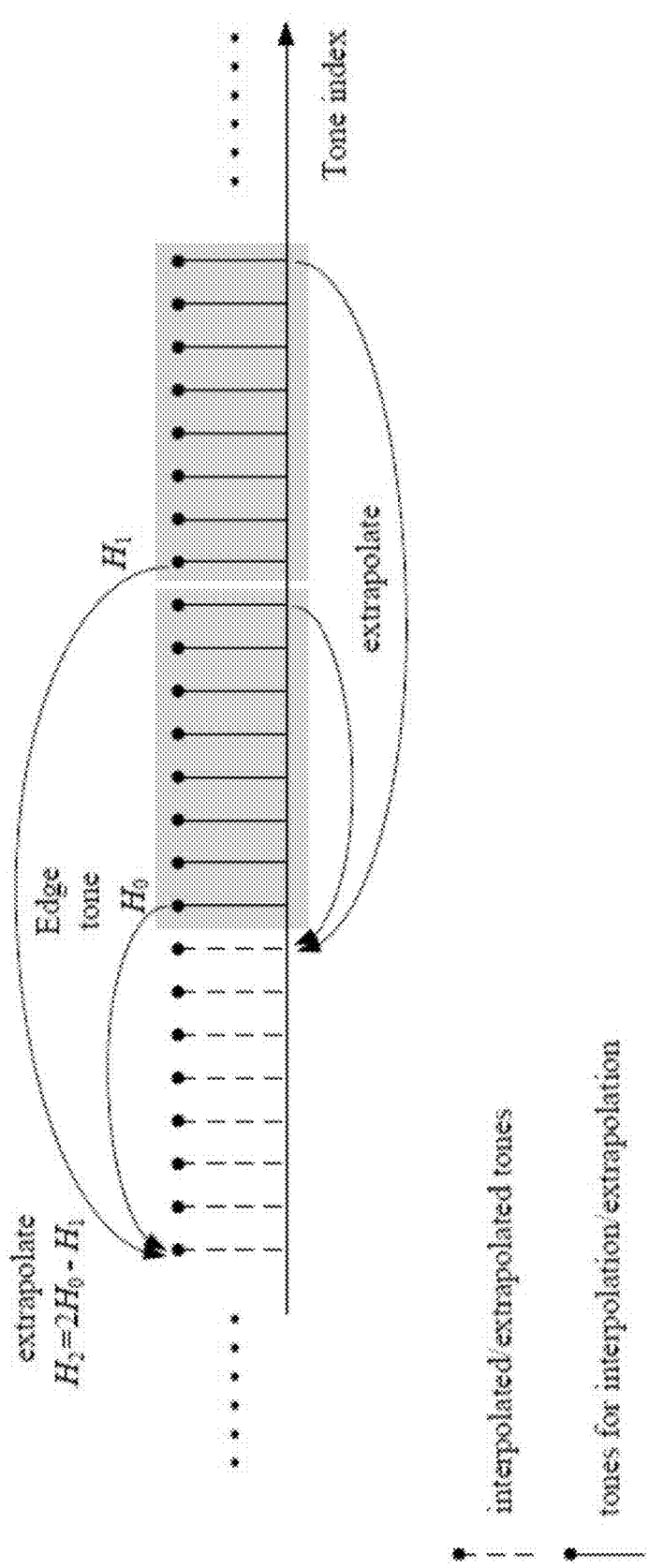
FIG. 11 shows an example of extrapolation for reference signal channel estimation.

FIG. 11 shows an example of extrapolation. Similar processing to interpolation can be extended to edge extrapolation. FIG. 11 illustrates how an extrapolated tone can be derived from two tones whose distances from the extrapolated tones are multiples of $n_{SRS}^{cs,max}$ (i.e., multiples of 8 in the illustrated example).

Interpolation and extrapolation based on least-square estimation will now be discussed. In certain applications, least square estimation can be implemented in place of estimation based on poly-phase decomposition. According to some applications, a system can select between least square estimation and estimation based on poly-phase decomposition. The available tones in a local region can be processed together to interpolate distorted low frequency tones and/or to extrapolate for edge tones. In an example discussed below, it is assumed that $n_{SRS}^{cs,max}=8$. Any other suitable value for $n_{SRS}^{cs,max}$ can be used. For example, the extension to $n_{SRS}^{cs,max}=12$ is similar.

In a local frequency region, (n) can be represented by a linear polynomial as shown in Equation 16.

$$Hc(n) = a_{c,1}n + a_{c,0} \quad \text{(Eq. 16)}$$

There can be 2 unknown coefficients per cyclic shift. Consequently, the SRS of all cyclic shifts can be approximated by Equation 17. In Equation 17, Ωcs represents the set of active cyclic shifts.

$$y(n) = \sum_{c \in \Omega_{cs}} e^{j\frac{\pi}{8}cn}(a_{c,1}n + a_{c,0}) + v_n \quad \text{(Eq. 17)}$$

A coefficient vector for all 8 cyclic shifts can be denoted as $\alpha = [\alpha_{0,1}, \alpha_{0,0}, \alpha_{1,1}, \alpha_{1,0}, \ldots, \alpha_{7,1}, \alpha_{7,0}]^T$. A set of L frequency domain samples for interpolation can be denoted as $\{(n), n \in \Omega Y\}$, $\Omega Y = \{n_0, n_1, \ldots, n_{L-1}\}$. Then Equation 17 can be represented as Equation 18. In Equation 18, $\otimes$ denotes Kronecker product.

$$y = A \cdot \alpha + v, \quad \text{(Eq. 18)}$$

$$A = \begin{pmatrix} \left[1, e^{j\frac{\pi}{8}n_0}, \ldots, e^{j\frac{7\pi}{8}n_0}\right] \otimes [n_0, 1] \\ \left[1, e^{j\frac{\pi}{8}n_1}, \ldots, e^{j\frac{7\pi}{8}n_1}\right] \otimes [n_1, 1] \\ \vdots \\ \left[1, e^{j\frac{\pi}{8}n_{L-1}}, \ldots, e^{j\frac{7\pi}{8}n_{L-1}}\right] \otimes [n_{L-1}, 1] \end{pmatrix}$$

Equation 19 provides a least-square solution to Equation 18.

$$\alpha = (A^H A)^{-1} A^H y \qquad \text{(Eq. 19)}$$

The indices of K tones to be interpolated can be denoted as a set $\Omega_1 = \{m_0, m_1, \ldots, m_{k-1}\}$. A B matrix can be defined as follows.

$$B = \begin{pmatrix} \left[1, e^{j\frac{\pi}{8}m_0}, \ldots, e^{j\frac{7\pi}{8}m_0}\right] \otimes [m_0, 1] \\ \left[1, e^{j\frac{\pi}{8}m_1}, \ldots, e^{j\frac{7\pi}{8}m_1}\right] \otimes [m_1, 1] \\ \vdots \\ \left[1, e^{j\frac{\pi}{8}m_{K-1}}, \ldots, e^{j\frac{7\pi}{8}m_{K-1}}\right] \otimes [m_{K-1}, 1] \end{pmatrix}$$

The interpolated low-frequency tones can be represented by Equation 20. The interpolation matrix E of Equation 21 is of dimension K×L and can be pre-calculated.

$$y_{LF} = B\alpha = Ey \qquad \text{(Eq. 20)}$$

$$E = B(A^H A)^{-1} A^H \qquad \text{(Eq. 21)}$$

The assumption that Hc(n) is slow-changing in the frequency domain may not be valid. To make interpolation more accurate, we can approximate Hc(n) in a local frequency region by a quadratic polynomial shown in Equation 22.

$$H_c(n) = \alpha_{c,2} n^2 + \alpha_{c,1} n + \alpha_{c,0} \qquad \text{(Eq. 22)}$$

There can be 3 unknown coefficients per cyclic shift. Consequently, the SRS of all cyclic shifts can be approximated by Equation 23. In Equation 23, $\Omega$cs represents the set of active cyclic shifts.

$$y(n) = \sum_{c \in \Omega_{cs}} e^{j\frac{\pi}{8}cn}(a_{c,2} n^2 + a_{c,1} n + a_{c,0}) + v_n \qquad \text{(Eq. 23)}$$

The same procedure to derive the solution in Equations 20 and 21 can be applied again to the quadratic polynomial assumption, with the exception of the coefficient vector which is replaced by $\alpha = [\alpha_{0,2}, \alpha_{0,1}, \alpha_{0,0}, \alpha_{1,2}, \alpha_{1,1}, \alpha_{1,0}, \ldots, \alpha_{7,2}, \alpha_{7,1}, \alpha_{7,0}]^T$ and the matrix A and B being replaced by:

$$A = \begin{pmatrix} \left[1, e^{j\frac{\pi}{8}n_0}, \ldots, e^{j\frac{7\pi}{8}n_0}\right] \otimes [n_0^2, n_0, 1] \\ \left[1, e^{j\frac{\pi}{8}n_1}, \ldots, e^{j\frac{7\pi}{8}n_1}\right] \otimes [n_1^2, n_1, 1] \\ \vdots \\ \left[1, e^{j\frac{\pi}{8}n_{L-1}}, \ldots, e^{j\frac{7\pi}{8}n_{L-1}}\right] \otimes [n_{L-1}^2, n_{L-1}, 1] \end{pmatrix}$$

$$B = \begin{pmatrix} \left[1, e^{j\frac{\pi}{8}m_0}, \ldots, e^{j\frac{7\pi}{8}m_0}\right] \otimes [m_0^2, m_0, 1] \\ \left[1, e^{j\frac{\pi}{8}m_1}, \ldots, e^{j\frac{7\pi}{8}m_1}\right] \otimes [m_1^2, m_1, 1] \\ \vdots \\ \left[1, e^{j\frac{\pi}{8}m_{K-1}}, \ldots, e^{j\frac{7\pi}{8}m_{K-1}}\right] \otimes [m_{K-1}^2, m_{K-1}, 1] \end{pmatrix}.$$

Various modifications are possible to the above formulation. For example, if the cyclic shifts are not fully used, the dimensions of α and A can be reduced. As another example, to approximate (n), different cyclic shifts may take different orders of polynomials as desired. The methods shown above for linear and/or quadratic interpolation based on least squared estimation can be extended to the extrapolation of edge tones. The only difference can be the definitions of $\Omega$cs, $\Omega_Y$, and $\Omega_T$.

Figure 12A:
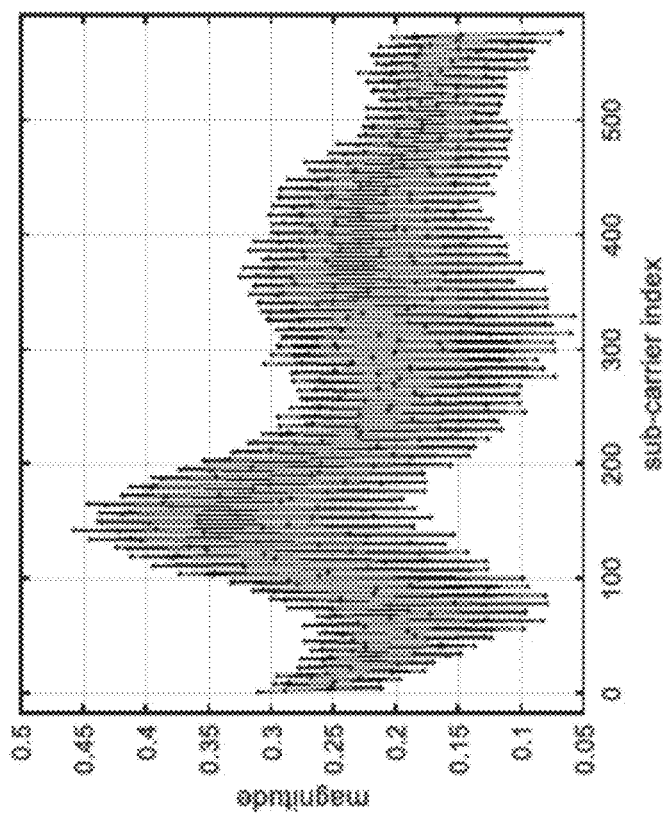
FIG. 12A shows a received frequency domain SRS after an FFT is performed with distorted low-frequency tones.
Figure 12B:
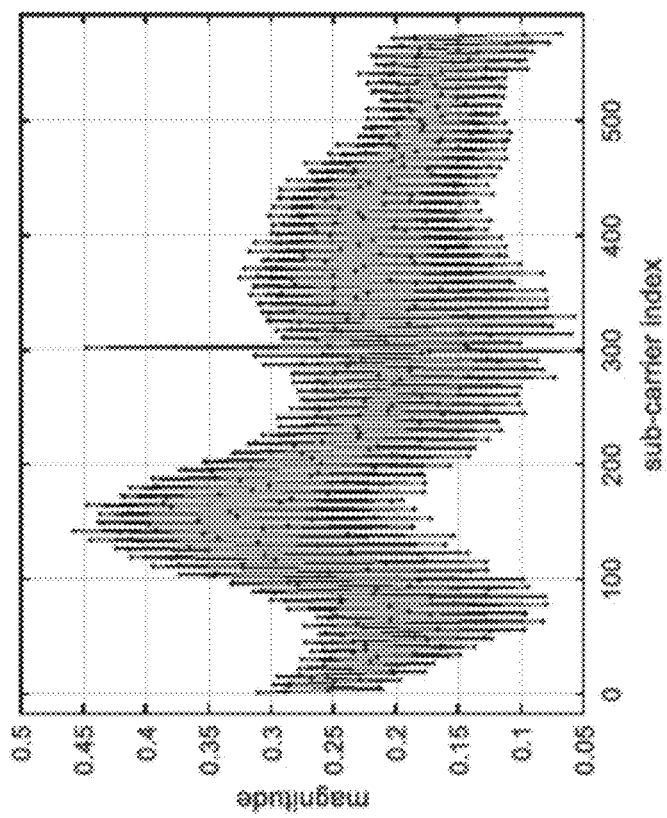
FIG. 12B shows an SRS after applying quadratic interpolation to 16 low frequency tones.
Figure 12C:
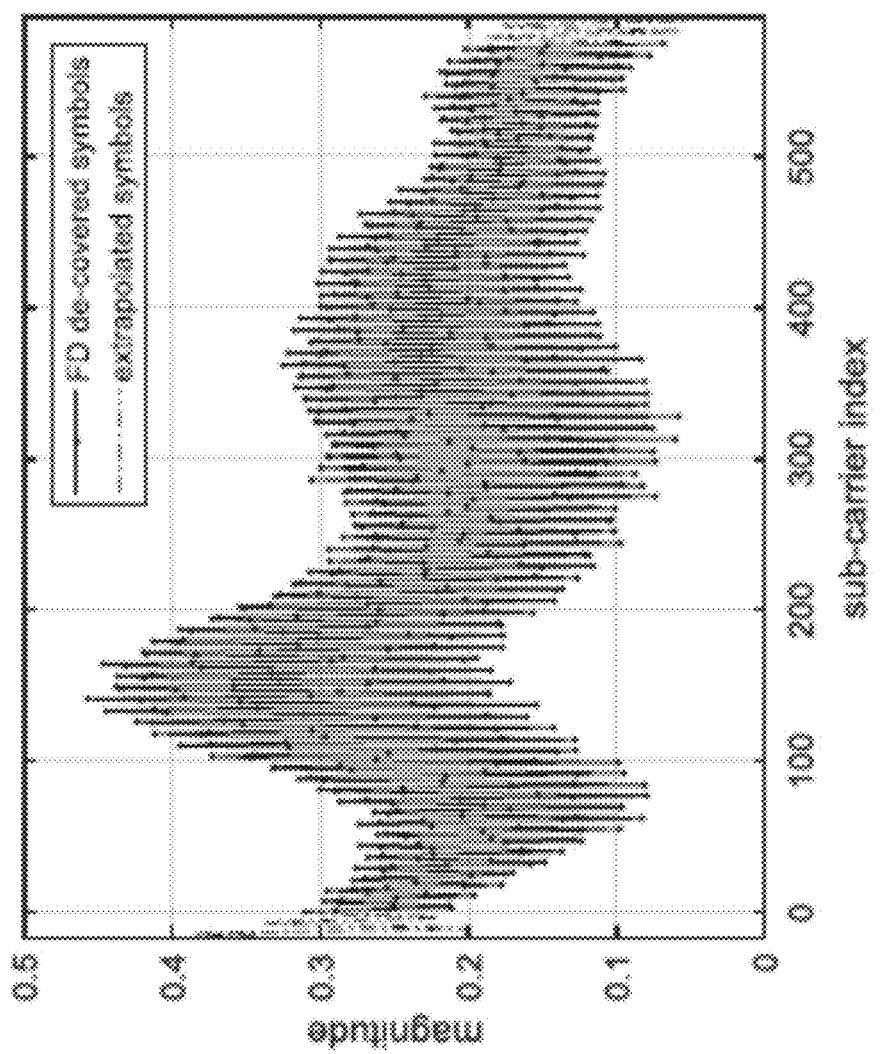
FIG. 12C shows an SRS after applying quadratic extrapolation to 16 edge tones on each side.

FIGS. 12A, 12B, and 12C show examples with DC distortion, interpolation, and edge extrapolation. FIG. 12A shows a received frequency domain SRS after an FFT is performed with distorted low-frequency tones. FIG. 12B shows an SRS after applying quadratic interpolation to 16 low-frequency tones. This graph shows reduced distortion at low frequency compared to the graph in FIG. 12A. FIG. 12C shows an SRS after applying quadratic extrapolation to 16 edge tones on each side. This graph also shows reduced distortion at low frequency compared to the graph in FIG. 12A.

Frequency domain channel frequency response pulse shaping can reduce power leakage due to side lobes and inter-cyclic shift interference can be reduced. Channel frequency response pulse shaping can be performed, for example, using the channel frequency response pulse shaping circuit 65 of FIGS. 6B and/or 6C.

Pulse shaping can be applied to the frequency-domain de-covered symbols. Edge tones can be multiplied by a function that is smooth in frequency domain. Then after performing an inverse FFT, the channel impulse response of each cyclic shift should be more concentrated in its own time-domain window. Accordingly, power leakage due to side lobes can be reduced and the inter-cyclic-shift interference can be lowered.

Figure 13B:
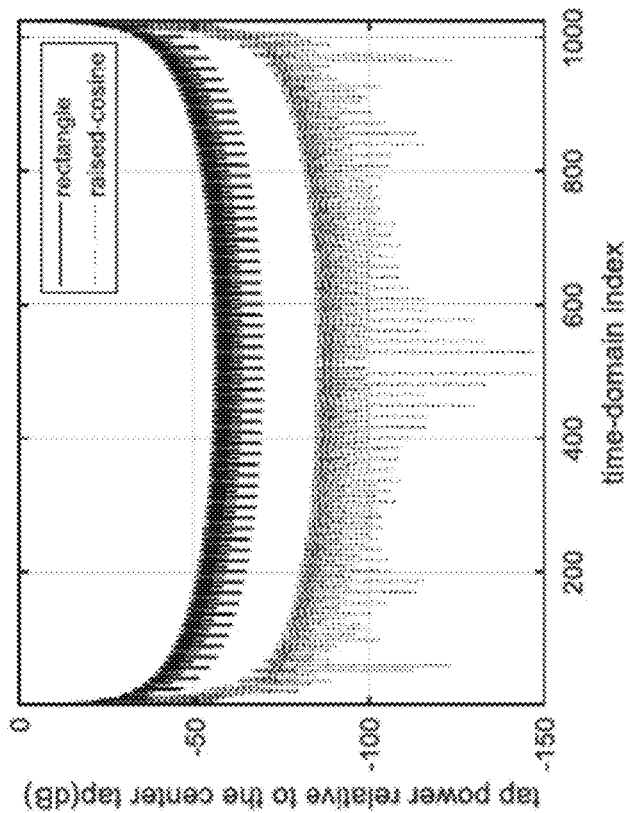
FIG. 13B shows time domain tap powers relative to a center tap for the rectangle and raised cosine pulses respectively.
Figure 13A:
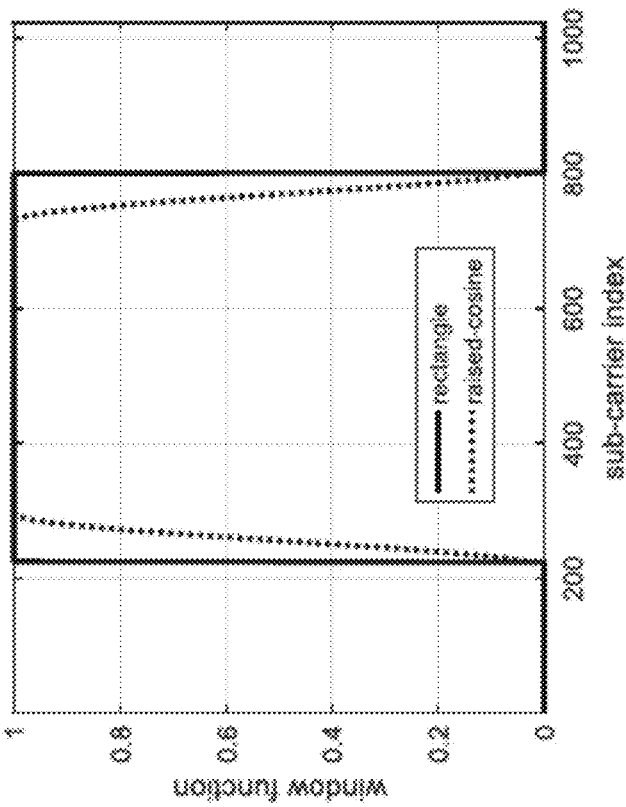
FIG. 13A shows window functions for a rectangle pulse and a raised cosine pulse.

One example of the pulse is a raised-cosine function. The raised-cosine pulse can be applied to both the edge tones and extended tones on each side of the band. FIG. 13A shows window functions for a rectangle pulse and a raised cosine pulse. FIG. 13B shows time domain tap powers relative to a center tap for the rectangle and raised cosine pulses, respectively. FIG. 13B shows that pulse shaping by the raised cosine pulse reduces tap power leakage compared to using a rectangle pulse.

Figure 14A:
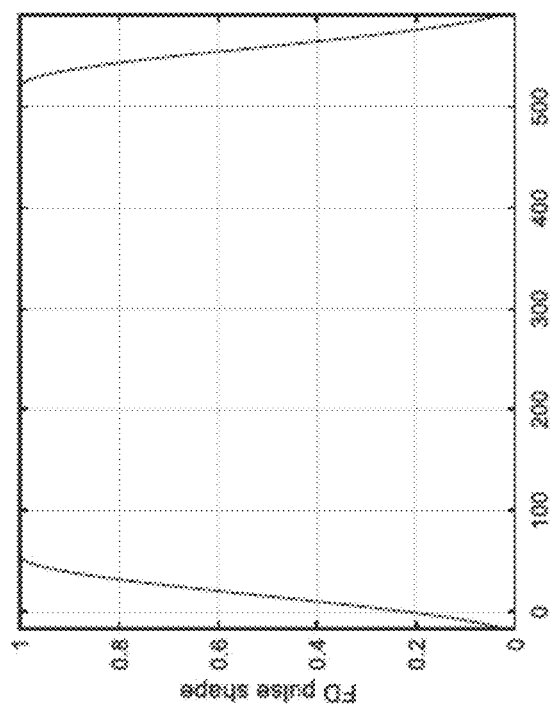
FIG. 14A is a plot of an SRS with extrapolated edge tones before frequency domain pulse shaping.
Figure 14B:
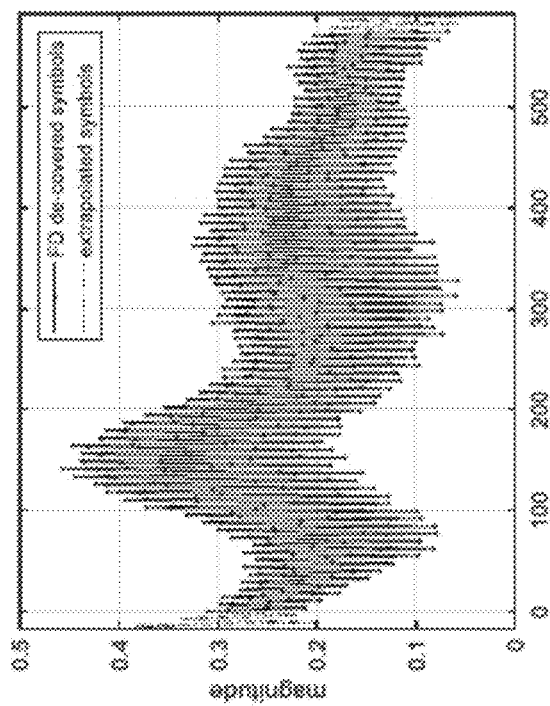
FIG. 14B is a plot of a frequency domain pulse-shaping function.
Figure 14C:
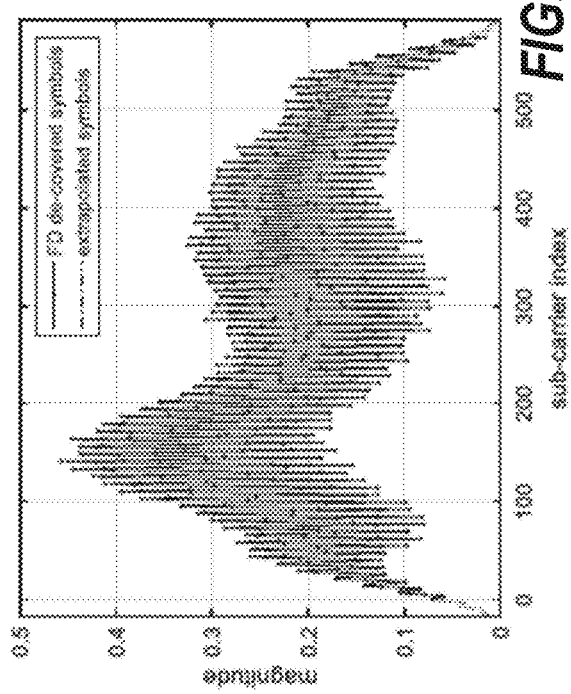
FIG. 14C is a plot of the SRS that includes extrapolated edge tones after frequency domain pulse shaping is applied.

FIG. 14A is a plot of an SRS with extrapolated edge tones before frequency domain pulse shaping. FIG. 14B is a plot of a frequency domain pulse-shaping function. In FIG. 14B, a raised-cosine function spans from sub-carrier indices −16 to 56 and 519 to 591. FIG. 14C is a plot of the SRS that includes extrapolated edge tones after frequency domain pulse shaping is applied. FIG. 14C shows reduced distortion as a result of frequency domain pulse shaping.

After each channel impulse response is separated in the time domain, an FFT can be applied to obtain the channel frequency response of each cyclic shift in frequency domain. Then the channel frequency response of each edge tone can be scaled accordingly to compensate for the impact of frequency domain pulse shaping. The channel impulse response scaling circuit 70 of FIG. 6E can perform such scaling.

Another technique to improve reference signal channel estimation is time domain channel impulse response scaling based on a power delay profile. The scaling can be applied per tap. The scaling can be minimum mean squared error (MMSE) scaling. With power delay profiles, an average power on each tap can be measured and the noise power can be estimated. Then per-tap MMSE scaling can be applied to suppress noise taps. The power delay profile and MMSE scaling and include power delay filtering, noise power estimation, and per-tap scaling.

Figure 15:
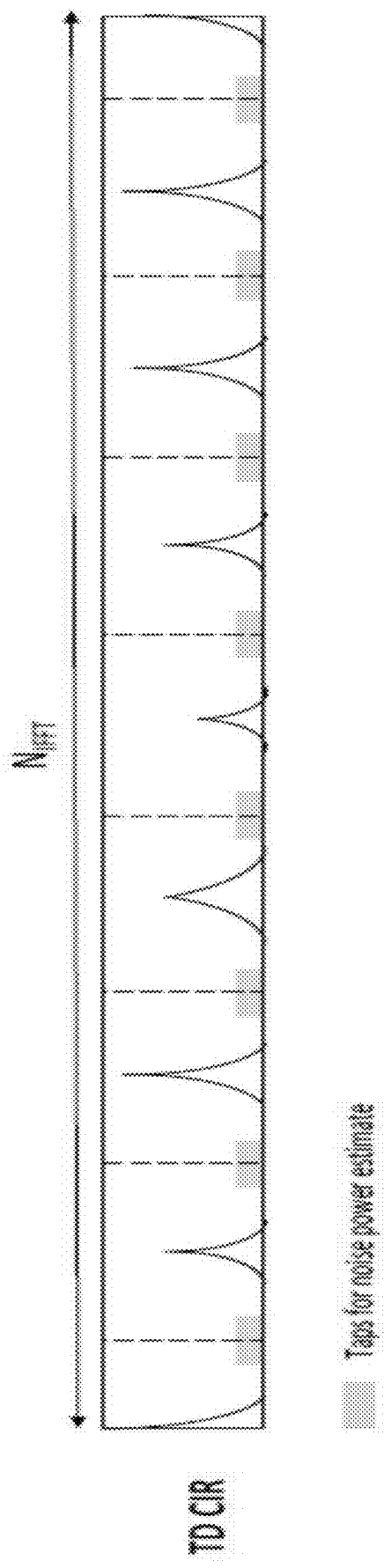
FIG. 15 is a diagram that illustrates time domain channel impulse responses for cyclic shifts after an inverse FFT has been performed.

FIG. 15 is a diagram that illustrates time domain channel impulse responses for cyclic shifts after an inverse FFT has been performed. This diagram is for 8 cyclic shifts. FIG. 15 shows that taps for noise power estimation can be between windows for different cyclic shifts.

Figure 16:
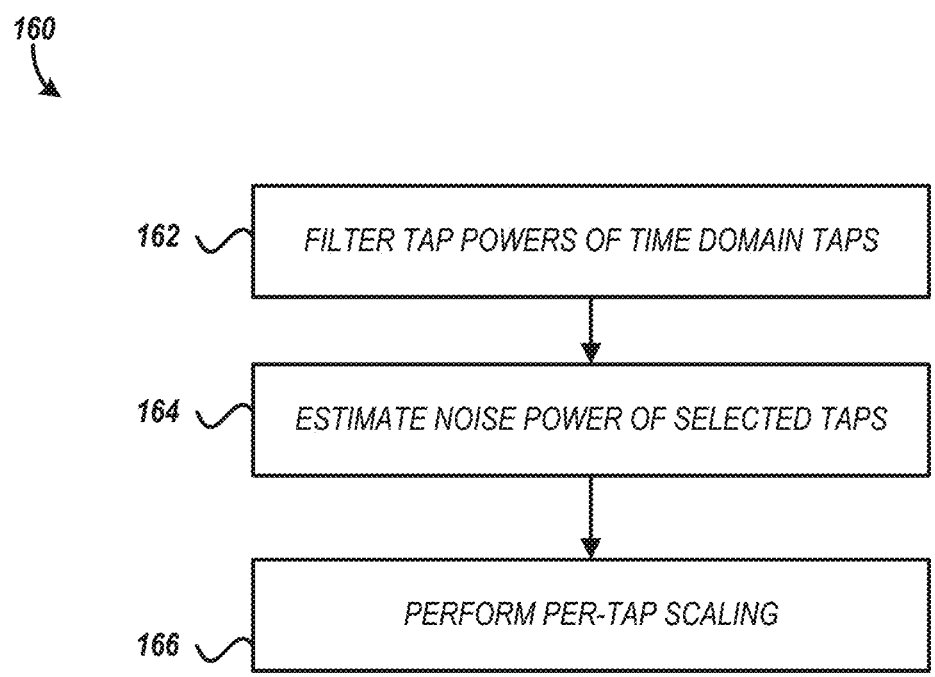
FIG. 16 is a flow diagram of an example method of time domain channel impulse response scaling based on a power delay profile.

FIG. 16 is a flow diagram of an example method 160 of time domain channel impulse response scaling based on a power delay profile. The method 160 can be performed, for example, using the channel impulse response scaling circuit 70 of FIG. 6E. At block 162, tap powers of a time domain taps are filtered. An infinite impulse response filter can perform the filtering. Equation 24 can represent the filtering, where n is a time domain index and α is the time constant of the filter.

$$\overline{P_n} \leftarrow (1-\alpha)\cdot\overline{P_n}+\alpha\cdot|h_n|^2 \qquad \text{(Eq. 24)}$$

Noise power of taps is estimated at block 164. Noise power is estimated based on filtered tap powers $\{\overline{Pn}\}$, by taking the average of selected sub-carriers. Selected sub-carriers can be the taps for noise power estimation indicated in FIG. 15.

At block 166, per-tap scaling is applied. The per-tap scaling can involve thresholding. In thresholding, taps with $\overline{Pn} > \alpha \cdot P\text{noise}$ are selected as channel taps. All other taps can be set to a value to remove noise, such as a value of 0. Per-cap scaling can involve MMSE scaling. In MMSE scaling, the n-th tap $h_n$ is scaled by a factor $$\frac{\overline{P_n} - P_{noise}}{\overline{P_n}}.$$

Any other suitable per-tap scaling technique can be applied.

Figure 17:
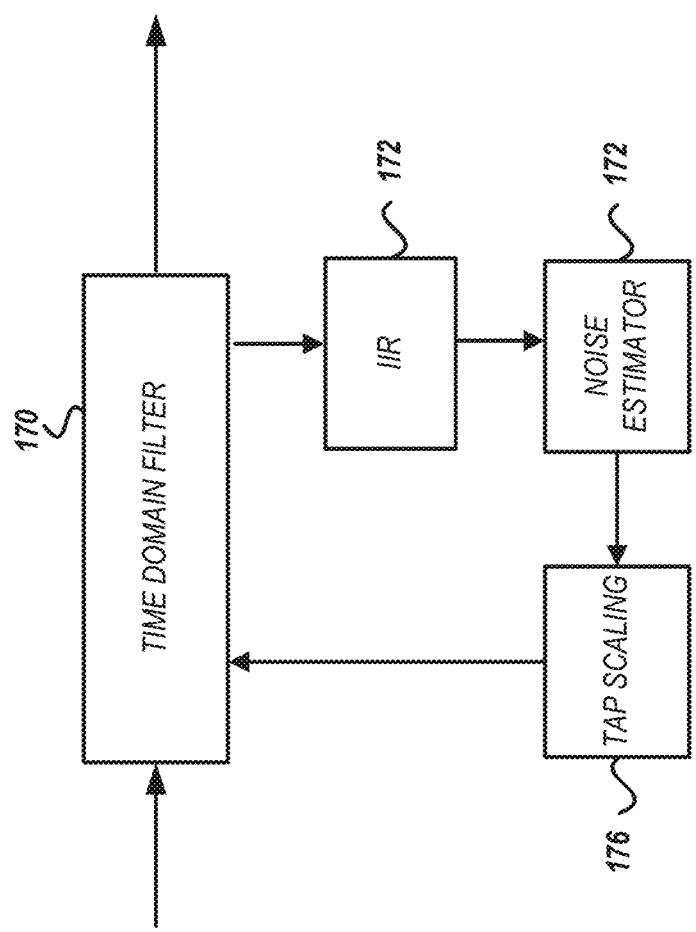
FIG. 17 is a schematic block diagram of a time domain processing circuit that can perform time domain channel impulse response scaling based on a power delay profile.

FIG. 17 is a schematic block diagram of a time domain processing circuit that can perform time domain channel impulse response scaling based on a power delay profile. The illustrated time domain processing circuit includes a time domain filter 170 having a plurality of taps, a filter 172, a noise estimation circuit 174, and a tap scaling circuit 176. The filter 172 can be an infinite impulse response filter. The filter 172 can filter tap power of time domain taps. The noise power estimation circuit 174 is configured to estimate noise power for a sub-set of the taps of the filter corresponding to sub-carriers outside time windows for channel impulse responses. The tap scaling circuit 176 is configured to perform a per-tap scaling on at least a portion of the taps based on the estimated noise power. The tap scaling circuit 176 can perform per tap scaling based on thresholding, MMSE scaling, any other suitable scaling operation, or any suitable combination thereof.

Time domain pulse shaping can be applied to improve reference signal channel estimation. To make the SRS CE less subject to frequency offset and timing offset, TD pulse shaping can be applied to OFDM samples before taking an FFT for frequency domain symbols.

Figure 18:
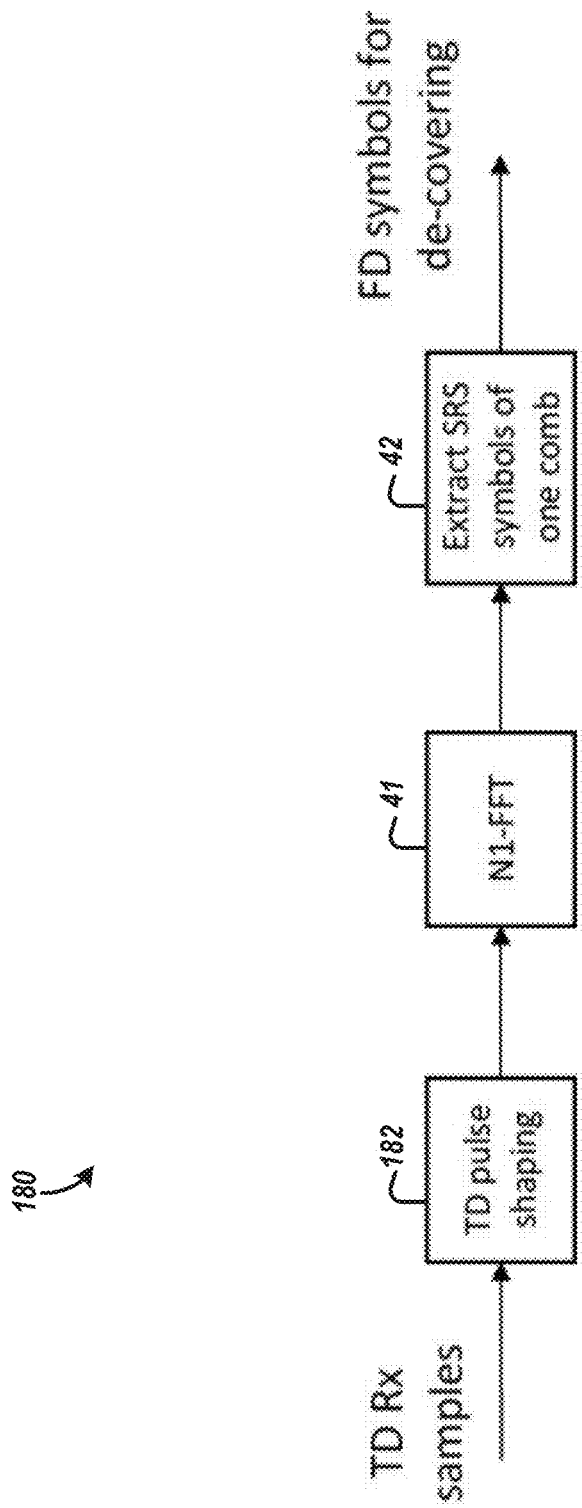
FIG. 18 is a schematic block diagram of processing circuitry with time domain pulse shaping.

FIG. 18 is a schematic block diagram of processing circuitry 180 with time domain pulse shaping. The processing circuitry 180 implements part of the signal processing for received reference signals for generating a channel estimate. As illustrated, the processing circuitry 180 includes a time domain pulse shaping circuit 182, the Fast Fourier Transform block 41, and the reference signal extraction circuit 42.

The time domain pulse shaping circuit 182 applies pulse shaping before received time domain samples are converted to the frequency domain by the Fast Fourier Transform block 41. This can reduce frequency offset and/or timing offset. The time domain pulse shaping circuit 182 can be implemented with any suitable processing circuitry disclosed herein. An output of the time domain pulse shaping circuit 182 can be coupled to an input of any of the Fast Fourier Transform blocks disclosed herein, such as the Fast Fourier Transform block 31 of FIG. 3 and/or the Fast Fourier Transform block 41 of FIG. 4A. The FFT block 41 can provide a frequency domain signal to the reference signal extraction circuit 42 with a reduced time offset and/or frequency offset due to the time domain pulse shaping by the time domain pulse shaping circuit 182.

Without the time domain pulse shaping circuit 182, a pulse applied to a Fast Fourier Transform block can be a rectangle pulse. The time domain pulse shaping circuit 182 can apply a raised cosine pulse, for example. The time domain pulse shaping circuit 182 can apply any other suitable pulse that causes time offset and/or frequency offset to be reduced.

Figure 19B:
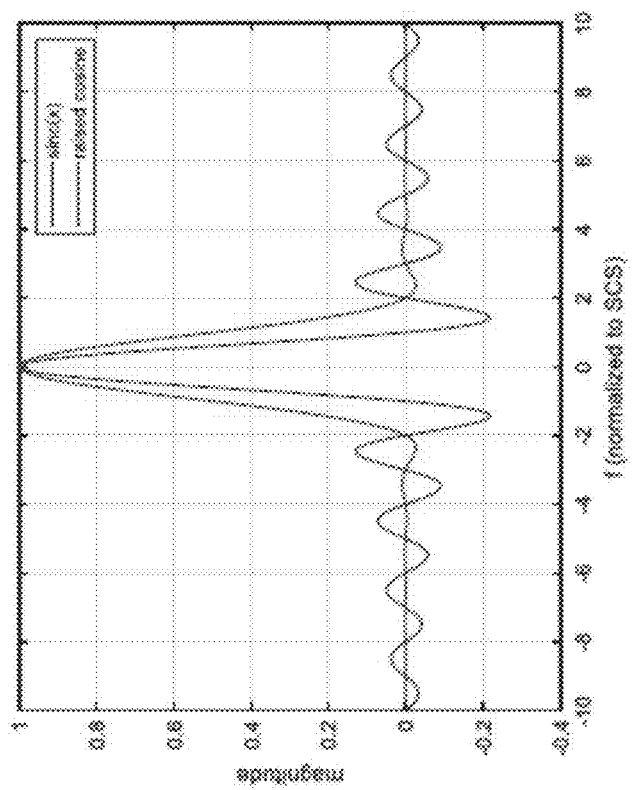
FIG. 19B is a graph of a sinc pulse and a raised cosine pulse in the frequency domain.
Figure 19A:
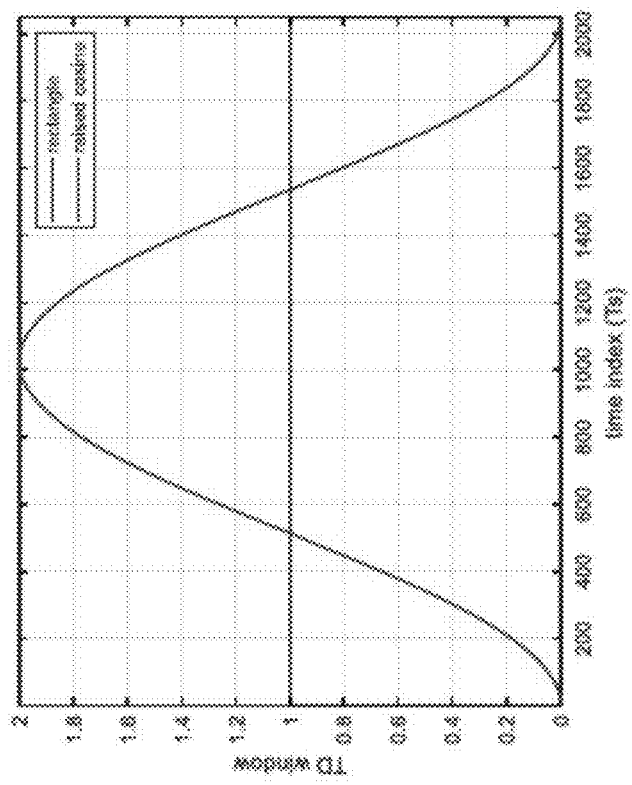
FIG. 19A is a graph of a rectangle pulse and a raised cosine pulse in the time domain.

FIG. 19A is a graph of a rectangle pulse and a raised cosine pulse in the time domain. The raised cosine pulse in FIG. 19A has a roll-off factor of 1. The raised cosine pulse of FIG. 19A is an example of a pulse that can be generated by the pulse shaping circuit 182 of FIG. 18 to reduce timing offset and/or frequency offset. In one example application, the Fast Fourier Transform block 41 can generate a 2048-point FFT. The teachings herein can be similarly applied to other suitable FFT sizes. The pulse in frequency domain after an FFT is preformed can be represented by Equation 25, in which $f$ is normalized to sub-carrier spacing (SCS).

$$h(f) = \begin{cases} \dfrac{\pi}{2}\mathrm{sinc}\!\left(\dfrac{1}{2}\right) & f = \pm\dfrac{1}{2} \\ 2\cdot\mathrm{sinc}(f/2)\dfrac{\cos(\pi f/2)}{1-4f^2}, & o.w. \end{cases} \qquad \text{(Eq. 25)}$$

FIG. 19B is a graph of a sinc pulse and the raised cosine pulse in the frequency domain. Compared to the sinc pulse, the decay of side lobes of the raised cosine pulse is significantly faster in the frequency domain, as shown in FIG. 19B. Consequently, the ICI leakage can be significantly smaller in the frequency domain for the raised cosine pulse.

For a raised cosine pulse with a roll-off factor of 1, the decay of side lobes is significantly faster in the frequency domain and ICI leakage is significantly smaller except for the first harmonic spurs. By applying time domain pulse shaping, there can be a relatively large leakage to the adjacent comb, for example, due to the doubled width of the main lobe in frequency domain. Accordingly, it can be advantageous to apply time domain pulse shaping in applications where there is no SRS or other reference signal being allocated to an immediately adjacent comb.

Frequency rotation with an offset can be applied to improve reference signal channel estimation. This can reduce interference among users.

If a base station maintains an estimate of frequency offset for each UE, the estimate can come from PUSCH and/or PUCCH demodulation. In addition, if the base station can identify the UE having the dominant received SRS power, most likely from the previous SRS CE, then in the time domain, the received samples can be rotated with the frequency offset of the dominant UE. Applying frequency rotation with one offset can be modeled by Equation 26.

$$y'_t(n)=y_t(n) \cdot e^{-j2\pi\Delta f T_s n} \quad \text{(Eq. 26)}$$

In some applications, a frequency offset can be determined as the center of mass for all cyclic shifts based on the estimated frequency offsets and SRS powers of all UEs.

Figure 20:
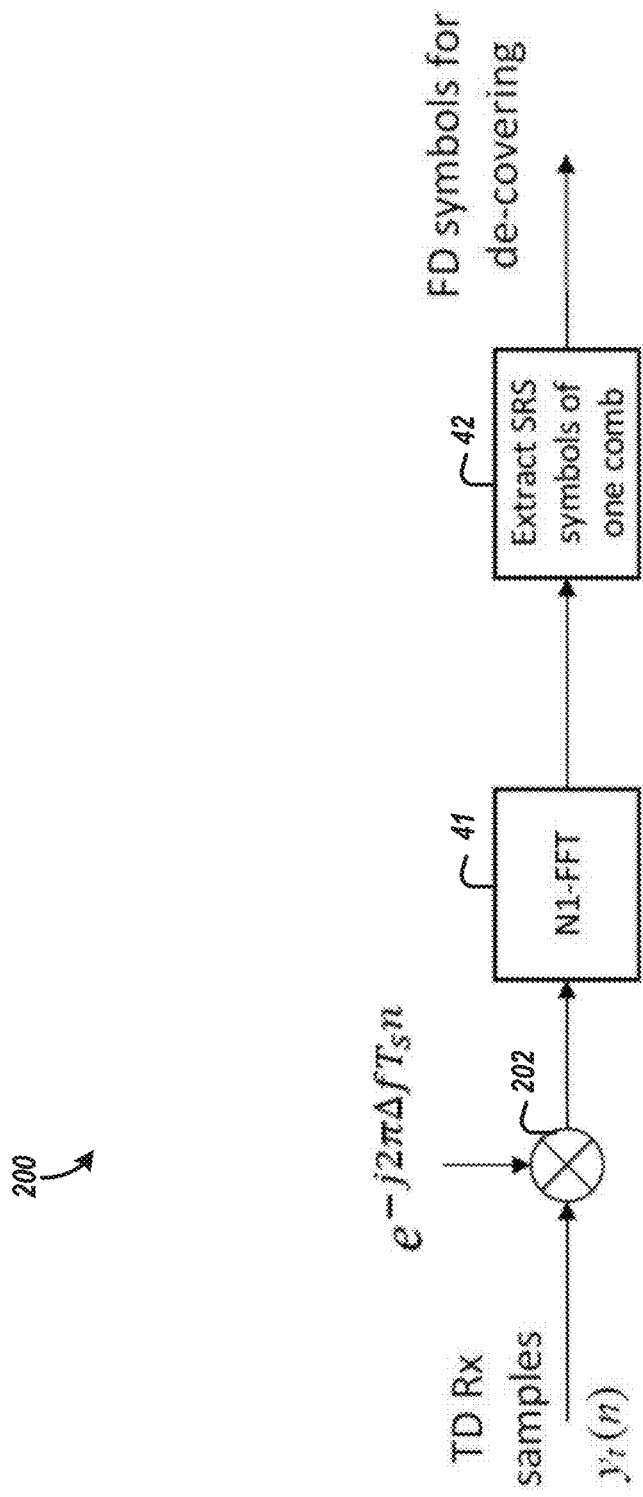
FIG. 20 is a schematic block diagram of processing circuitry with frequency rotation to compensate for a frequency offset.

FIG. 20 is a schematic block diagram of processing circuitry 200 with frequency rotation. The processing circuitry 200 implements part of the signal processing for received reference signals for generating a channel estimate. As illustrated, the processing circuitry 200 includes a frequency rotation circuit 202, the Fast Fourier Transform block 41, and the reference signal extraction circuit 42.

The frequency rotation circuit 202 can perform frequency rotation to compensate for a frequency offset. The frequency offset can be from a dominant UE. The frequency offset can be from a center of mass of all cyclic shifts. The frequency rotation circuit 202 can reduce frequency offset. The frequency rotation circuit 202 can include a mixer. The frequency rotation circuit 202 can be implemented with any suitable processing circuitry disclosed herein. An output of the frequency rotation circuit 202 can be coupled to an input of any of the Fast Fourier Transform blocks disclosed herein, such as the Fast Fourier Transform block 31 of FIG. 3 and/or the Fast Fourier Transform block 41 of FIG. 4A. The FFT block 41 in FIG. 20 can provide a frequency domain signal to the reference signal extraction circuit 42 with a reduced frequency offset due to the frequency rotation by the frequency rotation circuit 202.

Spurs can be moved into unused time space to improve reference signal channel estimation. When detecting channel impulse responses for cyclic shifts, there can be unused time domain space that does not impact channel estimation. Spurs and/or other noise can be moved to such unused time domain space to improve channel estimation.

Figure 21:
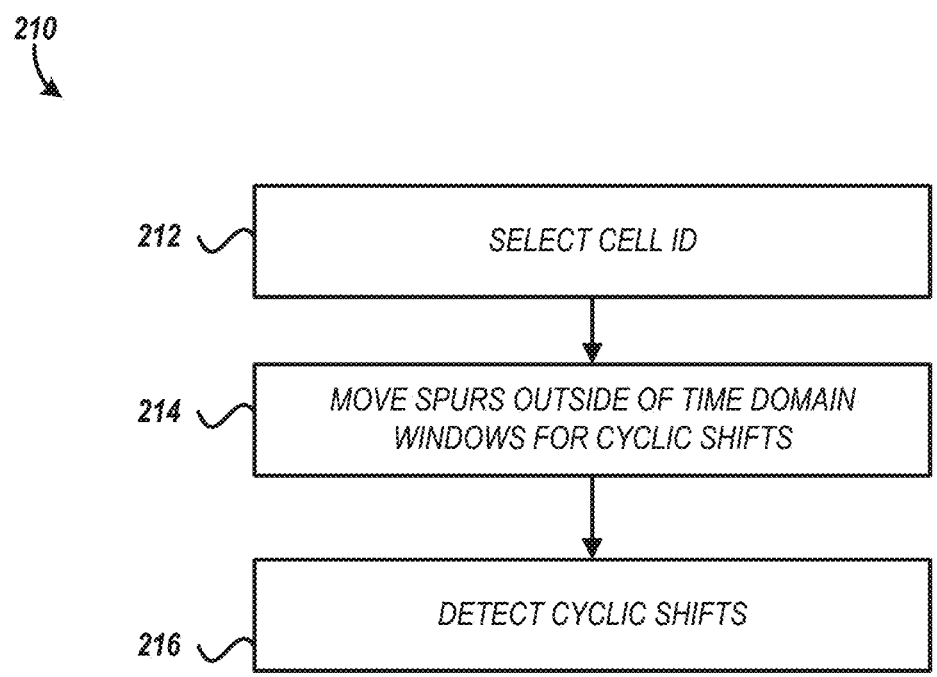
FIG. 21 is a flow diagram of a method of detecting cyclic shifts of a reference signal in which spurs are moved into an unused time space.

FIG. 21 is a flow diagram of a method 210 of detecting cyclic shifts of a reference signal in which spurs are moved into an unused time space. A cell identifier (ID) can be selected at block 212. When group and sequence hopping is disabled in the SRS, since the location of harmonic spurs can be predicted as a function of cell ID, a proper cell ID can be selected to make the first harmonic spurs fall into regions that are not used by any of the cyclic shifts.

Based on the cell ID selected at block 212, spurs (e.g., first harmonic spurs) are moved into regions outside the time domain windows for cyclic shifts at block 214. This technique can advantageously be applied together with time domain pulse shaping (e.g., with the time domain pulse shaping circuit 182 of FIG. 18), since first harmonic spurs can be dominant after time domain pulse shaping is applied and such spurs can be moved outside of the time domain windows for cyclic shifts in the method 210. Cyclic shifts can be detected at block 216. This cyclic shift detection can be performed without the harmonic spurs that are outside of the time domain windows for the cyclic shifts impacting channel estimation. Channel estimation can be performed based on the detected cyclic shifts and further processing.

Spurs can be moved into unused time space by the time domain processing circuit 34 of FIG. 3 and/or the time domain processing and channel impulse response separation circuit 48 of FIG. 4B.

As an example, if there are 4 SRS cyclic shifts in one comb with cyclic shifts c=0, 1, 2 and 3, by selecting a cell ID denoted as nCID such that nCIDmod 30=15, the first harmonic spurs in the time domain can be moved into a region outside of the truncation windows for the four cyclic shifts.

Figure 22:
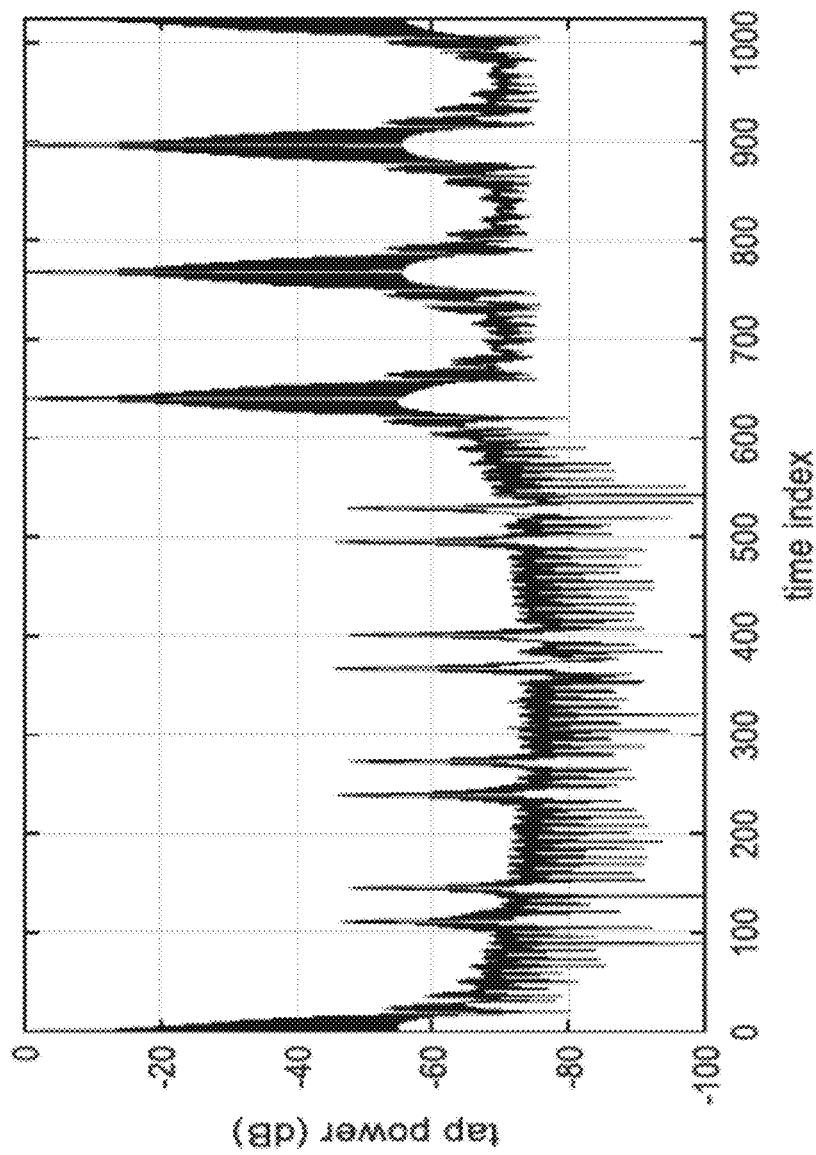
FIG. 22 illustrates the locations of the first harmonic spurs for four cyclic shifts.

FIG. 22 illustrates the locations of the first harmonic spurs for four cyclic shifts. As shown in FIG. 22, the harmonic spurs are outside of the time domain windows for the 4 cyclic shifts. In FIG. 22, the spurs are moved into time domain indices below the time domain indices for windows for the cyclic shifts.

As another example, if there are 8 SRS cyclic shifts in one comb, and if the time domain window size for each cyclic shift is set to 64, then the cell ID can be set to 12 or 17 such that the first harmonic spurs are located outside of the time-domain windows for all cyclic shifts. There can be smaller time domain windows with more cyclic shifts. In certain instances, spurs can be moved to time domain indices between windows for cyclic shifts.

MIMO Environment

Figure 23:
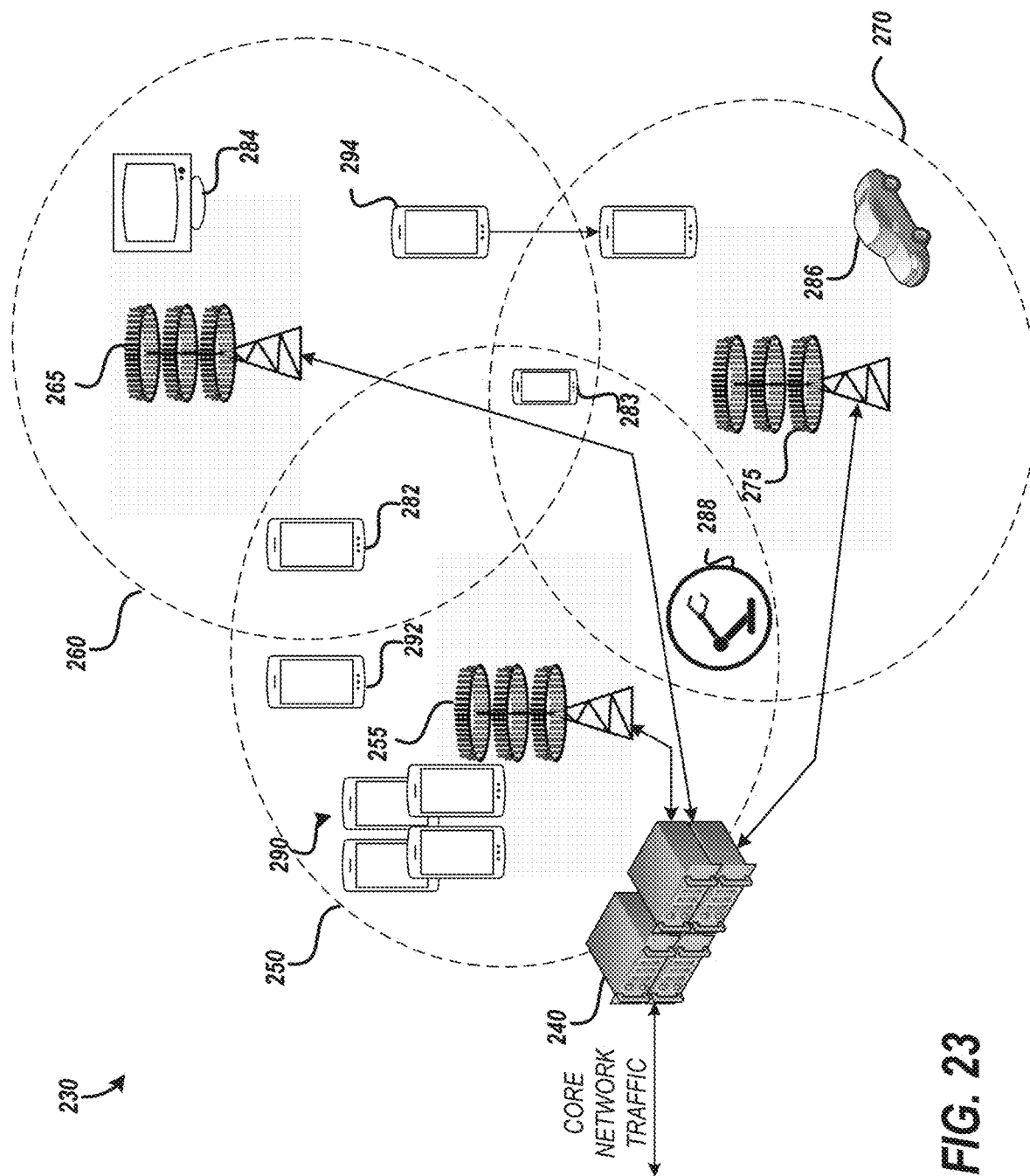
FIG. 23 is a diagram illustrating an example multiple-input multiple-output (MIMO) network environment in which channel estimation based on a reference signal can be performed.

FIG. 23 is a diagram illustrating an example multiple-input multiple-output (MIMO) network environment 230 in which channel estimation based on a reference signal can be performed. Various UEs can wirelessly communicate with a network system in the MIMO network environment 230. Such wireless communications can achieve high throughputs. Antennas of MIMO network environment 230 for wirelessly communicating with UEs can be distributed. Channel estimates for channels between different nodes can be performed in the MIMO network environment 230 based on reference signal estimation using any suitable techniques disclosed herein.

Various standards and/or protocols may be implemented in the MIMO network environment 230 to wirelessly communicate data between a base station and a wireless communication device. Some wireless devices may communicate using an orthogonal frequency-division multiplexing (OFDM) digital modulation scheme via a physical layer. Example standards and protocols for wireless communication in the environment 230 can include the third generation partnership project (3GPP) Long Term Evolution (LTE), Long Term Evolution Advanced (LTE Advanced), 3GPP New Radio (NR) also known as 5G, Global System for Mobile Communications (GSM), Enhanced Data Rates for GSM Evolution (EDGE), Worldwide Interoperability for Microwave Access (WiMAX), and the IEEE 802.11 standard, which may be known as Wi-Fi. In some systems, a radio access network (RAN) may include one or more base stations associated with one or more evolved Node Bs (also commonly denoted as enhanced Node Bs, eNodeBs, or eNBs), gNBs, or any other suitable Node Bs (xNBs). In some other embodiments, radio network controllers (RNCs) may be provided as the base stations. A base station provides a bridge between the wireless network and a core network such as the Internet. The base station may be included to facilitate exchange of data for the wireless communication devices of the wireless network. A base station can perform reference signal channel estimation is accordance with any suitable principles and advantages disclosed herein.

A wireless communication device may be referred to as a user equipment (UE). The UE may be a device used by a user such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. In some implementations, the UE may include a sensor or other networked device configured to collect data and wirelessly provide the data to a device (e.g., server) connected to a core network such as the Internet. Such devices may be referred to as Internet of Things (IoT) devices. A downlink (DL) transmission generally refers to a communication from the base transceiver station (BTS) or eNodeB to a UE. An uplink (UL) transmission generally refers to a communication from the UE to the BTS.

FIG. 23 illustrates a cooperative, or cloud radio access network (C-RAN) environment 100. In the environment 230, the eNodeB functionality is subdivided between a base band unit (BBU) 240 and multiple remote radio units (RRUs) (e.g., RRU 255, RRU 265, and RRU 275). The network system of FIG. 23 includes the BBU 240 and the RRUs 255, 265, and 275. An RRU may include multiple antennas, and one or more of the antennas may serve as a transmit-receive point (TRP). The RRU and/or a TRP may be referred to as a serving node. The BBU 240 may be physically connected to the RRUs such as via an optical fiber connection. The BBU 240 may provide operational information to an RRU to control transmission and reception of signals from the RRU along with control data and payload data to transmit. The RRU may provide data received from UEs within a service area associated with the RRU to the network. As shown in FIG. 23, the RRU 255 provides service to devices within a service area 250. The RRU 265 provides service to devices within a service area 260. The RRU 275 provides service to devices within a service area 270. For example, wireless downlink transmission service may be provided to the service area 270 to communicate data to one or more devices within the service area 270.

In the environment 230, a network system can wirelessly communicate with UEs via distributed MIMO. For example, the UE 283 can wirelessly communicate MIMO data with antennas of the network system that include at least one antenna of the RRU 255, at least one antenna of the RRU 265, and at least one antenna of the RRU 275. As another example, the UE 282 can wirelessly communicate MIMO data with distributed antennas that include at least one antenna of the RRU 255 and at least one antenna of the RRU 265. As one more example, the UE 288 can wirelessly communicate MIMO data with distributed antennas that include at least one antenna of the RRU 255 and at least one antenna of the RRU 275. Any suitable principles and advantages of the reference signal channel estimation disclosed herein can be implemented in such distributed MIMO applications, for example.

The illustrated RRUs 255, 265, and 275 include multiple antennas and can provide MIMO communications. For example, an RRU may be equipped with various numbers of transmit antennas (e.g., 2, 4, 8, or more) that can be used simultaneously for transmission to one or more receivers, such as a UE. Receiving devices may include more than one receive antenna (e.g., 2, 4, etc.). An array of receive antennas may be configured to simultaneously receive transmissions from the RRU. Each antenna included in an RRU may be individually configured to transmit and/or receive according to a specific time, frequency, power, and direction configuration. Similarly, each antenna included in a UE may be individually configured to transmit and/or receive according to a specific time, frequency, power, and direction configuration. The configuration may be provided by the BBU 240.

The service areas shown in FIG. 23 may provide communication services to a heterogeneous population of user equipment. For example, the service area 250 may include a cluster of UEs 290 such as a group of devices associated with users attending a large event. The service area 250 can also include an additional UE 292 that is located away from the cluster of UEs 290. A mobile user equipment 294 may move from the service area 260 to the service area 270. Another example of a mobile user equipment is a vehicle 186 which may include a transceiver for wireless communications for real-time navigation, on-board data services (e.g., streaming video or audio), or other data applications. The environment 230 may include semi-mobile or stationary UEs, such as robotic device 288 (e.g., robotic arm, an autonomous drive unit, or other industrial or commercial robot) or a television 284, configured for wireless communications.

A user equipment 282 may be located with an area with overlapping service (e.g., the service area 250 and the service area 260). Each device in the environment 230 may have different performance needs which may, in some instances, conflict with the needs of other devices.

Channel estimation in the network environment 230, such as estimation of channels between UEs and RRUs using reference signals in accordance with any suitable principles and advantages disclosed herein, can be robust to one or more of a variety of impairments. An accurate estimate for a wireless communication channel can be useful for calibration and/or for precoding.

Conclusion

Depending on the embodiment, certain acts, events, or functions of any of the processes or algorithms described herein can be performed in a different sequence, can be added, merged, or left out altogether (e.g., not all described operations or events are necessary for the practice of the process or algorithm). Moreover, in certain embodiments, operations, or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," "such as," and the like, unless specifically stated otherwise, or otherwise understood within the context as used, is generally intended to convey that certain embodiments include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without other input or prompting, whether these features, elements, and/or steps are included or are to be performed in any particular embodiment. The terms "comprising," "including," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated or generally understood from context, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Connections can be via an air interface and/or via wires and/or via optical fiber and/or via any other suitable connection.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method of reference signal channel estimation, the method comprising:
    receiving a reference signal for channel estimation;
    de-covering the reference signal in a frequency domain to generate a de-covered reference signal;
    after the de-covering, frequency domain processing the de-covered reference signal to cause distortion of a direct current offset in the de-covered reference signal to be reduced, wherein the frequency domain processing comprises generating an estimated tone for a tone of the de-covered reference signal based on at least two other tones of the de-covered reference signal;
    after the frequency domain processing, time domain processing to cause a noise floor associated with the de-covered reference signal to be reduced; and
    generating a channel estimate based on the frequency domain processing and the time domain processing, wherein the channel estimate is associated with a communication channel between a first node and a second node.

2. The method of claim 1, wherein the frequency domain processing comprises replacing the tone with the estimated tone to cause distortion associated with the direct current offset to be reduced.

3. The method of claim 1, wherein the frequency domain processing comprises modifying the tone based on the estimated tone to cause distortion associated with the direct current offset to be reduced.

4. The method of claim 1, further comprising pulse shaping the reference signal prior to the de-covering.

5. The method of claim 1, further comprising rotating the reference signal based on an indicator of a frequency offset prior to the de-covering.

6. The method of claim 1, wherein the reference signal is an uplink Sounding Reference Signal.

7. The method of claim 1, wherein the first node is a user equipment and the second node is a network node.

8. A method of reference signal channel estimation, the method comprising:
    receiving a reference signal for channel estimation;
    de-covering the reference signal in a frequency domain to generate a de-covered reference signal;
    after the de-covering, frequency domain processing the de-covered reference signal to cause distortion of a direct current offset in the de-covered reference signal to be reduced;
    after the frequency domain processing, time domain processing to cause a noise floor associated with the de-covered reference signal to be reduced, wherein the time domain processing comprises:
        estimating noise power for a sub-set of time domain taps corresponding to sub-carriers between channel impulse responses; and
        performing a per-tap scaling on at least a portion of the time domain taps based on the estimating; and
    generating a channel estimate based on the frequency domain processing and the time domain processing, wherein the channel estimate is associated with a communication channel between a first node and a second node.

9. The method of claim 8, wherein the frequency domain processing comprises generating an estimated tone for a tone of the de-covered reference signal based on at least two other tones of the de-covered reference signal.

10. The method of claim 8, wherein the per-tap scaling involves at least one of minimum mean squared error scaling or thresholding.

11. A method of reference signal channel estimation, the method comprising:
   receiving a reference signal for channel estimation;
   de-covering the reference signal in a frequency domain to generate a de-covered reference signal;
   after the de-covering, frequency domain processing the de-covered reference signal to cause distortion of a direct current offset in the de-covered reference signal to be reduced;
   after the frequency domain processing, time domain processing to cause a noise floor associated with the de-covered reference signal to be reduced, wherein the time domain processing comprises moving a spur outside of time domain windows for cyclic shifts of the reference signal; and
   generating a channel estimate based on the frequency domain processing and the time domain processing, wherein the channel estimate is associated with a communication channel between a first node and a second node.

12. The method of claim 11, wherein the frequency domain processing comprises pulse shaping the de-covered reference signal to cause distortion associated with the direct current offset to be reduced.

13. The method of claim 11, further comprising pulse shaping the reference signal prior to the de-covering.

14. The method of claim 11, wherein the frequency domain processing comprises generating an estimated tone for a tone of the de-covered reference signal based on at least two other tones of the de-covered reference signal.

15. A system for channel estimation, the system comprising:
   a frequency domain processing circuit configured to generate a de-covered frequency domain reference signal, generate an estimated tone for a tone of the de-covered frequency domain reference signal based on at least two other tones of the de-covered frequency domain reference signal, and replace the tone with the estimated tone to cause distortion associated with a direct current offset to be reduced;
   a time domain processing circuit having an input coupled to an output of the frequency domain processing circuit, the time domain processing circuit configured to suppress time domain channel impulse response leakage; and
   a channel estimation circuit configured to generate a channel estimate based on an output of the time domain processing circuit, wherein the channel estimate is associated with a wireless communication channel between a first node and a second node.

16. The system of claim 15, further comprising a second time domain processing circuit configured to pulse shape a reference signal, the second time domain processing circuit having an output coupled to an input of the frequency domain processing circuit.

17. The system of claim 15, further comprising a second time domain processing circuit configured to rotate a reference signal based on an indicator of a frequency domain offset to thereby reduce the frequency domain offset, the second time domain processing circuit having an output coupled to an input of the frequency domain processing circuit.

18. The system of claim 15, further comprising a second frequency domain processing circuit configured to perform per-cyclic shift frequency domain processing, wherein the second frequency domain processing circuit is coupled between the time domain processing circuit and the channel estimation circuit.

19. The system of claim 15, wherein the first node is a user equipment and the second node is a network node.

20. A system for channel estimation, the system comprising:
   a frequency domain processing circuit configured to generate a de-covered frequency domain reference signal and to process the de-covered frequency domain reference signal so as to cause distortion associated with a direct current offset to be reduced;
   a time domain processing circuit having an input coupled to an output of the frequency domain processing circuit, the time domain processing circuit configured to suppress time domain channel impulse response leakage, wherein the time domain processing circuit comprises:
      a filter comprising a plurality of taps;
      a noise power estimation circuit configured to estimate noise power for a sub-set of the taps of the filter corresponding to sub-carriers between channel impulse responses; and
      a filter tap scaling circuit configured to perform a per-tap scaling on at least a portion of the taps of the filter based on the estimated noise power; and
   a channel estimation circuit configured to generate a channel estimate based on an output of the time domain processing circuit, wherein the channel estimate is associated with a wireless communication channel between a first node and a second node.

21. The system of claim 20, wherein the frequency domain processing circuit is configured to perform pulse shaping on the de-covered frequency domain reference signal to cause distortion associated with the direct current offset to be reduced.

22. A system for channel estimation, the system comprising:
   a frequency domain processing circuit configured to generate a de-covered frequency domain reference signal from a reference signal and to process the de-covered frequency domain reference signal so as to cause distortion associated with a direct current offset to be reduced;
   a time domain processing circuit having an input coupled to an output of the frequency domain processing circuit, the time domain processing circuit configured to suppress time domain channel impulse response leakage, wherein the time domain processing circuit is configured to move a spur outside of time domain windows for cyclic shifts of a time domain version of the processed de-covered frequency domain reference signal; and
   a channel estimation circuit configured to generate a channel estimate based on an output of the time domain processing circuit, wherein the channel estimate is associated with a wireless communication channel between a first node and a second node.

23. The system of claim 22, wherein the frequency domain processing circuit is configured to generate an estimated tone for a tone of the de-covered frequency domain reference signal based on at least two other tones of the de-covered frequency domain reference signal, and to replace the tone with the estimated tone to cause distortion associated with the direct current offset to be reduced.

* * * * *